(12) United States Patent
Yukawa et al.

(10) Patent No.: US 7,168,470 B2
(45) Date of Patent: *Jan. 30, 2007

(54) PNEUMATIC RADIAL TIRE

(75) Inventors: Naoki Yukawa, Kobe (JP); Kazumi Yamazaki, Kobe (JP); Takashi Tanaka, Kobe (JP); Yasuo Wada, Kobe (JP); Makoto Hizume, Kobe (JP)

(73) Assignee: Sumitomo Rubber Industries, Ltd., Kobe (JP)

( * ) Notice: Subject to any disclaimer, the term of this patent is extended or adjusted under 35 U.S.C. 154(b) by 65 days.

This patent is subject to a terminal disclaimer.

(21) Appl. No.: 10/416,581

(22) PCT Filed: Jun. 10, 2002

(86) PCT No.: PCT/JP02/05759

§ 371 (c)(1),
(2), (4) Date: Nov. 26, 2003

(87) PCT Pub. No.: WO02/002610

PCT Pub. Date: Dec. 27, 2002

(65) Prior Publication Data

US 2004/0089392 A1    May 13, 2004

(30) Foreign Application Priority Data

Jun. 13, 2001  (JP) .............................. 2001-179215
Jun. 21, 2001  (JP) .............................. 2001-188511
Aug. 22, 2001  (JP) .............................. 2001-251931
Dec. 18, 2001  (JP) .............................. 2001-384928
Mar. 20, 2002  (JP) .............................. 2002-079190
Apr. 12, 2002  (JP) .............................. 2002-110924

(51) Int. Cl.
*B60C 9/18* (2006.01)
*B60C 9/22* (2006.01)

(52) U.S. Cl. ...................... 152/531; 152/451; 152/526; 152/533

(58) Field of Classification Search ................ 152/531, 152/533
See application file for complete search history.

(56) References Cited

U.S. PATENT DOCUMENTS 5,213,642 A * 5/1993 Sponagel ..................... 152/455

(Continued)

FOREIGN PATENT DOCUMENTS

EP                 455454 A1      11/1991

(Continued)

*Primary Examiner*—Justin R. Fischer
(74) *Attorney, Agent, or Firm*—Birch, Stewart, Kolasch & Birch, LLP

(57) ABSTRACT

Inside a tread portion and outside a belt layer along the radius direction thereof is formed a belt layer comprising a band ply formed by winding spirally a tape- and belt-form ply wherein one ore plural band cords are stretched and arranged to be embedded in a topping rubber. In this band ply, the elongation resistance value K (unit: N' cord number/cm) specified by the following equation is set within the range of 99 to 700 when the sectional area of the band cord or each of the band cords is represented by S (unit: $mm^2$), the modulus thereof when the elongation thereof is 2% is represented by M (unit: $N/mm^2$), the band cord arrangement density per cm of the band ply is represented by D (unit: cord number/cm).

$$K = S \times M \times D / 100 \tag{1}$$

28 Claims, 34 Drawing Sheets

U.S. PATENT DOCUMENTS

| | | | | |
|---|---|---|---|---|
| 5,361,819 A | * | 11/1994 | Glinz | 152/531 |
| 5,894,875 A | * | 4/1999 | Masaki et al. | 152/527 |
| 6,557,605 B2 | * | 5/2003 | Yukawa et al. | 152/531 |
| 6,568,445 B1 | * | 5/2003 | Kojima | 152/526 |
| 6,581,662 B2 | * | 6/2003 | Yukawa et al. | 152/527 |
| 6,609,552 B2 | * | 8/2003 | Miyazaki et al. | 152/527 |

FOREIGN PATENT DOCUMENTS

| | | | |
|---|---|---|---|
| EP | 1203672 A2 | | 5/2002 |
| EP | 1207055 A2 | | 5/2002 |
| JP | 62-251203 A | | 11/1987 |
| JP | 02-147407 A | | 6/1990 |
| JP | 03-204306 A | | 9/1991 |
| JP | 05162509 | * | 6/1993 |
| JP | 06-234304 A | | 8/1994 |
| JP | 07108803 | * | 4/1995 |
| JP | 2782523 B2 | | 5/1998 |
| JP | 2001039114 | * | 2/2001 |
| JP | 2001-180225 A | | 7/2001 |
| JP | 2001-322405 A | | 11/2001 |
| JP | 2002-079806 A | | 3/2002 |
| JP | 2002-096606 A | | 4/2002 |

* cited by examiner

PNEUMATIC RADIAL TIRE

This application is the national phase under 35 U.S.C. § 371 of PCT International Application No. PCT/JP02/05759 which has an International filing date of Jun. 10, 2002, which designated the United States of America.

TECHNICAL FIELD

The present invention relates to a pneumatic radial tire making it possible to decrease road noise while reducing deterioration in transit noise and rolling resistance.

BACKGROUND ART

As illustrated in FIG. 41, it has been hitherto suggested for a pneumatic tire to dispose a band layer g wherein low-elastic band cords made of, e.g., nylon are arranged in the circumferential direction of the tire outside a belt layer b. In recent years, as this band layer g, a band ply f has been used, the ply f being formed by winding a small-width and belt-form ply c, wherein the band cords are stretched and arranged in parallel and coated with a rubber, spirally on the outside of the belt layer. In this band layer g, the band cords arranged substantially along the equator of the tire fastens and restricts the belt layer b. It is known that this causes the suppression of a rise of ends of the belt layer b (the so-called lifting) at the time of high-speed traveling and an improvement in high-speed durability.

When such a band layer is deposited, the power of restraining the belt layer is raised up so that the rigidity of the tread face is made high. Thus, it has been made evident that, for example, road noise (noise in a car) of about 250 Hz in frequency is decreased and, depending on the arrangement of the band, transit noise (noise outside the car) is also decreased. It has been made clear that, in particular, the noise decreasing effects can be made larger by adjusting the modulus.

In other words, the band ply intends to improve the high-speed durability of the tire as described above, but it has been made evident that road noise (noise in a car), transit noise (noise outside the car), which is heard outside the car, the rolling resistance thereof, and so on change to some degree depending on the specification of the band ply, for example, the adaptation of high-modulus cords made of, for example, polyethylene naphthalate.

As this band ply, a full band ply, which covers almost all width of a belt layer, and an edge band ply, which covers only both ends of a belt layer, are known. There are pneumatic radial tires using only a full band ply, pneumatic radial tires using an edge band ply, and pneumatic radial tires using a full band ply and an edge band ply. Practical use and development of such a band ply are essential, in particular, for high performance tires.

DISCLOSURE OF THE INVENTION (Basic Invention)

Thus, road noise, transit noise and rolling resistance were researched and developed. As a result, it has been found out that when elongation resistance value K of a band ply which is defined by the following equation (1) is used as a parameter, the elongation resistance value K has a correlation with road noise, transit noise and rolling resistance:

$$K = S \times M \times D / 100 \tag{1}$$

wherein S represents the sectional area (mm$^2$) of each of the band cords, M represents the modulus (N/mm$^2$) when the elongation of each of the band cords is 2%, and D represents the band cord arrangement density per cm of the ply width (cord number/cm).

The band layer is formed by winding a tape- and belt-form ply, wherein one or more band cords are stretched and arranged and then embedded in a topping rubber, spirally. This basic invention can be applied to respective high performance pneumatic radial tires using only a full band ply, only an edge band ply, and a full band ply and an edge band ply. It has been found out that the elongation resistance value K (unit: N' cord number/cm) of the respective band plies is set within the range of 99 to 700 and this range is a range making it possible to produce a band layer which can be used in a high performance pneumatic radial tire, and such a range gives in substantially preferable results, for tires, about road noise, transit noise and rolling resistance.

(First Invention)

In the case that the band ply is a full band ply, which is used in many cases since the ply has superior dimensional stability when it is subjected to vulcanization forming, the basic invention in this case is named a first invention.

In the case that this full band ply is used, it has been found out that, as shown in FIG. 4, the degree of deterioration in transit noise and rolling resistance tend to increase, while the degree of decrease in road noise tend to decease as the elongation resistance value K increases. By forming a band ply with an elongation resistance value K within a range such that the deterioration degree of transit noise and rolling resistance is gentle and the decrease degree of road noise is sharp, the elongation resistance value K calculated by the equation (1) is set within the range of 99 to 334 in the case of the full band ply of the first invention in order to exhibit the road noise decreasing effect effectively while keeping the increase in transit noise and rolling resistance below a minimum tolerance limit, thereby giving an optimal performance balance.

This results in a relief of an inconvenience that in the case where a band layer of a full band ply is used in conventional pneumatic radial tires to decrease road noise, transit noise and rolling resistance increase.

That is, an object of the first invention is to provide a pneumatic radial tire capable of bringing out the effect of decreasing road noise effectively while deterioration in transit noise and rolling resistance is kept below a minimum tolerance limit, wherein the elongation resistance value K of a full band ply is set within a given range as a basic manner.

Furthermore, in the first invention, the number of band cords of the belt ply is J (two or more), and further the full band ply is characterized in that in a band central area having a width corresponding to 20 to 80% of the belt layer width BW, the center of which area is the equator of the tire, the band cord(s), the number of which is at least one, that is, j, is/are cut from the belt ply.

By setting as described above in a full band ply, it is possible in a tire having the full band ply to decrease road noise (noise in a car) and prevent increase in transit noise (noise outside the car) and the rolling resistance of the tire.

(Second Invention)

In the case that the above-mentioned band ply is an edge band ply, which intends to prevent the lifting of a belt layer at both ends thereof, the basic invention in this case is named a second invention.

It has been found out that the use of this edge band ply is effective for decreasing not road noise (noise in a car) but transit noise (noise outside the car), which is different from the case of the full band ply. This edge band ply consists of a pair of right and left band plies which cover both ends of a belt layer, and further, by regulating the elongation resistance value K calculated from the equation (1) within a given range, transit noise (noise outside the car) and road noise (noise in a car) can be effectively decreased.

Provided is a pneumatic radial tire wherein the elongation resistance value K, and the width ratio of the edge band ply width Wb to the belt layer width WB (Wb/WB) are set as follows:

a) the edge band ply is made in such a manner that the elongation resistance value K is set within the range of 120 or more and less than 246 and the width ratio Wb/WB is set wherein the range of 0.2 or more and 0.5 or less, or b) the elongation resistance value K is set within the range of 246 or more and less than 276 and the width ratio Wb/WB is set within the range of more than 0 and 0.5 or less, or c) the elongation resistance value K is set within the range of 276 or more and 450 or less and further the width ratio Wb/WB is set within the range of more than 0 and 0.41 or less.

The edge band ply is made as follows:

d) the elongation resistance value K is set within the range of 120 or more and less than 246 and further the width ratio Wb/WB is set within the range of 0.41 or more and 0.5 or less, or e) the elongation resistance value K is set within the range of 246 or more and 450 or less and further the width ratio Wb/WB is set within the range of more than 0 and 0.14 or less.

In this way, the edge band ply is used in the second invention to decrease transit noise and road noise.

(Third Invention)

In the case that the band ply uses both of a full band ply and an edge band ply, which is separated at the center and covers both ends of a belt layer, the basic invention in this case is referred to as a third invention. It has been found that by setting the elongation resistance value K from the (1) equation to 110–386, the full band ply causes a decrease in road noise and further the edge band ply prevent increase in transit noise (noise outside a car), which is heard outside the car, and rolling resistance.

In order to produce the above-mentioned effects and advantages in the pneumatic tire of the third invention, about the elongation resistance value K (unit: N' cord number/cm$^2$) of the edge band ply and the width ratio of the edge band ply width Wb to the belt layer width WB (Wb/WB), in the case that the elongation resistance value K is 110 or more and 170 or less, the width ratio (Wb/WB) can be set to more than 0 and less than 0.5, in the case that the elongation resistance value K is more than 170 and 280 or less, the width ratio (Wb/WB) can be set to more than 0 and 0.07 or less, or set to 0.47 or more and less than 0.5, and in the case that the elongation resistance value K is more than 280 and 386 or less, the width ratio (Wb/WB) can be set to 0.47 or more and less than 0.5.

In another embodiment, in the case that the elongation resistance value K is 110 or more and 280 or less, the width ratio (wb/WB) can be set to more than 0 and less than 0.5 or less, in the case that the elongation resistance value K is more than 280 and less than 340, the width ratio (Wb/WB) can be set to more than 0 and 0.4 or less, and in the case that the elongation resistance value K is more than 340 and 386 or less, the width ratio (Wb/WB) can be set to more than 0 and less than 0.28.

In a further embodiment, in the case that the elongation resistance value K is 110 or more and 170 or less, the width ratio (Wb/WB) can be set to more than 0 and 0.5 or less, and in the case that the elongation resistance value K is more than 170 and 280 or less, the width ratio (Wb/WB) can be set to more than 0 and 0.07 or less, or 0.47 or more and less than 0.50.

The above-mentioned structure makes it possible to exhibit the effect of decreasing road noise effectively while keeping transit noise and rolling resistance below a minimum tolerance limit in a pneumatic radial tire having a full band ply and an edge band ply.

From further repeated researches on band plies, it has been found out that when a band layer has a full band ply, the winding pitches of belt-form plies are made different between the center of the tread portion thereof and both outside portions thereof, thereby decreasing road noise while suppressing increase in transit noise at a lowest level more effectively.

That is, a band ply comprises high density portions wherein the winding pitch of its belt-form plies is 1.0 time or less the width of the belt-form plies and a low density portion formed between the high density portions wherein the winding pitch of the belt-form plies is from 1.2 to 2.6 times the width of the belt-form ply, and at this time the elongation resistance value K (unit: N' cord number/cm) is set to from 130 to 700. This can be applied to each of the first and third inventions as long as the elongation resistance values K thereof overlap. (This invention is referred to as the "invention about density change".)

From results of further development on band plies, it has been found out that as illustrated in FIG. 42, in a band ply wherein high-modulus band cords are adopted, a rubber exfoliation j is readily generated between a winding terminal portion c1 which constitutes a one-circumference portion ahead of the winding terminal of a belt-form ply c and a belt-form ply c2 wound inside it. (Such a damage may be referred to as a "belt edge looseness" hereinafter.) It has been made evident that this rubber exfoliation j is formed as follows: an exfoliation starts from a microscopic rubber exfoliated portion a1 generated near outer end be of a belt layer b, which has a poor adhesion to the rubber, and then the exfoliation grows between the winding terminal portion c1 of the belt-form ply c, at which restraining power is readily lowered since the end is free, and a belt-form ply c2 so as to reach an outer face position a2 of the band ply f.

For this reason, in a tire having a belt ply in which the elongation resistance value K (unit: N' cord number/cm) thereof is from 166 to 467 (this can be applied to the respective inventions as long as the elongation resistance values K of the first to the third inventions overlap), the tire being a pneumatic tire wherein the above-mentioned band ply is positioned in such a manner that a winding terminal portion which constitutes a one-circumference portion ahead of the winding terminal of the above-mentioned belt-form ply does not directly contact the outer end, along the tire axial direction, of the above-mentioned belt layer, at least one portion of a winding starting end portion which constitutes a one-circumference portion in the rear of the winding starting end of the belt-form ply is covered with a belt-form ply wound afterwards, and the winding terminal portion is disposed outside the outer end of the belt layer in the tire axial direction. (This invention is referred to as the "invention about overlap of a band with a belt layer".)

BEST MODES FOR CARRYING OUT THE INVENTION

An embodiment of this basic invention will be described, giving the first invention as an example hereinafter.

Figure 1:
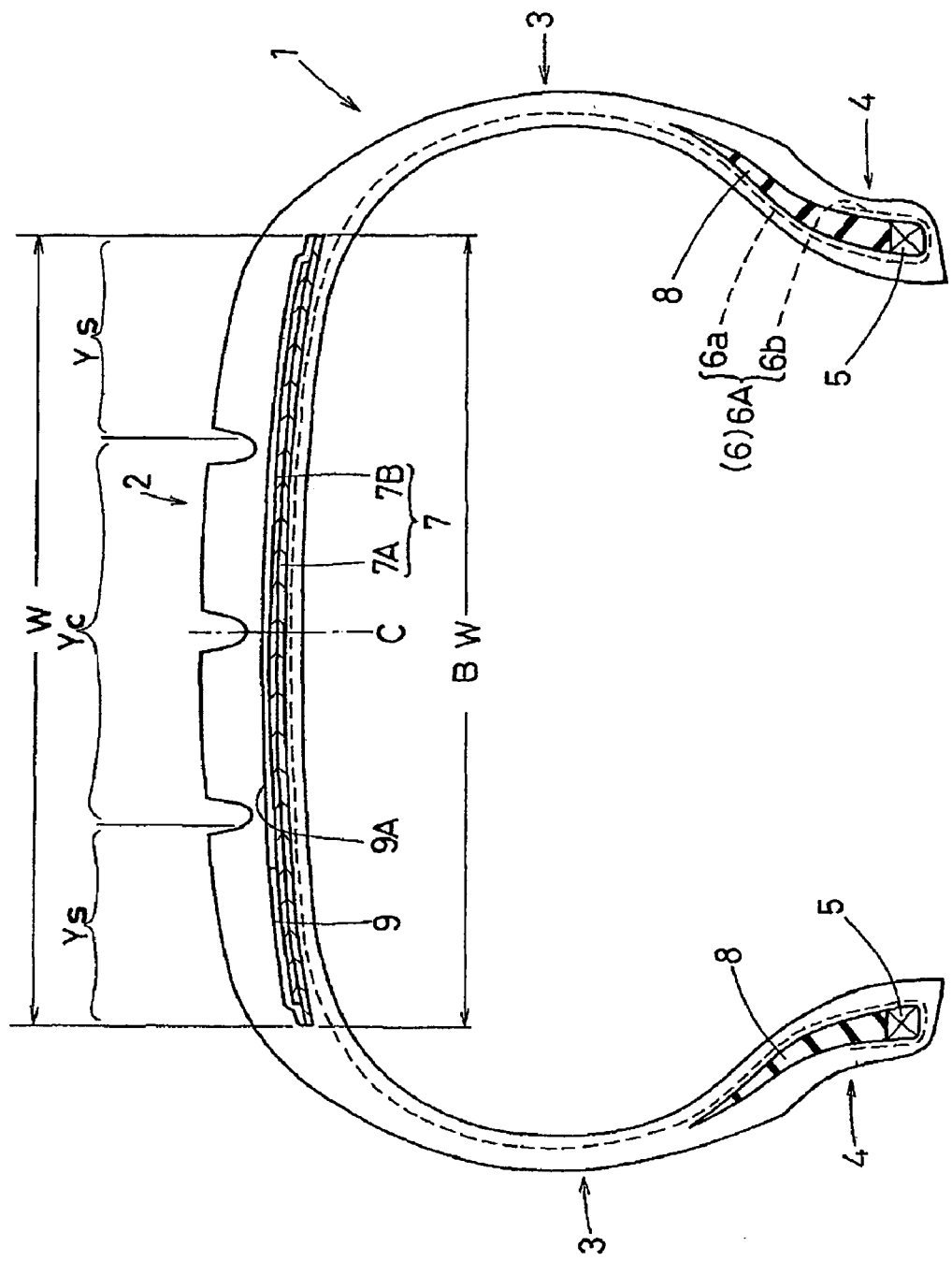
FIG. 1 is a sectional view illustrating an example of the pneumatic radial tire of the present invention.

FIG. 1 is a meridian section of a pneumatic radial tire of the present embodiment. In FIG. 1, a pneumatic radial tire 1 (referred to as the tire 1 hereinafter) has a carcass 6 which extends from a tread portion 2 through a side wall portion 3 to a bead core 5 of a bead portion 4, a belt layer 7 arranged inside the tread 2 and outside the carcass 6 along the direction of the radius thereof, and a band layer 9 arranged outside the belt layer 7 along the direction of the radius thereof.

The carcass 6 is composed of one or more carcass plies, one carcass ply 6A in the present example, wherein carcass cords are arranged at an angle of, for example, 75° to 90° to a tire equator C. This carcass ply 6A has folded portions 6b, which are each folded from the inside to the outside around the bead core 5, at both ends of a body portion 6a spreading over the bead cores 5 and 5, and further a bead apex rubber 8 for reinforcing the bead, which extends in a tapered form from the bead core 5 to the outside along the tire radius direction, is arranged between the body portion 6a and the folded portion 6b.

As the carcass cords, polyester cords are adopted in the present example. Besides this, organic fiber cords made of nylon, rayon, aramide or the like maybe adopted. If necessary, steel cords may be adopted.

The belt layer 7 is formed in such a manner that two or more belt cords, two belt plies 7A and 7B in the present example, which are arranged at an angle of, for example, 15 to 45° to the tire equator C, are overlapped in such a direction that the cords cross each other. The ply width of the belt ply 7A which is inside along the radius direction is made larger that of the outside belt ply 7B, whereby this ply width is made up to the width BW of the belt layer 7. As the belt cords, steel cords are adopted in the present example. If necessary, however, high-modulus organic fiber cords made of polyethylene naphthalate (PEN), polyethylene terephthalate (PET), aromatic polyamide or the like may be used.

In the present embodiment, the band layer 9 is made of one full band ply 9A covering almost all of the width of the belt layer 7 in order to keep the dimensional stability of the tire high at the time of vulcanization forming or use of the tire. The words "almost all of the width" mean that the ply covers 95% or more of the width BW of the belt layer 7. In the present example, the width W of the full band ply 9A is substantially equal to the width BW of the belt layer 7.

In the present description, the size of each of members or portions is a value obtained by measurement in an unloaded state in which the tire 1 is integrated with a regular rim and a regular internal pressure is applied to the tire. The words "regular rim" is a rim specified for each of tires in a standard system including a standard which the tires are based on. For example, the regular rim is a standard rim according to JATMA, is a "design rim" according to TRA, or is a "measuring rim" according to TRTO. The words "regular internal pressure" is an air pressure specified for each of tires in a standard system including a standard which the tires are based on. The regular internal pressure is the highest air pressure according to JATMA, is the maximum value described in Table "TIRE LOAD LIMITS AT VARIOUS COLD INFLATION PRESSURES" according to TRA, or is an "inflation pressure" according to ETRTO. In the case that a tire is for a passenger car, the regular pressure is set to 180 KPa.

Figure 2A:
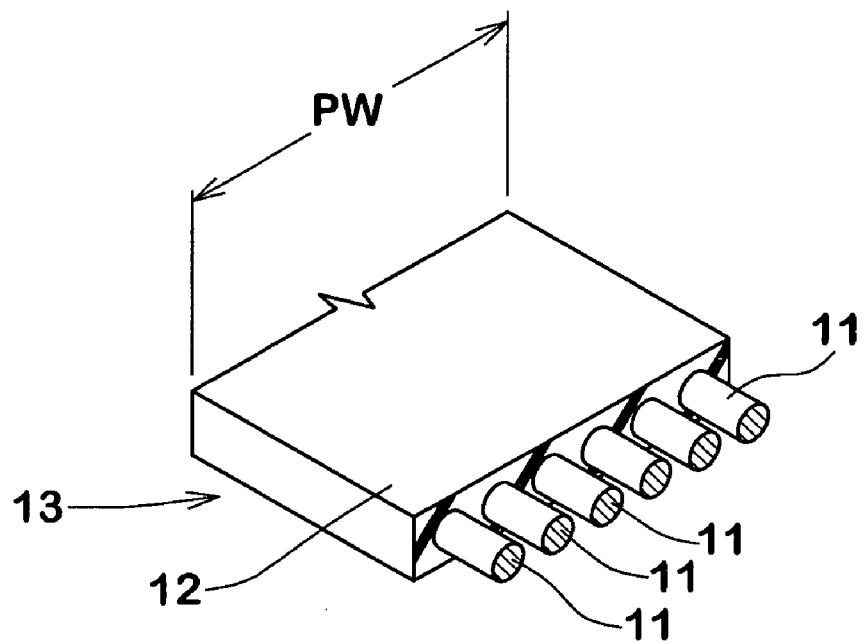
FIG. 2(A) is a perspective view illustrating a belt-form ply used in a band layer.
Figure 2B:
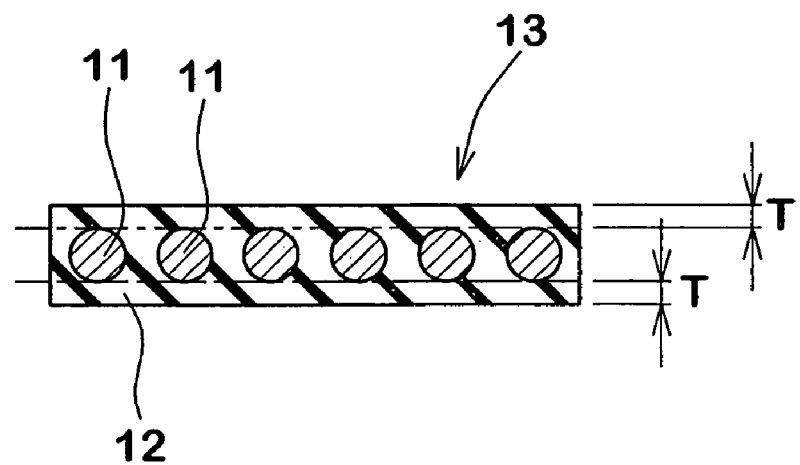
FIG. 2(B) is a sectional view thereof.

As illustrated in FIG. 2(A) and FIG. 2(B), which is a sectional view thereof, the full band ply 9A is formed by winding a tape- and belt-form ply 13, wherein one or more (for example, about 3 to 10) stretched and arranged band cords 11 are embedded in a topping rubber 12, spirally. The angle between this band ply 13 and the circumferential direction of the tire is set to 5 degrees or less. The full band ply 9A formed by such spiral winding of the belt-form ply 13 has the so-called jointless structure, which has no joint; therefore, the full band ply 9A serves for superior uniformity of the tire and firm and sure restraint of the belt layer 7. As illustrated in FIG. 2(B), in the belt-form ply 13, the thickness T (thickness from the outer face of the band cords 11, which is shown by an imaginary line, to the outer face of the belt-form ply 13) of the topping rubber 12 is preferably from 0.7 to 1.5 mm, more preferably from 0.7 to 1.3 mm. In the present example, the belt-form ply 13 whose width PW is about 10 mm is used.

Figure 3A:
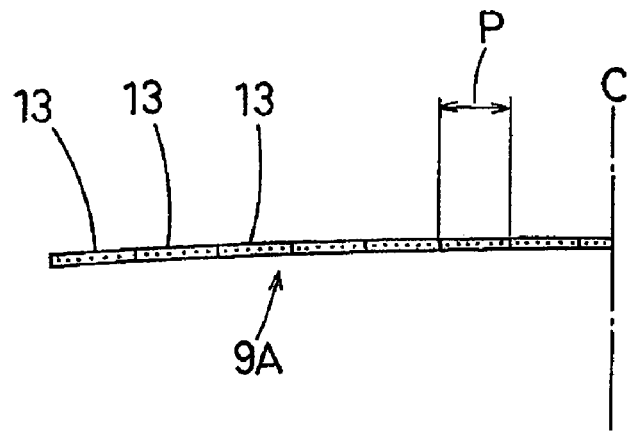
FIGS. 3(A) to (C) are sectional views illustrating a manner of winding a belt-form ply.
Figure 3B:
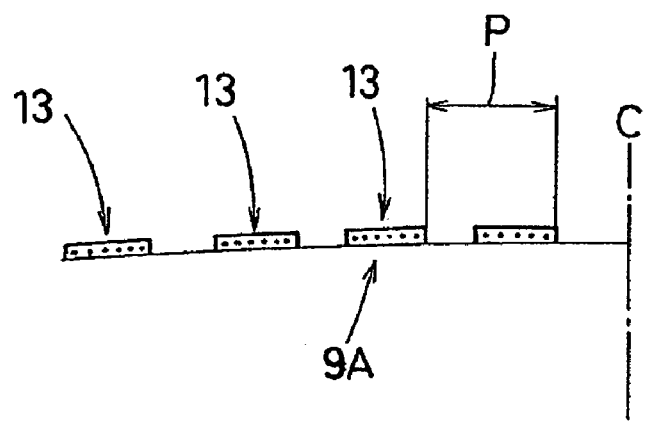

When the belt-form ply 13 is spirally wound on the outside of the belt layer 7, it is preferred for the uniformity thereof to perform the winding in such a manner that adjacent side edges of the belt-form ply 13 contact each other, as illustrated in FIG. 3(A). However, it is possible to select the pitch P in the tire axial direction and adopt various winding manners, for example, the manner of separating the side edges from each other and winding the ply, or the manner of overlapping the side edges and winding the ply, as illustrated in FIGS. 3(B) and (C).

As the band cords 11, for example, organic fiber cords are preferably used. In order to obtain a better effect of decreasing road noise, preferred are high-modulus organic fiber cords made of polyethylene naphthalate (PEN), polyethylene terephthalate (PET), aromatic polyamide, polyparaphenylenebenzobisoxazole (PBO) or the like, and composite cords wherein two or more organic fiber filaments, made of PEN+aromatic polyamide, aromatic polyamide+PBO or the like, are twisted. More specifically, preferred are organic fiber cords having a 2% modulus of 100 (N/mm$^2$) or more, preferably 12000 (N/mm$^2$) or more.

Figure 3C:
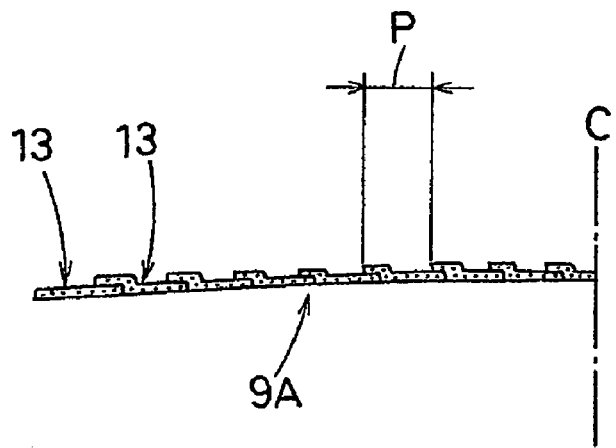

In order to suppress deterioration in transit noise and rolling resistance, based on the use of such organic fiber cords having a high modulus, at a minimum level, the elongation resistance value K of the full band ply 9A, decoded by the following equation (1), is set within the range of 99 to 700 in the basic invention, and is set within the range of 99 to 334 in the first invention using a single full band ply.

$$K = S \times M \times D / 100 \qquad (1)$$

wherein S represents the sectional area (unit: mm$^2$) of each of the band cords, M represents the modulus (unit: N/mm$^2$) when the elongation of each of the band cords is 2%, and D represents the band cord arrangement density per cm of the width of the full band ply (unit: cord number/cm). The modulus M is a value measured according to JIS L1017. The arrangement density D is a value obtained by dividing the number of the band cords arranged in the length P (cm) of one pitch of the spiral winding, as illustrated in FIG. 3, by the pitch length P.

The sectional area S of the band cords 11 is preferably, for example, 0.05 (mm$^2$) or more, more preferably 0.08 (mm$^2$) or more, and still more preferably from 0.13 to 0.35 (mm$^2$). If the sectional area S of the band cords 11 is too small, it is necessary to make the 2% modulus of the band cords and/or the arrangement density, or the like remarkably larger in order to make the elongation resistance value K high. Conversely, if the sectional area S of the band cords 11 is too large, the formability of the tire tends to deteriorate.

The arrangement density D of the band cords is preferably, for example, from 5 to 20 (cord number/cm), more preferably from 6 to 18 (cord number/cm) and still more preferably from 7 to 17 (cord number/cm). If the arrangement density D of the band cords 11 is too small, the 2% modulus of the band cords and/or the sectional area thereof tend to be remarkably large in order to make the elongation resistance value K high. As a result, the production costs of the tire increase, and the durability of the tire deteriorates. Conversely, if the arrangement density D is too large, the rubber adhesion to the band cords 11 deteriorates so that the durability of the tire may fall, and for example, looseness tend to be caused.

The elongation resistance value K is a value representing an index of the resistance against elongation per unit width and unit length of the full band ply 9A. As this value K is larger, the power of restraining the belt layer 7 is larger.

The inventors manufactured various tires whose elongation resistance value K was varied by way of trial and used the elongation resistance value K as a parameter to research relationships with road noise, transit noise, and rolling resistance (注：ここは K 値とRN, TN, RR との関係という意味と考えこのように修正しました). As a result, the inventors have found out that when the elongation resistance value K is limited within a given range, the effect of decreasing road noise can be effectively exhibited while deterioration in transit noise and rolling resistance is kept below a minimum tolerance limit.

Figure 4:
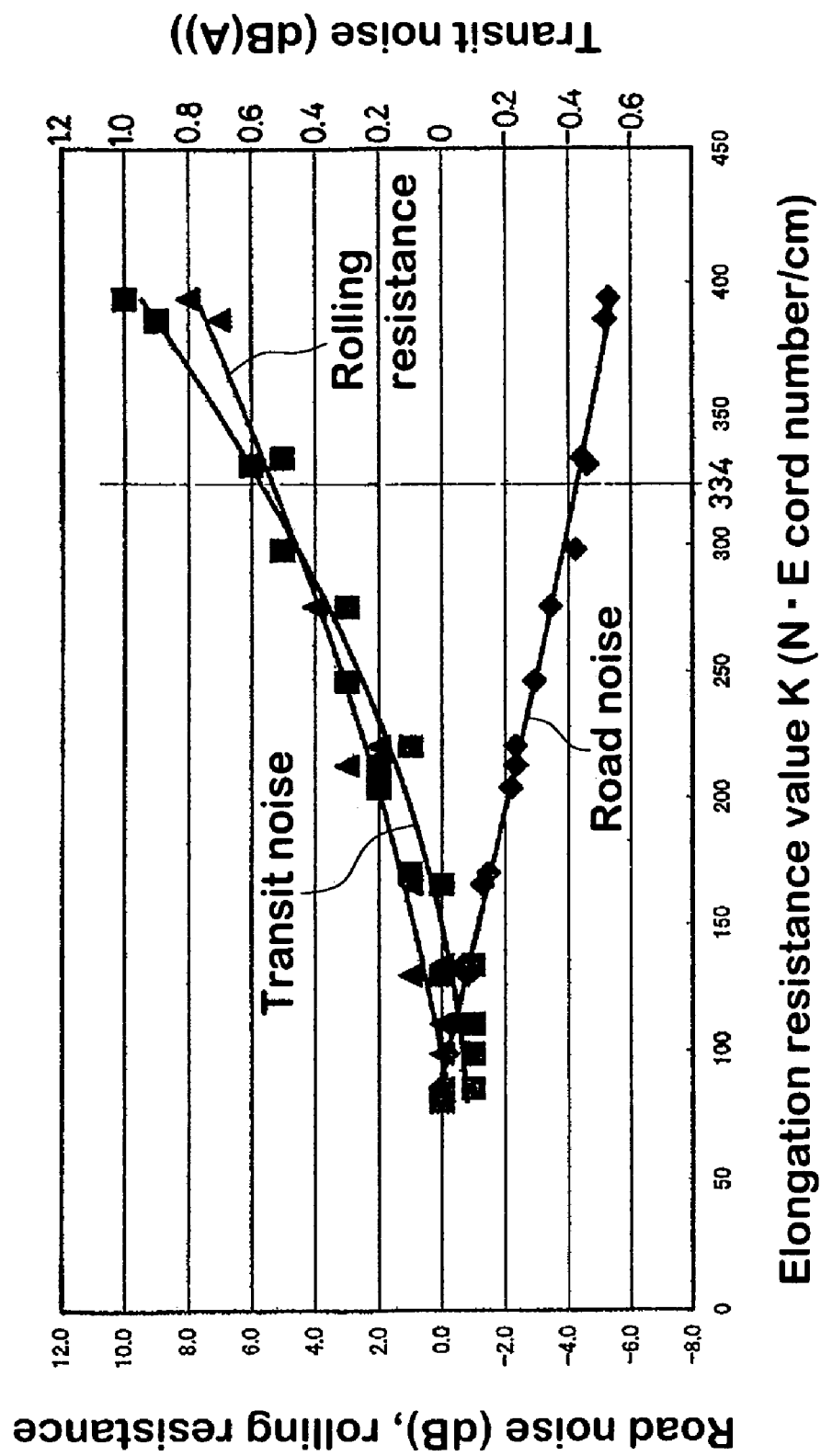
FIG. 4 is a graph showing a relationship between road noise, transit noise and rolling resistance using elongation resistance value K as a parameter.
Figure 5:
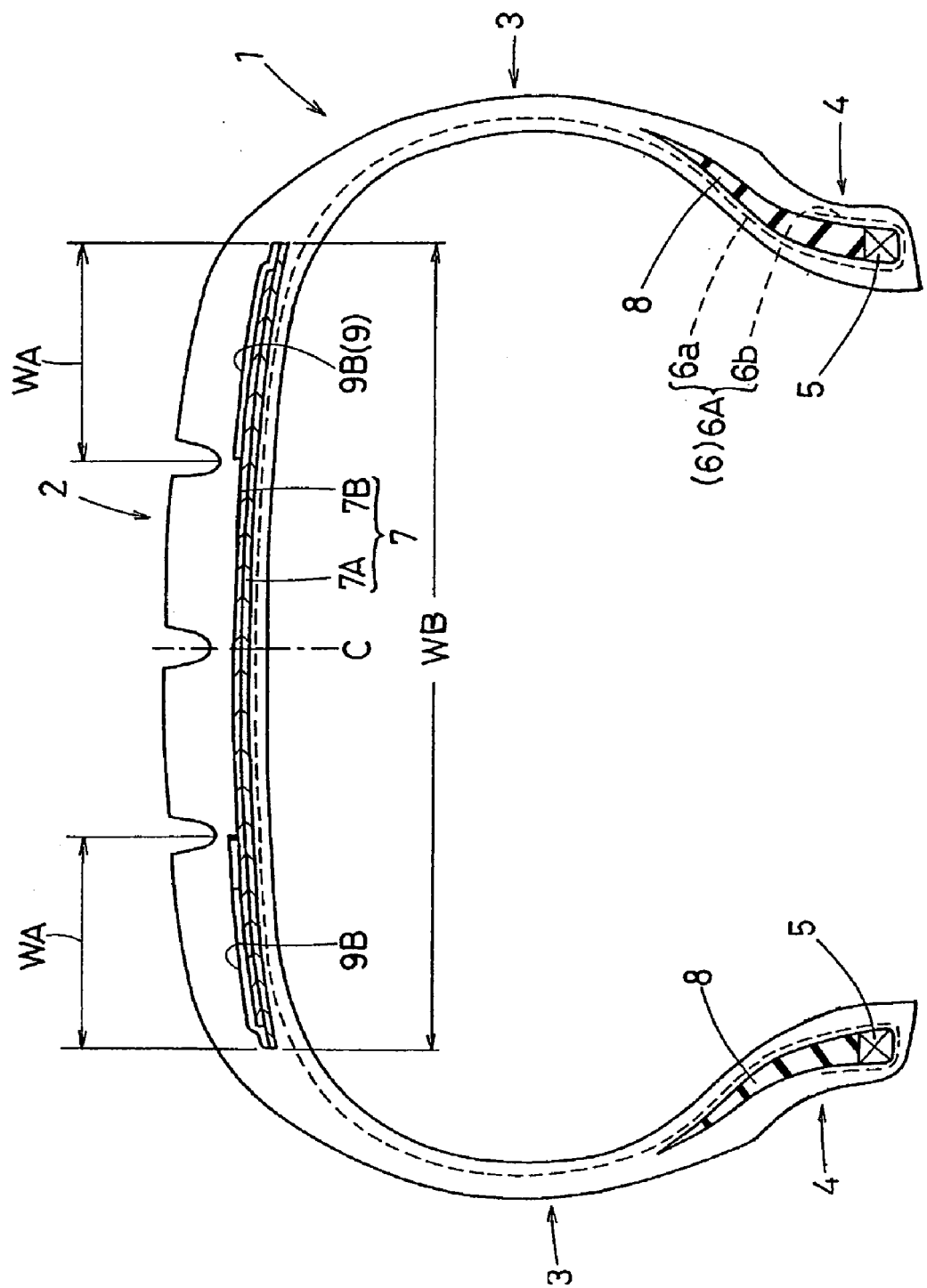
FIG. 5 is a sectional view illustrating an example of the pneumatic radial tire of the present invention.

FIG. 4 shows an example of the relationships with road noise, transit noise, and rolling resistance using the elongation resistance value K as a parameter. This figure demonstrates that as the elongation resistance value K becomes larger, the road noise gets lower and the transit noise and rolling resistance get worse. However, as is understood from approximation curves of the experimental values, as the elongation resistance value K gets larger, the degree (curve inclination) of the decrease in the road noise tends to become smaller and the degree of the deterioration in the transit noise and the rolling resistance tend to become higher.

Accordingly, by using the tire within such a range that the degree of the decrease in the road noise and the degree of the deterioration in the transit noise and the rolling resistance do not yet start to change abruptly, that is, the range of $K \leq 334$, the decrease in the road noise and the suppression of the deterioration in the transit noise and the rolling resistance can be most effectively attained.

If the elongation resistance value K is less than 99, the effect of decreasing the road noise is insufficient. Conversely, if the value K is more than 334, in particular, the transit noise and the rolling resistance deteriorate abruptly. Accordingly, from the viewpoint of the effect of decreasing the road noise, the elongation resistance value K is preferably from 166 to 334, more preferably from 204 to 334, and still more preferably from 298 to 334.

In the basic invention, (which may be referred to as the present invention), individual values of the sectional area S, the modulus M and the arrangement density D are not particularly limited. The modulus M is preferably 1000 $N/mm^2$ or more, more preferably 12000 $N/mm^2$ or more. If this modulus M is too small, the sectional area S and the arrangement density D get large in order to make the elongation resistance value K high. As a result, the forming of the tire is apt to be difficult, and the durability thereof is apt to deteriorate.

The sectional area S is preferably 0.05 $mm^2$ or more, more preferably 0.08 $mm^2$ or more, and still more preferably from 0.13 to 0.35 $mm^2$. If the sectional area S is too small, it is necessary to make the modulus M and the arrangement density D large in order to make the elongation resistance value K high. As a result, raw material is not easily selected. Moreover, the same inconveniences as described above are caused. Conversely, if the sectional area S is too large, the formability of the tire tends to fall.

The arrangement density D is preferably from 4 to 16 (cord number/cm), more preferably from 7 to 13 (cord number/cm). If the arrangement density D is too small, the sectional area S and the modulus M get large in order to make the elongation resistance value K high. Thus, the production costs of the tire increase, and the durability of the tire deteriorates. Conversely, if the arrangement density D is too large, the rubber adhesion deteriorates so that the durability of the tire tends to fall.

Next, about the full band ply 9A, the elongation resistance value K can be substantially constant over the entire width of the full band ply 9A, as attained in the present example. Within the above-mentioned range of 99 to 334, the elongation resistance value Kc of the band central area Yc near the tire equator C can be made different from the elongation resistance value Kc of band outside areas Ys outside it. In particular, in the case of Kc<Ks, transit noise can be improved while keeping above-mentioned effect of suppressing deterioration in road noise and rolling resistance.

The band central area Yc means a width area corresponding to 20 to 80% of the width BW of the full band ply 9A, the center of the width area being the tire equator C. The areas outside it are referred to as the band outside areas Ys.

Means for setting the elongation resistance values to Kc<Ks are as follows:

(1) The pitch P in the tire axial direction of the spiral winding of the belt-form ply 13 in the band central area Yc is made larger than the pitch P of the spiral pitch in the band outside areas Ys, and (2) The band cords, the number of which is j, are cut off from the belt-form ply 13 in the band central area Yc.

In this way, the arrangement density D can be changed. In either case, at least the band cords 11 in the band central area Yc are continuous to the band cords 11 in the band outside areas Ys.

The means (2) of these means can be preferably carried out from the viewpoints of the uniformity of the tire, stability of the tire shape, productivity, and so on since the cord angle of the band cords 11 does not change between the band central area Yc and the band outside areas Ys.

This band layer 9 is advantageous for transit noise since the band layer 9 relieves the rigidity of the band central area Yc to make enveloping property high. For this purpose, the elongation resistance value Kc of the band central area Yc is preferably 0.9 time or less the elongation resistance value Ks of the band outside areas Ys. For this purpose, the number j of the band cords which should be cut is set to 0.05 time or more and 0.5 time or less, preferably 0.08 to 0.20 time the number J of the band cords 11 of the belt-form ply 13.

However, in the case that the elongation resistance value Kc is excessively lowered, the band-restraining power decreases so that the tread surface in the band central area Yc becomes round. As a result, change in the tire shape gets large when the tire contacts the ground. Therefore, this case is disadvantageous for the rolling resistance. Thus, the elongation resistance value Kc is preferably 0.5 time or more the elongation resistance value Ks, as described above. Accordingly, the number j is set to 0.5 time or less, preferably 0.2 time or less the number J.

(The second Invention)

About the second invention in the basic invention, an embodiment thereof will be described.

The second invention has the same structure as the pneumatic tire of the first invention except the band layer 9. Thus, description thereon is omitted.

The band layer 9 of the second invention is composed of a pair of right and left edge band plies 9B and 9B covering both ends of the belt layer 7. This is because the weight of the edge band plies 9B is smaller than that of the full band ply covering the whole of the belt layer 7 and further deterioration in transit noise can be suppressed at a low level while exhibiting the effect of decreasing road noise at substantially the same level. Additionally, the edge band ply 9B is arranged in such a manner that the outer end along the tire axial direction is substantially consistent with the outer ends of the broad belt plies 7A.

The band layer 9 has the same structure as in the first invention. For example, the edge band ply 9B is formed by winding the belt-form ply 13 spirally along the tire circumferential direction. Thus, description on the same structure as in the band layer of the first invention is in principle omitted herein.

In order to suppress deterioration in transit noise by using such high-modulus organic fiber cords as much as possible, the band layer 9 is composed of the edge band plies 9B and 9B, and about the elongation resistance value K of the edge band ply 9B and the width ratio of the edge band ply width Wb to the belt layer width WB (Wb/WB), the edge band ply 9B is regulated as follows:

(1) the elongation resistance value K is set within the range of 120 or more and less than 246 and further the width ratio Wb/WB is set within the range of 0.2 or more and 0.5 or less, (2) the elongation resistance value K is set within the range of 246 or more and less than 276 and further the width ratio Wb/WB is set within the range of more than 0 and 0.5 or less, or
(3) the elongation resistance value K is set within the range of 276 or more and 450 or less and further the width ratio Wb/WB is set within the range of more than 0 and 0.41 or less.

The present embodiment embraces a case in which the width ratio Wb/WB is 0.5, that is, the right and left edge band plies 9B and 9B substantially contact each other on the tire equator C, but is clearly distinguished from ordinary full band plies wherein band cords are continuous from one end thereof to the other end.

The inventors made various tires having different elongation resistance values K by way of trial, and researched effect on roads noise and transit noise when the elongation resistance value K and the width ratio Wb/WB were changed, respectively. The results are shown in FIGS. 6 and 7.

The elongation resistance value K of the trial tires was plotted along the x axis, the width ratio Wb/WB thereof was plotted along the y axis, and the road noise at this time was plotted along the z axis. FIG. 6 is a bird's eye view obtained by viewing, from the z axis direction, a three-dimensional relationship between the elongation resistance value K, the width ratio Wb/WB and the road noise, which relationship was obtained from the above-mentioned plotting. Curves in this graph correspond to contour lines of the road noise presumed from the respective plotted values. About the road noise, the standard thereof is a noise level (dB) of a 250-Hz band of Comparative Example 1 (an edge band ply made of nylon cords (elongation resistance value K: 80 N' cord number/cm, width ratio Wb/WB: 0.5)) in the second invention, which level is measured in a road noise test described in the column [Examples], which will be described later, and the road noise is represented by a change amount from this standard. Minus representations mean good cases wherein the road noise is smaller than those of Comparative Example 1.

Figure 6:
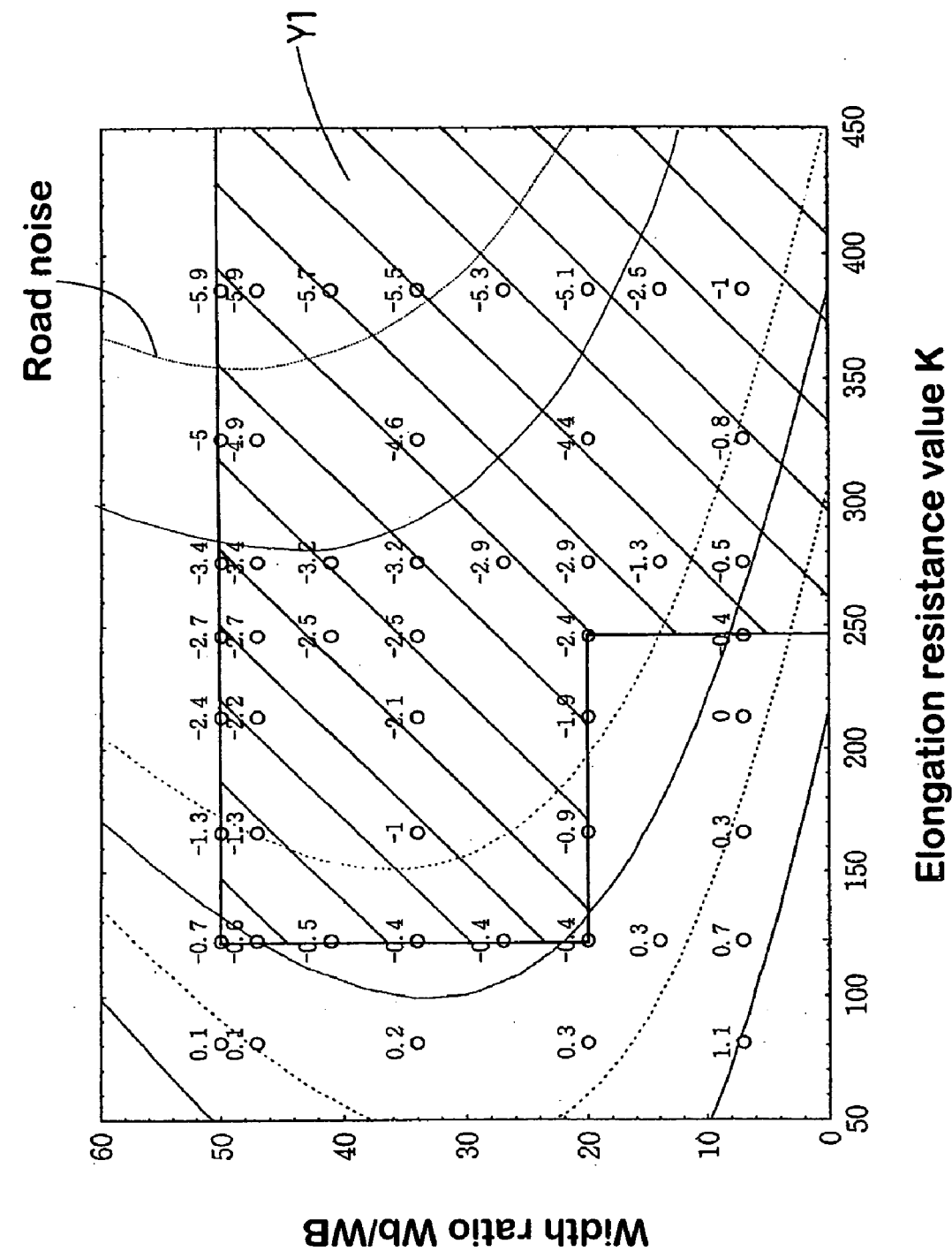
FIG. 6 is a graph showing a relationship between elongation resistance value K, width ratio Wb/WB, and road noise.
Figure 7:
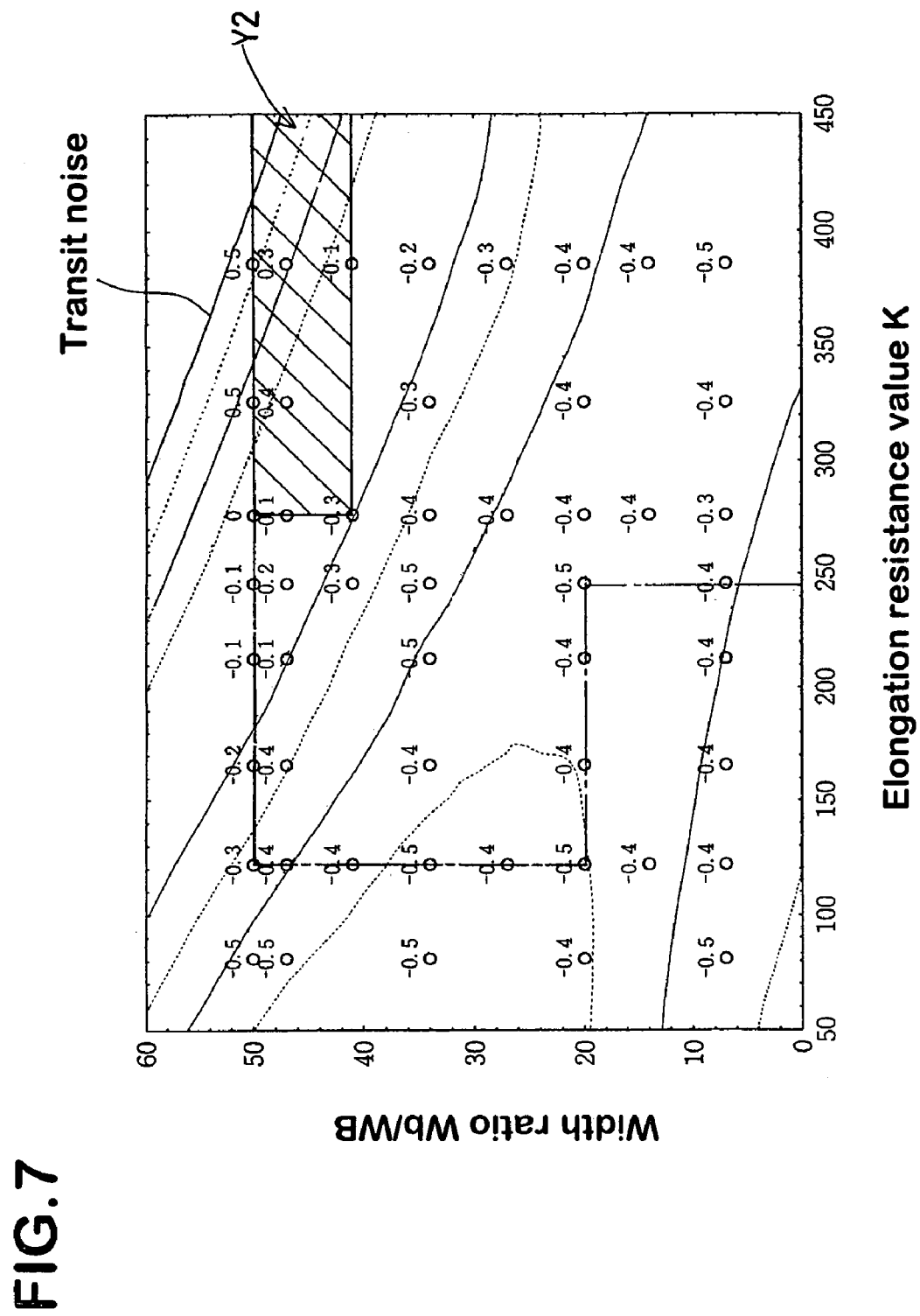
FIG. 7 is a graph showing a relationship between elongation resistance value K, width ratio Wb/WB, and transit noise.

As is evident from FIG. 6, in an area wherein the elongation resistance value K is large and the width ratio Wb/WB is large, the effect of decreasing the road noise is high. Thus, in an area Y1 shown by slanting lines, that is,
(a) the scope wherein the elongation resistance value K is 120 or more and less than 246 and the width ratio Wb/WB is 0.2 or more and 0.5 or less, and
(b) the scope wherein the elongation resistance value K is 246 or more and 450 or less and the width ratio Wb/WB is more than 0 and 0.5 or less,
a decreasing effect of at least −0.3 dB or more can be ensured.

The elongation resistance value K of the trial tires was plotted along the x axis, the width ratio Wb/WB thereof was plotted along the y axis, and the transit noise at this time was plotted along the z axis. FIG. 7 is a bird's eye view obtained by viewing, from the z axis direction, a three-dimensional relationship between the elongation resistance value K, the width ratio Wb/WB and the transit noise, which relationship was obtained from the above-mentioned plotting. Curves in this graph correspond to contour lines of the transit noise presumed from the respective plotted values. About the transit noise, in the same way the standard thereof is a maximum level dB (A) of the transit noise of the above-mentioned Comparative Example 1, which level is measured in the transit noise test described in the column [Examples], which will be described later, and the road noise is represented by a change amount from this standard. Minus representations mean good cases wherein the road noise is smaller than those of Comparative Example 1.

As is evident from FIG. 7, in an area wherein the elongation resistance value K is large and the width ratio Wb/WB is approximate to 0.5, the transit noise tends to deteriorate largely. Thus, it has been proved that in an area Y2 shown by slanting lines, that is,
(c) the scope wherein the elongation resistance value K is 276 or more and 450 or less and further the width ratio Wb/WB is more than 0.41 and 0.5 or less,
the road noise and the transit noise are not easily made compatible even in the case of the structure using the edge band ply 9B.

In other words, this means that in the area wherein the area Y2 is deleted from the area Y1, that is, in the above-mentioned areas (1), (2) and (3), the road noise and the transit noise can be made compatible. From this fact, the present invention has been found out.

However, the following has been proved from results of further researches made by the inventors: in the structure using the edge band ply 9B, a difference in the rigidity between a tread shoulder portion wherein the edge band ply 9B is arranged and a tread crown portion inside it becomes large, so that slip is easily caused when the tread contacts the ground; and the rolling resistance may deteriorate since the tread crown portion is made round so that the change amount of the tread gets large when the tread contacts the ground.

Figure 8:
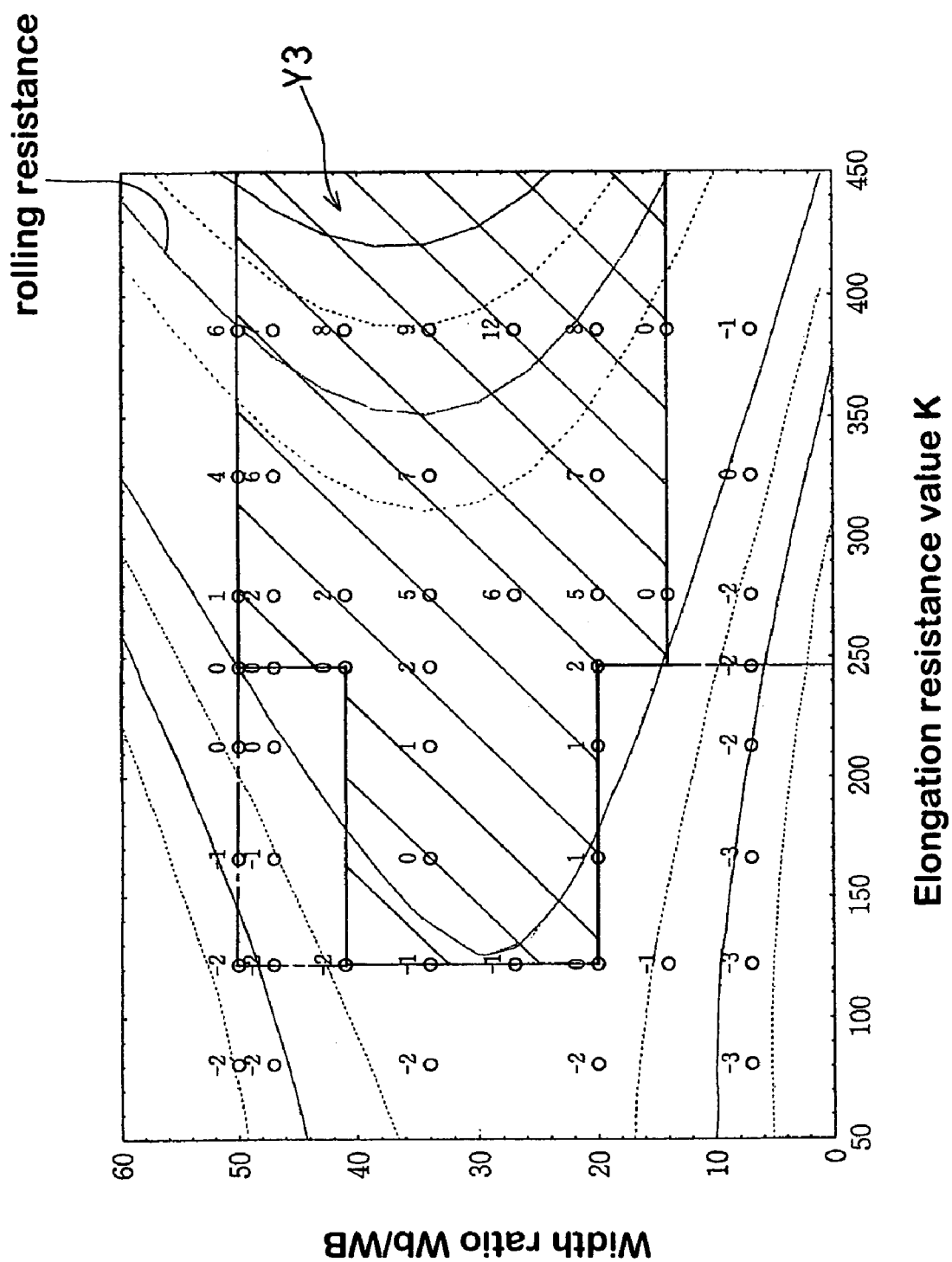
FIG. 8 is a graph showing a relationship between elongation resistance value K, width ratio Wb/WB and rolling resistance.

Thus, in the same way as described above the inventors researched effect on the rolling resistance when the elongation resistance value K and the width ratio Wb/WB were changed, respectively. As a result, as shown in FIG. 8, it has been proved that in the case that the width ratio Wb/WB is approximately 0.3 or any value near this center value 0.3, which case is general for edge band plies, the rolling resistance tends to get worse as the elongation resistance value K gets larger.

Accordingly, it has been proved that in an area Y3 shown by slanting lines, that is,
(d) the scope wherein the elongation resistance value K is 120 or more and less than 246 and further the width ratio Wb/WB is more than 0.2 and less than 0.41, and
(e) the scope wherein the elongation resistance value K is 246 or more and 450 or less and further the width ratio Wb/WB is more than 0.14 and 0.5 or less,
the road noise and the rolling resistance are not easily made compatible on the basis of the structure of the edge band ply 9B.

Therefore, in particular, in the area wherein the areas Y2 and Y3 are deleted from the area Y1, that is,
(4) the scope wherein the elongation resistance value K is 120 or more and less than 246 and further the width ratio Wb/WB is 0.41 or more and 0.5 or less, or
(5) the scope wherein the elongation resistance value K is 246 or more and 450 or less and further the width ratio Wb/WB is more than 0 and 0.14 or less,
the road noise, the transit noise and the rolling resistance can be made compatible.

(The Third Invention)

The third invention will be described giving an embodiment thereof as an example.

The third invention has the same structure as the pneumatic tire of the first invention except the band layer 9. Thus, description on the structures other than the band layer is in principle omitted.

Figure 9:
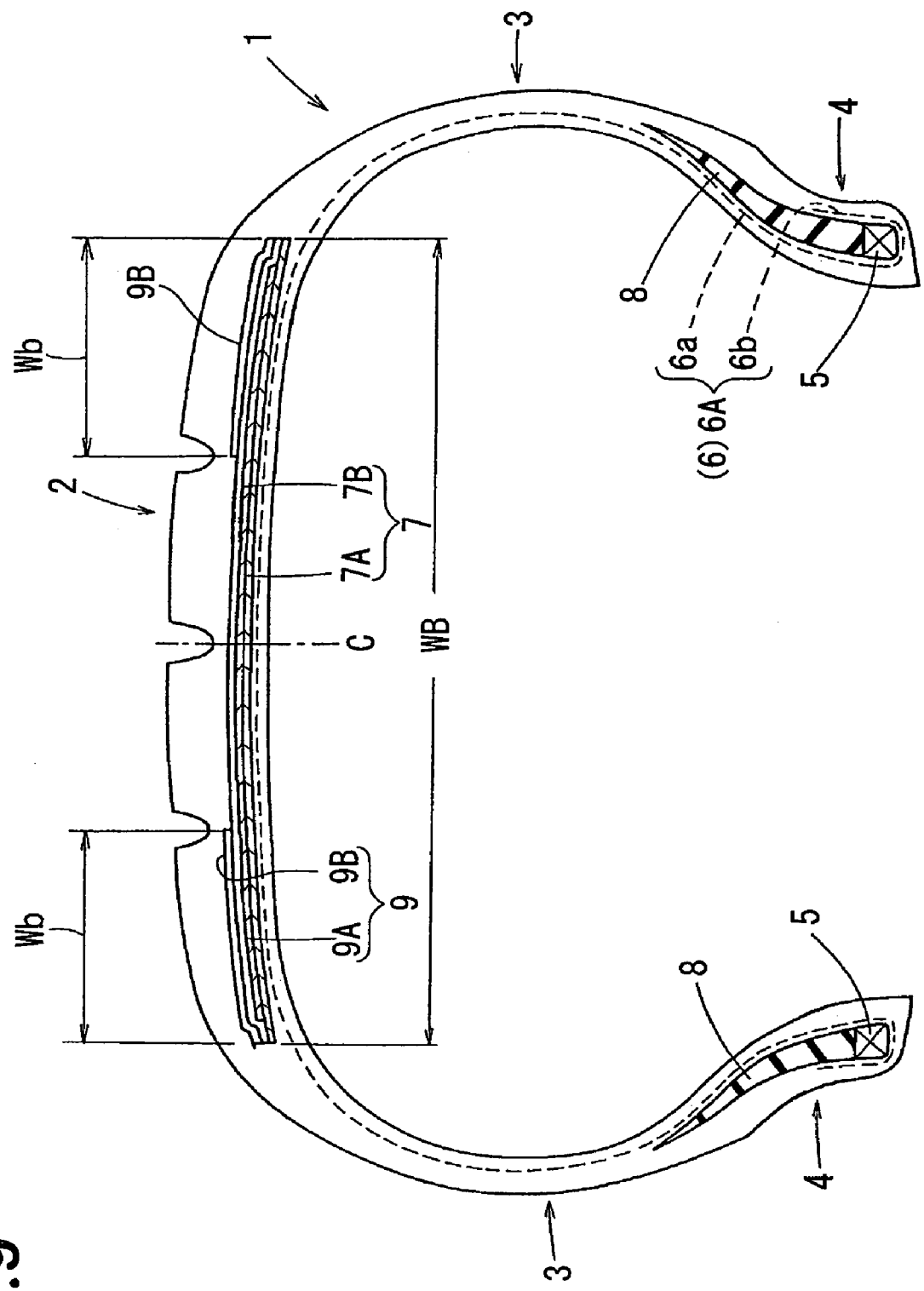
FIG. 9 is a sectional view illustrating an example of the pneumatic radial tire of the present invention.
Figure 10A:
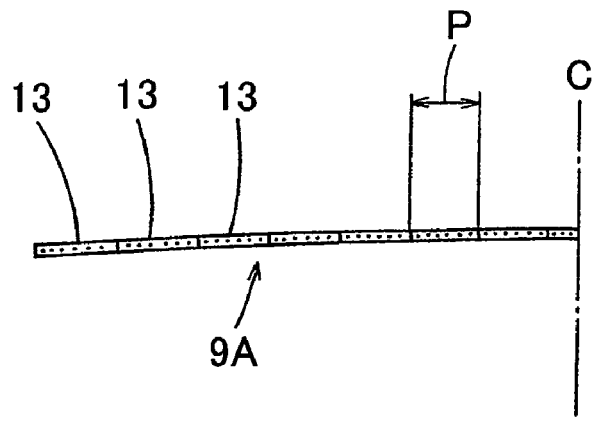
FIG. 10 are schematic sectional view illustrating a manner of winding a belt-form ply.
Figure 10B:
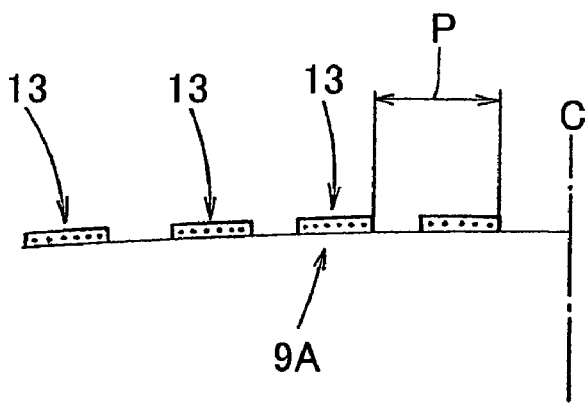
Figure 10C:
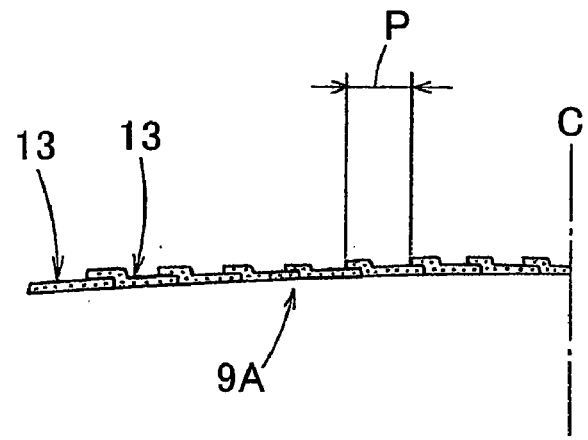

In the third invention, as illustrated in FIG. 9, the band layer 9 is composed of one full band ply 9A covering almost all of the width of the belt layer 7 and both-side edge band plies 9B and 9B at both ends of the belt layer 7 and outside it. The width W of the full band ply 9A is substantially equal to the width WB of the belt layer 7. This case is exemplified. In the present embodiment, shown is a form in which the full band ply 9A is arranged inwards along the tire radius direction and the edge band ply 9B is arranged outwards along the tire radius direction. Even if the band ply 9A and 9B are overlapped reversely, the same effects and advantages can be obtained.

The band layer 9 also has the same structure as in the first invention. For example, in the same way as in the first invention, the band ply 9A is formed in such a manner that the angle thereof with respect to the tire circumferential direction is set to 5 degrees or less. In this third invention, by setting the elongation resistance value K of each of the full band ply 9A and the edge band ply 9B in a range of 110–386, road noise, transit noise and rolling resistance can be made compatible.

The inventors made many tires (size: radial tires for passenger cars of 195/65R15 91H), wherein the elongation resistance values K and the widths wb in the tire axial direction of the edge band ply 9B were varied, by way of trial, and researched effects thereof on roads noise, transit noise and rolling resistance.

Figure 11:
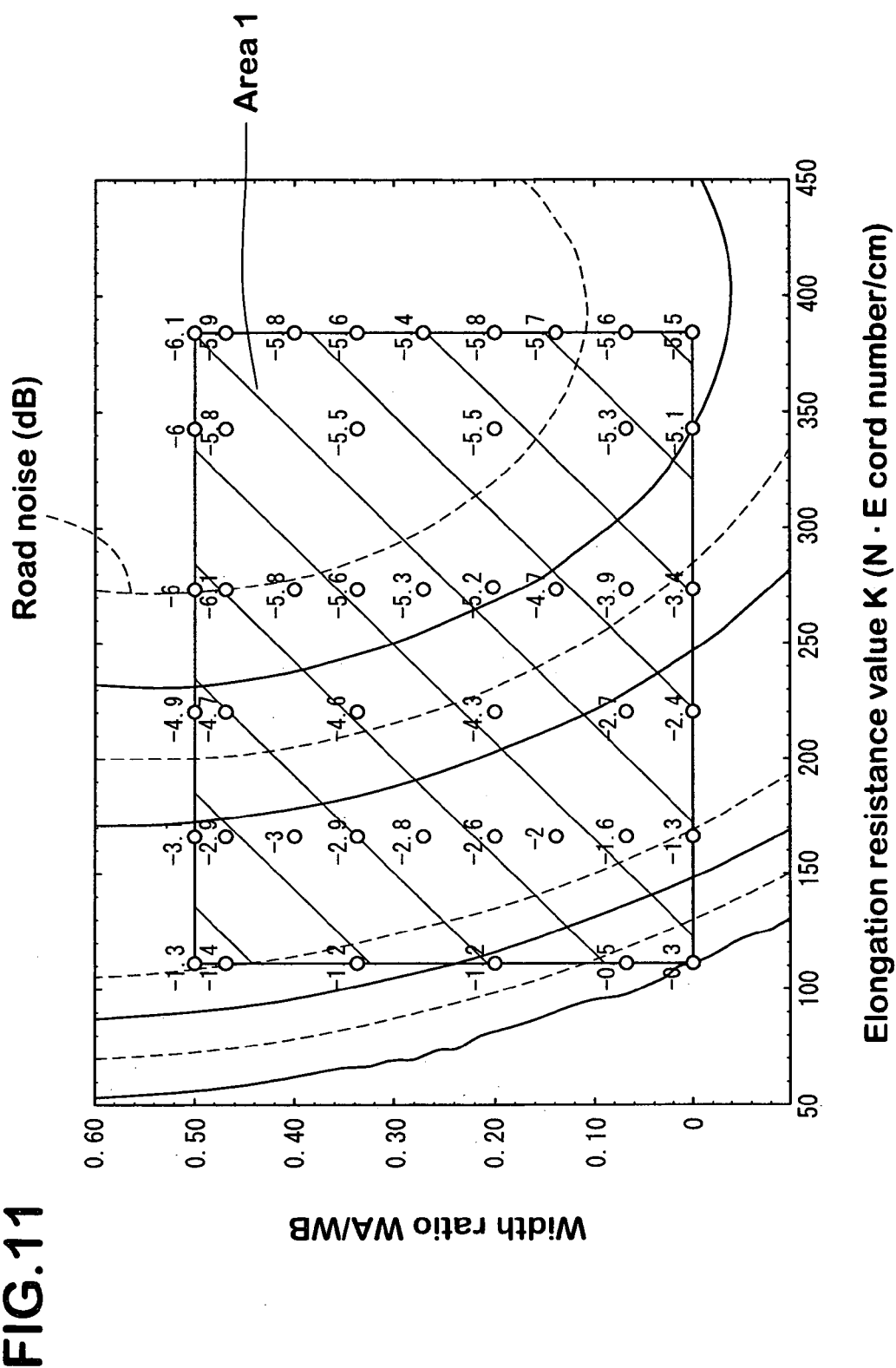
FIG. 11 is a graph showing a relationship between elongation resistance value K, width ratio (Wb/WB), and road noise.

FIG. 11 shows an example thereof. The elongation resistance value K was plotted along the transverse axis (x axis), the width ratio Wb/WB between the width Wb of the edge band ply 9B and the width WB of the belt layer was plotted along the vertical axis (y axis), and the road noise at this time was plotted along the z axis, which is perpendicular to the paper surface. A three-dimensional relationship between the elongation resistance value K, the width ratio Wb/WB and the road noise is shown as a bird's eye view, viewed from the z axis direction. Curves in this graph correspond to contour lines of the road noise presumed from the respective plotted values.

Each of the sample tires was fitted to all wheels of a domestic FF passenger car (displacement volume: 2000 cc) with rims (15×6 JJ) at an internal pressure of 200 kPa. The car was traveled at a speed of 60 km/hour on a smooth road surface. At a driver's sheet left-ear position, the noise level (dB) of a 250-Hz band of a ⅓ octave was measured. The level is represented as a change amount of the noise level, using the tire of Comparative Example 1 in the third invention as a standard. Accordingly, minus representations mean good cases wherein the road noise is smaller than those of Comparative Example 1. The tire of Comparative Example 1 in the third invention is a tire having one full band ply composed of nylon cords, and has a elongation resistance value K of 80 (N' cord number/cm) and a width ratio (Wb/WB) of 0.

The width ratio (Wb/WB) is changed from 0 to 0.5. The case that the width ratio (Wb/WB) is 0 means an embodiment wherein no edge band ply 9B is present and the band layer 9 is made of the single full band ply 9A. This is an embodiment of the pneumatic radial tire recited in claim 1. In the case that the width ratio (Wb/WB) is 0.5, the right and left edge band plies 9B and 9B substantially contact each other on the tire equator C. Apparently, it looks that the band layer 9 is composed of two full band plies 9A. In this embodiment, however, its band cords are not continuous on the tire equator. Therefore, this embodiment is different from an embodiment having two full band plies in the power of restraining the belt layer 7, and so on. Thus, they are clearly distinguished from each other in structure.

As illustrated in FIG. 11, in an area wherein the elongation resistance value K (unit: N' cord number/cm) is from 110 to 386 and the width ratio (Wb/WB) is from 0 to 0.5 (hereinafter referred to as the "area 1"), road noise is superior to those of Comparative Example 1 made of nylon bands. As the elongation resistance value K is larger, the effect of decreasing the road noise is larger. This would be because by increasing the elongation resistance value K of the band ply, the effect of suppressing the vibration of the belt layer 7 gets large. It can be verified that in the case of the tires having the same elongation resistance value K, the tire having a larger width ratio (Wb/WB) is more profitable for the road noise.

Figure 12:
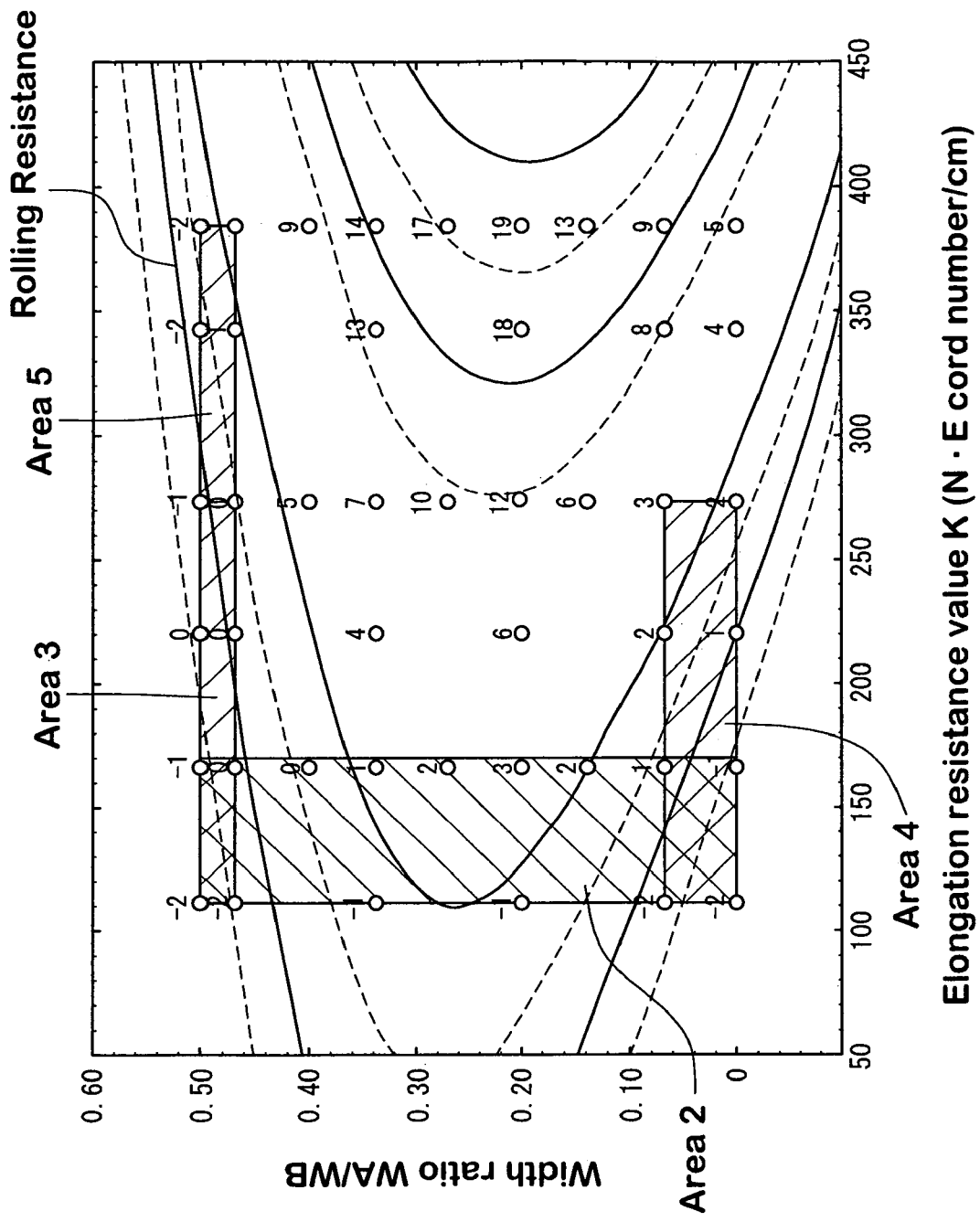
FIG. 12 is a graph showing a relationship between elongation resistance value K, width ratio (Wb/WB) and rolling resistance.

The elongation resistance value K was plotted along the transverse axis (x axis), the width ratio Wb/WB between the width Wb of the edge band ply 9B and the width WB of the belt layer was plotted along the vertical axis (y axis), and the rolling resistance at this time was plotted along the z axis, which is perpendicular to the paper surface. FIG. 12 is a bird's eye view obtained by viewing, from the z axis direction, a three-dimensional relationship between the elongation resistance value K, the width ratio Wb/WB and the rolling resistance, which relationship was obtained from the above-mentioned plotting. Curves in this graph correspond to contour lines of the rolling resistance presumed from the respective plotted values.

The rolling resistance is obtained by measuring the rolling resistance value of each of the tires with a rolling resistance tester under the following conditions: rim: 15×6 jj, internal pressure: 230 kPa, load: 4.0 kN, and speed: 80 km/h, and then dividing this by the load. The evaluation is represented as a change amount, using the Comparative Example 1 as a standard. Accordingly, plus representations mean rolling resistance values increased (deteriorated) from the Comparative Example 1 (in the third invention). Conversely, minus representations mean good cases wherein the rolling resistance is smaller than the Comparative Example 1.

Surprisingly, FIG. 12 demonstrates that in the area wherein the width ratio (Wb/WB) is from about 0.2 to 0.3, the rolling resistance locally deteriorates. This deterioration in the rolling resistance is remarkable when the elongation resistance value K is about 280 (N' cord number/cm) or more. As a result of inventor's analysis, causes for this can be presumed as follows: when the width ratio (Wb/WB) of the edge band ply 9B is set to about 0.2 to 0.3, the tread surface curvature radius of the central area between the edge band plies becomes locally small so that the ground pressure becomes uneven. This is also based on the result that when the elongation resistance value K is set to 170 or less so that the power of restraining the belt layer 7 is relieved, deterioration in the rolling resistance is little. When the elongation resistance value K is set within this range, the deterioration in the rolling resistance gets little to a negligible degree throughout the range that the width ratio (Wb/WB) is from 0 to 0.5. Accordingly, as a preferred combination for suppressing road noise while suppressing deterioration in the rolling resistance, the width ratio (Wb/WB) can be set to 0 to 0.5 or less, more preferably more than 0 and 0.5 or less in the case that the elongation resistance value K is 110 or more and 170 or less.

Furthermore, from FIG. 12, in the range that the width ratio (Wb/WB) is from 0.47 to 0.50, the rolling resistance tends to be improved rather than deterioration in the rolling resistance is small. This would be based on the matter that the tread surface is kept flat over a wide scope by the broad edge band plies 9B. It is also proved that when the width ratio (Wb/WB) is set within this range, good results are obtained in the range that the elongation resistance value K is from 110 to 386. Accordingly, as another combination for suppressing road noise while suppressing deterioration in the rolling resistance, the width ratio (Wb/WB) can be set to 0.47 or more and 0.50 or less in the case that the elongation resistance value K is 110 or more and 386 or less.

Furthermore, from FIG. 12, in the range that the width ratio (Wb/WB) is 0.07 or less, the rolling resistance tends to be improved rather than deterioration in the rolling resistance is small in the same manner. This would be based on the matter that the tread surface is kept flat over a wide scope by the markedly slender edge band plies 9B. It is also proved that when the width ratio (Wb/WB) is set within this range, good results are obtained in the range that the elongation resistance value K is from 110 to 280. Accordingly, as a further preferred combination for suppressing road noise while suppressing deterioration in the rolling resistance, the width ratio (Wb/WB) can be set to 0 to 0.07, more preferably more than 0 and 0.07 or less in the case that the elongation resistance value K is 110 or more and 280 or less.

When these areas are put together, the following areas in FIG. 12 are preferred in an embodiment having an edge band ply:

a) in the case that the elongation resistance value K is 110 or more and less than 170, the width ratio (Wb/WB) is more than 0 and 0.5 or less (hereinafter referred to as the "area 2"), b) in the case that the elongation resistance value K is 170 or more and 280 or less,
　b1) an area wherein the width ratio (Wb/WB) is more than 0 and 0.07 or less (hereinafter referred to as the "area 3"),
　b2) an area wherein the width ratio (Wb/WB) is 0.47 or more and 0.5 or less (hereinafter referred to as the "area 4"), and c) in the case that the elongation resistance value K is more than 280 and 386 or less, the width ratio (Wb/WB) is 0.47 or more and 0.5 or less (hereinafter referred to as the "area 5").

Figure 13:
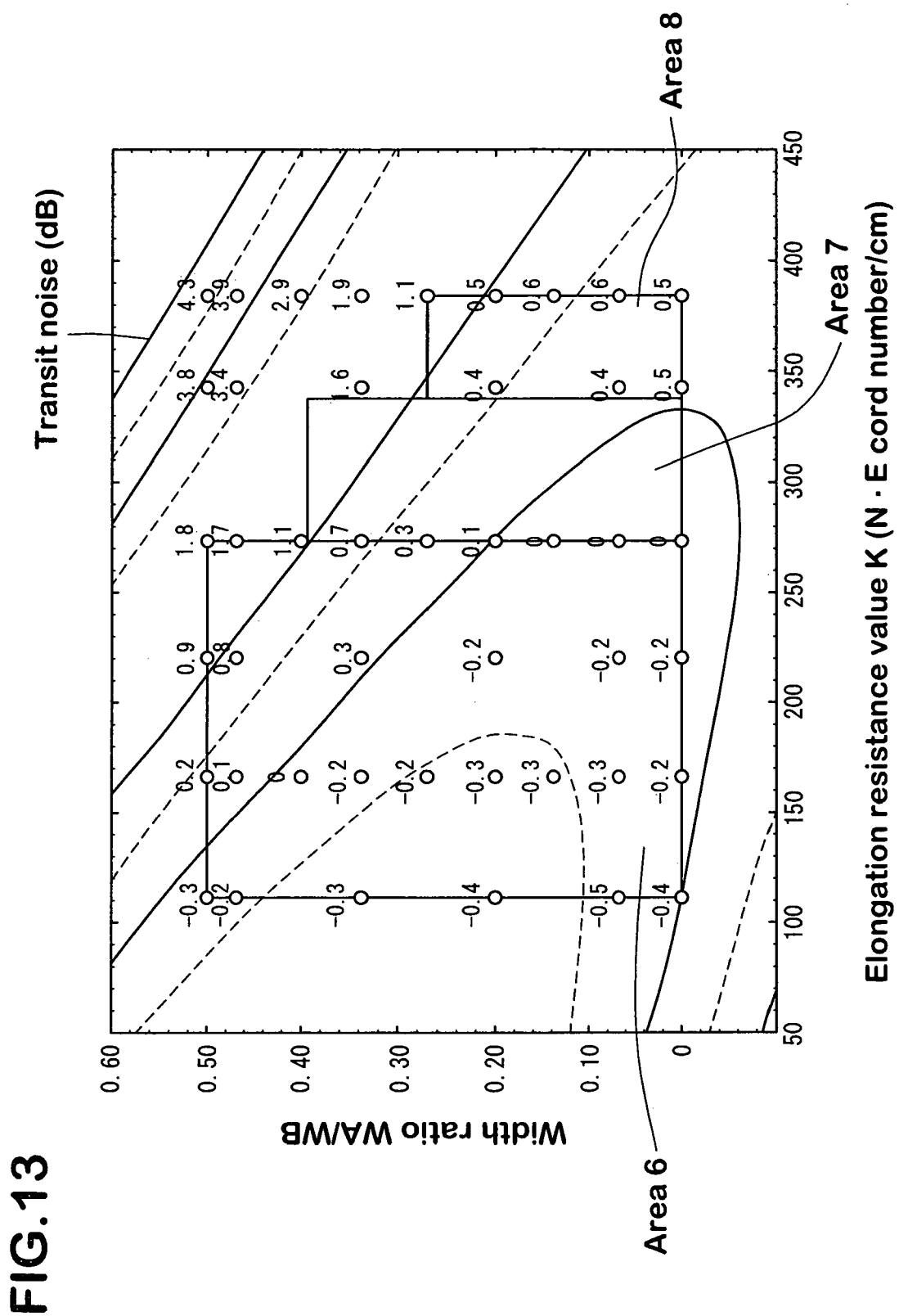
FIG. 13 is a graph showing a relationship between elongation resistance value K, width ratio (Wb/WB) and transit noise.

The elongation resistance value K was plotted along the x axis, the width ratio between the width Wb of the edge band ply 9B and the width WB of the belt layer (Wb/WB) was plotted along the y axis, and the transit noise at this time was plotted along the z axis perpendicular to the paper surface. FIG. 13 is a bird's eye view obtained by viewing, from the z axis direction, a three-dimensional relationship between the elongation resistance value K, the width ratio (Wb/WB) and the transit noise, which relationship was obtained from the above-mentioned plotting. Curves in this graph correspond to contour lines of the transit noise presumed from the respective plotted values.

The transit noise is according to an actual car coasting test prescribed in JASO/C/606. A car was caused to coast on a straight test course (asphalt road surface) at a distance of 50 m at a transit speed of 53 km/hour, and further in the middle point of the course, the maximum level dB(A) of transit noises was measured with a fixed microphone set at a position 7.5 m sideway from the central line of the traveling and 1.2 m apart from the road surface. The transit noise is represented as a change amount of the noise level, using the Comparative Example 1 as a standard. Accordingly, minus representations mean good values, which are values of the transit noise decreased from the Comparative Example 1.

According to FIG. 13, it can be understood that when the elongation resistance value K and the width ratio (Wb/WB) are increased to improve the power of restraining the belt layer, the transit noise deteriorates. Specifically, in the case that the elongation resistance value K is 340 or more, the width ratio (Wb/WB) ranges from 0.27 to 0.50 and is markedly bad. In the case that the width ratio (Wb/WB) is more than 0.40, the transit noise deteriorates remarkably when the elongation resistance value K is more than 280. Accordingly, in order to suppress large deterioration in the transit noise, it is advisable to decide the elongation resistance value K and the width ratio (Wb/WB) from scopes other than this scope. Specifically, the following ranges are selected:

d) in the case that the elongation resistance value K is 110 or more and 280 or less, the width ratio (Wb/WB) is more than 0 and 0.5 or less (hereinafter referred to as the "area 6"), e) in the case that the elongation resistance value K is more than 280 and less than 340, the width ratio (Wb/WB) is more than 0 and 0.4 or less (hereinafter referred to as the "area 7"), and f) in the case that the elongation resistance value K is 340 or more and 386 or less, the width ratio (Wb/WB) is more than 0 and less than 0.28 (hereinafter referred to as the "area 8").

In order to obtain a most preferred pneumatic radial tire making it possible to decrease road noise while suppressing deterioration in the transit noise and the rolling resistance at a lowest level, it is sufficient to decide portions where the areas 1 to 8 overlap. The areas are as follows:

g) in the case that the elongation resistance value K is 110 or more and 170 or less, the width ratio (Wb/WB) is more than 0 and 0.5 or less, and h) in the case that the elongation resistance value K is more than 170 and 280 or less, the width ratio (Wb/WB) is more than 0 and 0.07 or less, or 0.47 or more and 0.50 or less.

(The Invention about Density Change)

In the invention illustrated in FIGS. 14 to 20, a band ply comprises high density portions 10a and low density portions 10b, whereby road noise can be decreased while suppressing deterioration in transit noise effectively at a lowest level. As described above, this invention can be adopted for the first and third inventions within the scope that the elongation resistance values K overlap.

Figure 14:
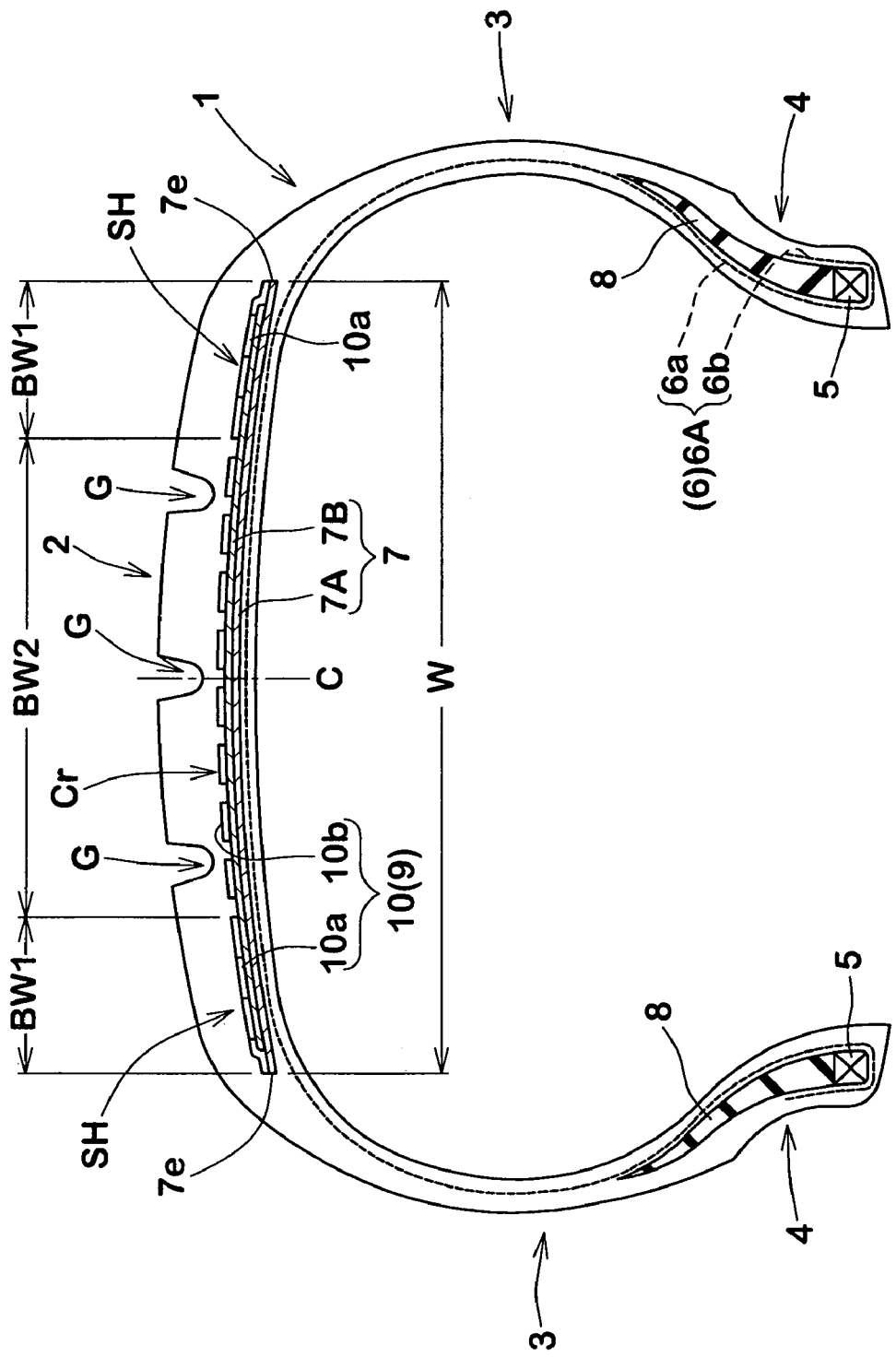
FIG. 14 is a sectional view illustrating an embodiment of the pneumatic radial tire.

As illustrated in FIG. 14, a band layer 9 is made of one band ply 9 covering almost all of the width of a belt layer 7, and the following is illustrated: the band ply 9 formed by winding one belt-form ply 13 continuously and spirally from one end 7e of the belt layer 7 to the other end 7e. In this way, joints of the ply are reduced so that the uniformity of the tire can be improved.

Figure 15:
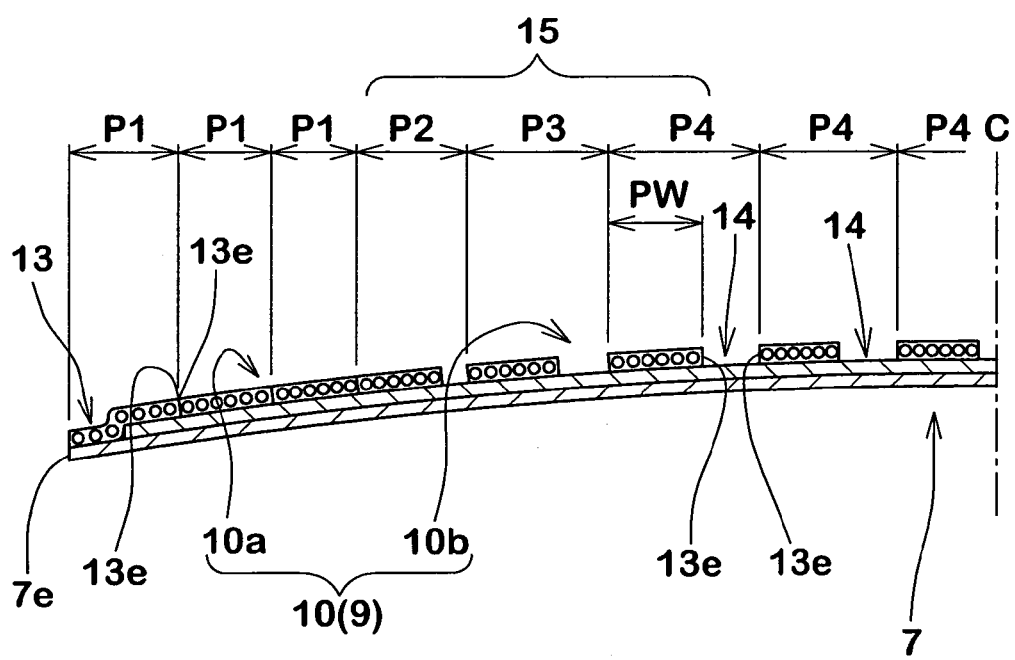
FIG. 15 is a schematic sectional view for explaining a winding form of a belt-form ply.

As illustrated in FIGS. 14 and 15, the band ply 9 comprises high density portions 10a constituting both outside portions SH and SH along the tire axial direction, wherein the winding pitch P1 of the belt-form ply 13 is 1.0 time or less the width PW of the belt-form ply; and low density portions 10b arranged between the high density portions 10a, wherein the winding pitches P2, P3 and P4 of the belt-form ply 13 are from 1.2 to 2.6 times the width PW of the belt-form ply. The winding pitches are each the shift amount of the ply along the tire axial direction when the ply 13 makes a round of the tire in the circumferential direction.

Figure 16:
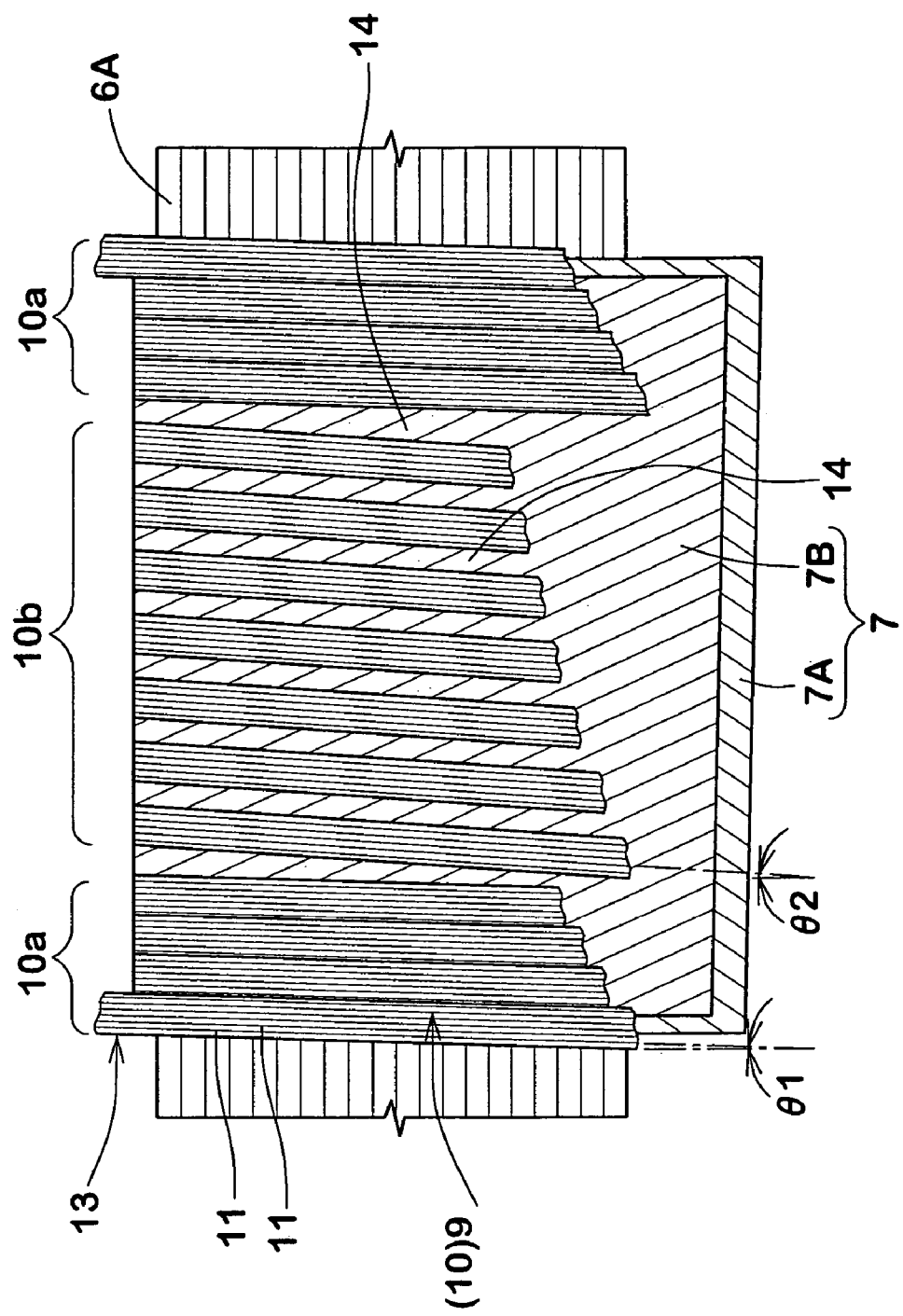
FIG. 16 is a developed view of the inner structure of the tire.

As the high density portion 10a in the present embodiment, the following embodiment is illustrated: an embodiment wherein the winding pitch P1 of the belt-form ply 13 is set to 1.0 time the width PW of the belt-form ply 13 and the ply is spirally wound in such a manner that side edges 13e of the belt-form ply 13 adjacent to each other along the tire axial direction contact each other. The high density portions 10a make high the arrangement density of band cords 11 in the two outside portions SH of the belt layer 7, and further makes smaller the angle θ1 of the band cords 11 to the tire circumferential direction, as illustrated in FIG. 16. Specifically, the angle θ1 of the band cords 11 to the tire circumferential direction, in the high density portions 10a, can be set to about 0.1 to 0.4 degree. By synergetic effects of these, the high density portions 10a have higher restraining power in the two outside portions SH of the belt layer 7, and can decrease road noise effectively.

The width BW1 of the high density portions 10a along the tire axial direction is not particularly limited. However, if the width is too small, the effect of tightening the outside portions SH of the belt layer 7 with high restraining power to decrease road noise tends to get small. Conversely, if the width is too large, high restraining power is liable to be given to the tread central portion so that the level of transit noise tends to deteriorate. From various experiments in light of such a viewpoint, the width BW1 of the high density portions 10a along the tire axial direction is desirably from 7 to 34% of the maximum width W of the belt layer 7 along the tire axial direction, more preferably from 14 to 27% thereof, and particularly preferably from 17 to 23% thereof.

Figure 20:
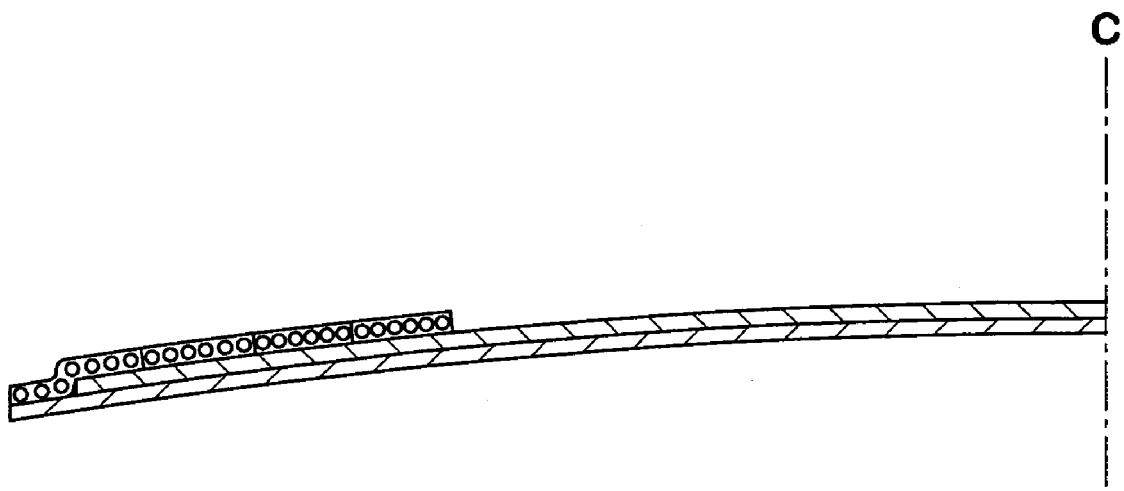
FIG. 20 is a sectional view illustrating a band ply of Comparative Example.
Figure 21:
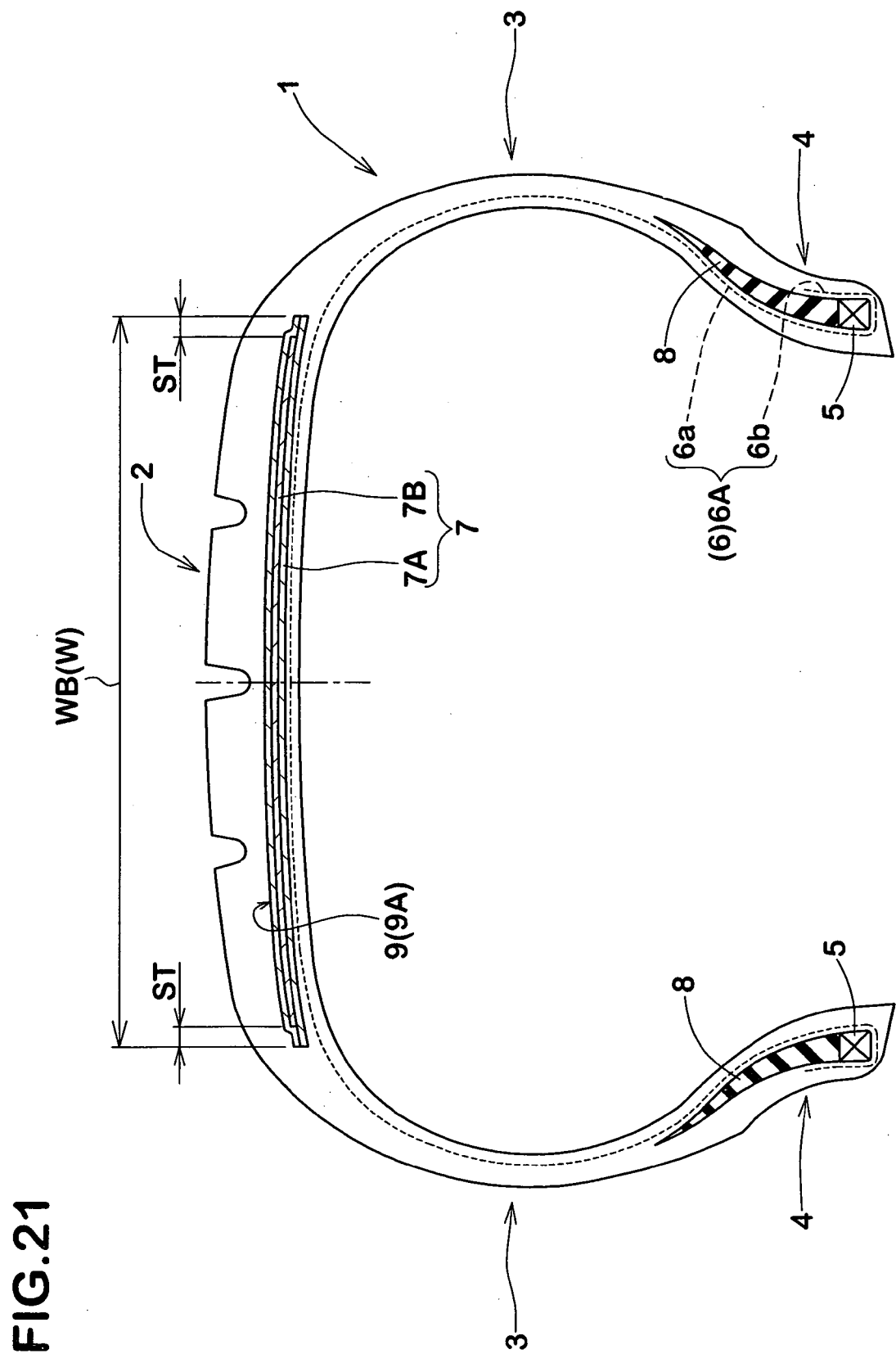
FIG. 21 is a sectional view illustrating an embodiment of the pneumatic tire.
Figure 22A:
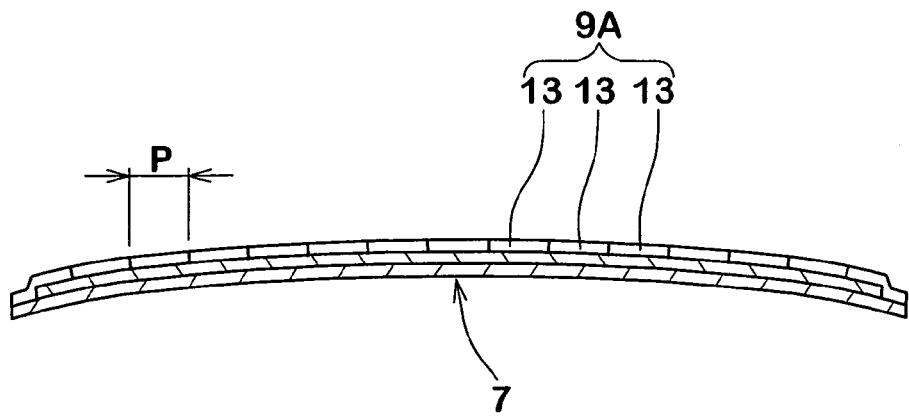
FIGS. 22)(A) to (C) are schematic sectional views illustrating winding manners of a belt-form ply.
Figure 22B:
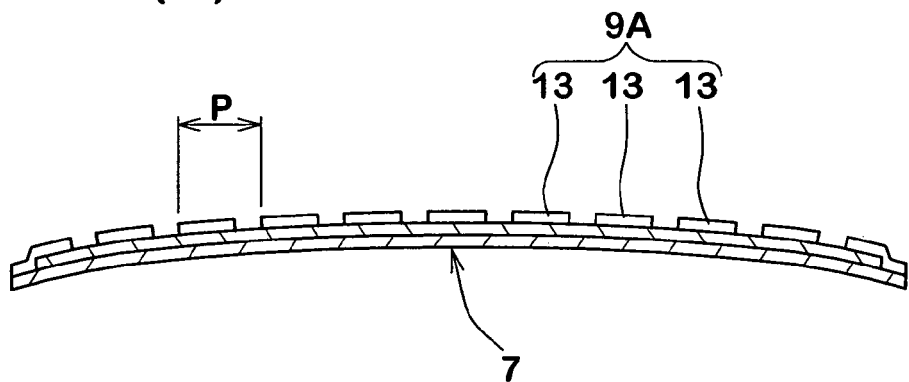
Figure 22C:
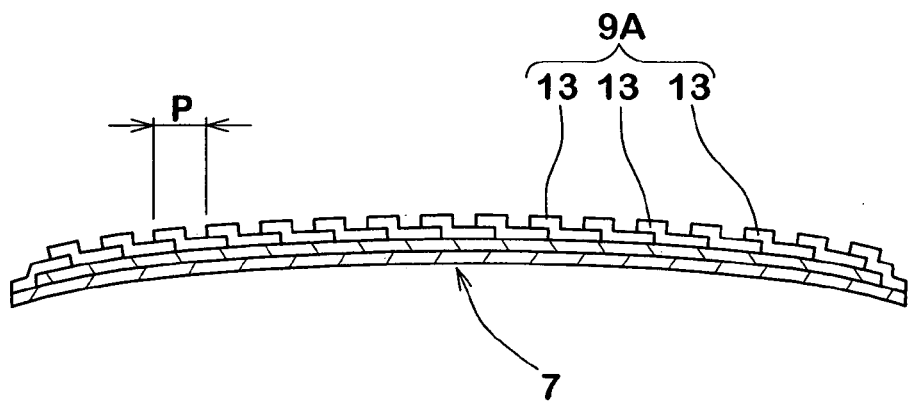

In the low density portions 10b, the winding pitch of the belt-form ply 13 is made larger than the winding pitch of the high density portions 10a along the tire axial direction, and separating portions 14 are formed between the belt-form ply portions 13 and 13 adjacent along the tire axial direction. In the separating portions 14, side edges 13e and 13e thereof are separated from each other. In these low density portions 10b, the arrangement density of the band cords is small, and further the angle θ2 of the band cords 11 to the tire circumferential direction can be set to larger than that in the high density 10a, as illustrated in FIG. 16. More specifically, the angle can be set to an angle θ2 of about not more than 0.5 to 2.0 degrees to the tire circumferential direction. By synergetic effects of these, the low density portions 10b makes its restraining power weak in the central portion Cr of the belt layer 7 so as to suppress deterioration in transit noise. In the present example, shown is an example wherein the low density portions 10b having a width BW2 are formed over the whole areas between the high density portions 10a and 10a. In order to prevent deterioration in the transit noise, it can be considered that no band ply is formed in the central portion Cr, as illustrated in FIG. 20. In this case, however, the rolling resistance tends to deteriorate largely. Thus, the case is not preferred.

As illustrated in FIG. 15, in the present embodiment, a gradually-increasing portion 15, wherein the winding pitch increases gradually towards the tire equator C, is formed in the low density portions 10b. That is, as illustrated in FIG. 15, in the gradually-increasing portion 15 the winding pitch thereof satisfies the relationship of P2<P3<P4. For example, when the belt-form ply 13 is wound, the winding pitch can be changed by a single winding step in the portion wherein the high density portion 10a is transited to the low density portions 10b. In such a case, for example, large restraining power in the high density portion 10a decreases suddenly in the boundary portion with the low density portions 10b, so that the loss of the road noise decreasing effect is readily generated. On the other hand, for example, the gradually-increasing portion 15, wherein the winding pitch increases gradually towards the tire equator C, is formed in the low density portions 10b of the band ply 10, whereby the restraining power in the tread central portion Cr is lowered to prevent deterioration in the transit noise. At the same time, sudden fall in the restraining power on the side of the outside portion SH is prevented. Thus, the road noise decreasing effect can be exhibited at a maximum level.

Figure 17:
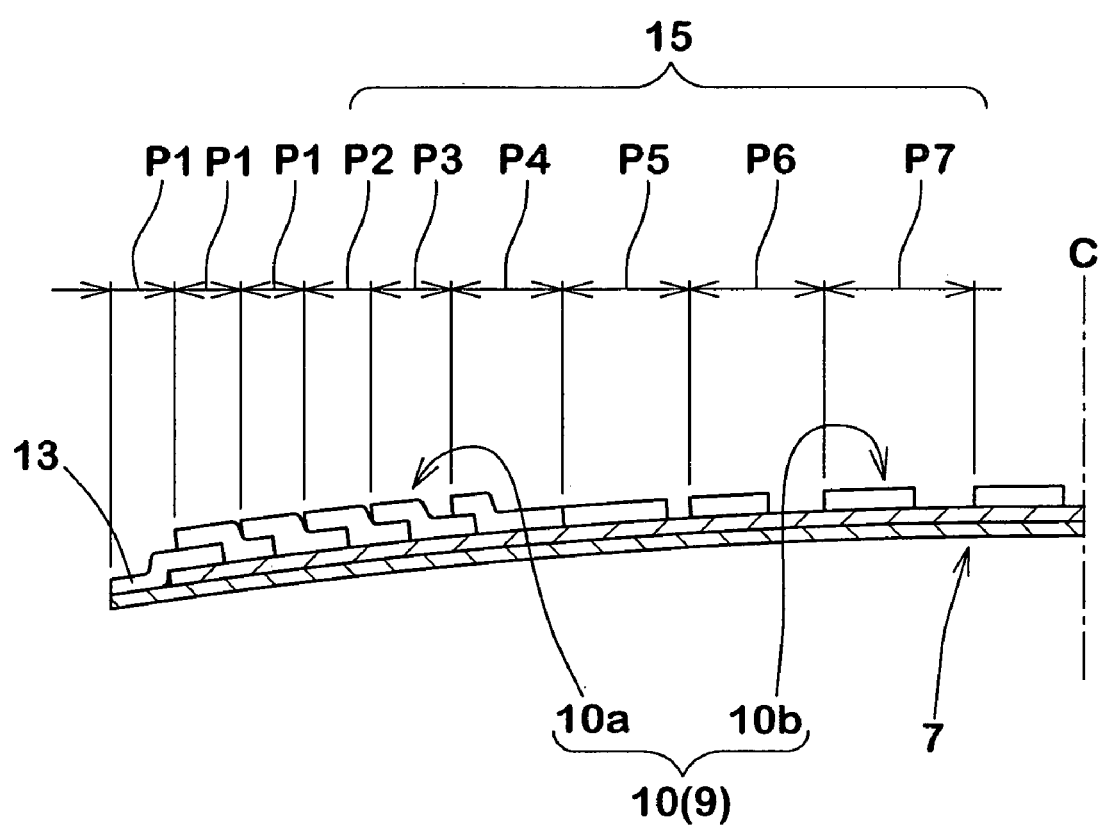
FIG. 17 is a schematic sectional view for explaining another winding form of the belt-form ply.

The embodiment wherein this gradually-increasing portion 15 is formed in the low density portions 10b is illustrated. However, as illustrated in FIG. 17, a gradually-increasing portion 15 wherein the winding pitch increases gradually (P1<P2<P3<P4) towards the tire equator can also be formed in the high density portion 10a. Desirably, the restraining power is gradually changed by limiting the increase rate of the winding pitch in this gradually-increasing portion 15, for example, to about 5 to 55%, more preferably about 15 to 45%. In this way, the road noise decreasing effect and the effect of preventing deterioration in the transit noise can be improved with a good balance.

In the case of the tire wherein its band ply has the high density portions 10a and the low density portions 10b, the elongation resistance value K (unit: N' cord number/cm) is desirably set to 130 to 700, more preferably 166 to 467, still more preferably 213 to 467, and particularly preferably 247 to 334. By organic combination of the above-mentioned structure of the band ply 10 with the belt-form ply 13 having a limited elongation resistance value K, road noise can be effectively decreased without generating remarkable deterioration in the transit noise and the rolling resistance.

In the case that the elongation resistance value K of the belt-form ply 13 is smaller than 130 (N' cord number/cm), the power of restraining the belt layer 7 gets small so that road noise cannot be sufficiently decreased. Conversely, in the case that the elongation resistance value K is more than 700 (N' cord number/cm), the sectional area of the band cords 11, the arrangement density of the band cords or the 2% modulus of the band cords 11 gets markedly large so that the shaping of the tire itself becomes difficult. In addition, the restraining power in the low density portions 10b is made excessively high to deteriorate noise excessively.

Figure 18A:
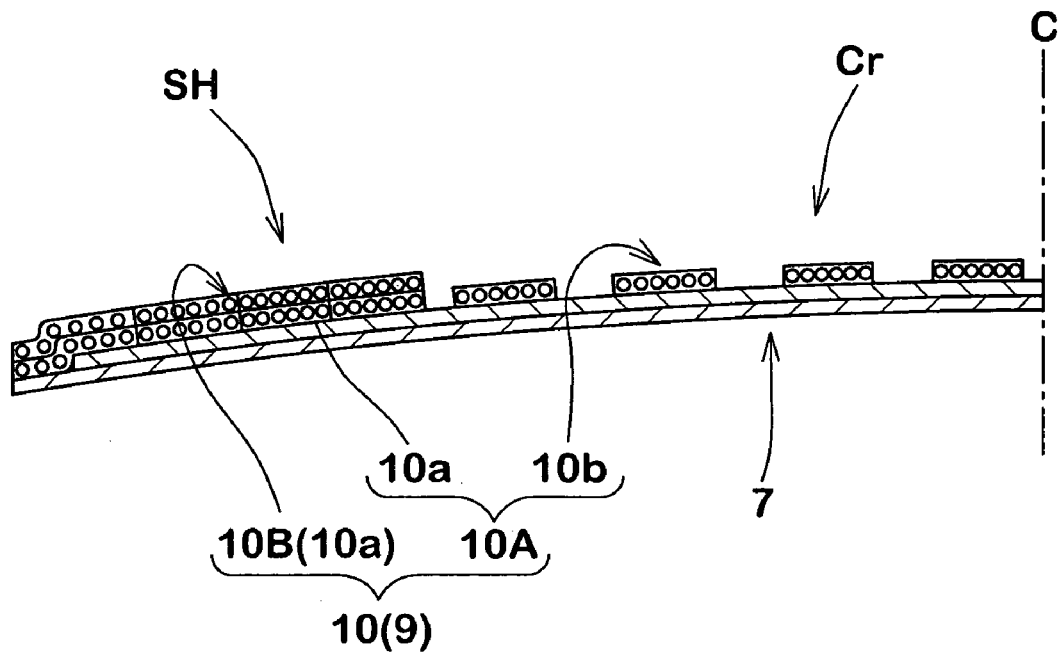
FIGS. 18(A) and (B) are schematic sectional views for explaining a further winding form of the belt-form ply.
Figure 18B:
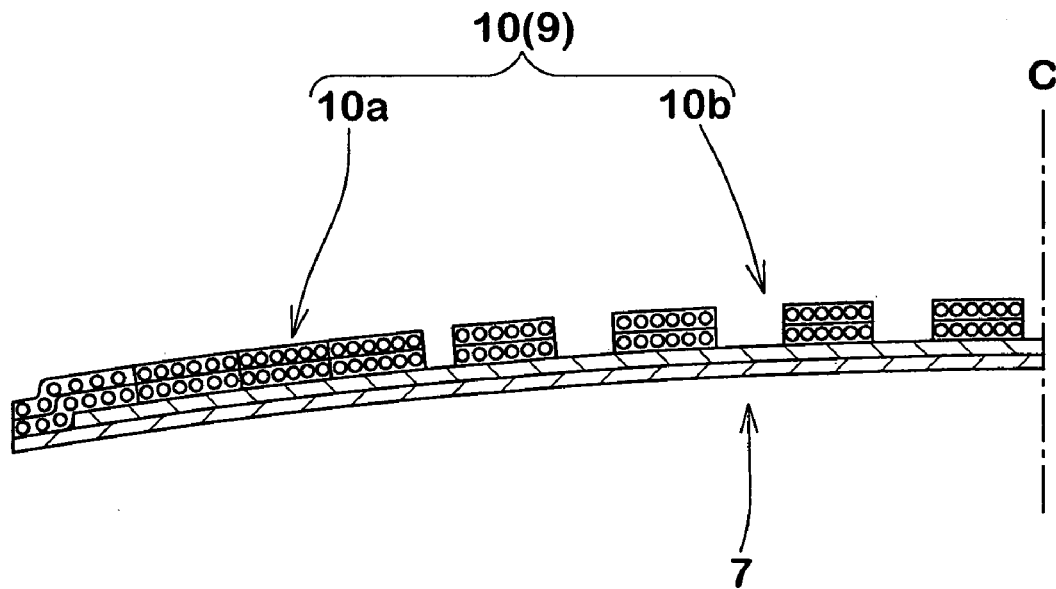

FIG. 18(A) illustrates a case in which the band layer 9 is composed of a full band ply 10A, and an edge band ply 10B covering only a high density portion 10a of this full band ply 10A, and FIG. 18(B) illustrates a case in which low density portions 10b are also made of two layers.

(The Invention about the Overlap of a Band with a Belt Layer)

Furthermore, in a band ply, the elongation resistance value K (unit: N' cord number/cm) is set to 166 to 467 and further a winding terminal portion c1 constituting a one-circumference portion ahead of the winding terminal of a belt c is formed at a position where it does not directly contact the outer end of the belt layer in the tire axial direction. This can be applied to the first to the third inventions if this is in a form which can be adopted for the first to the third inventions.

Figure 41:
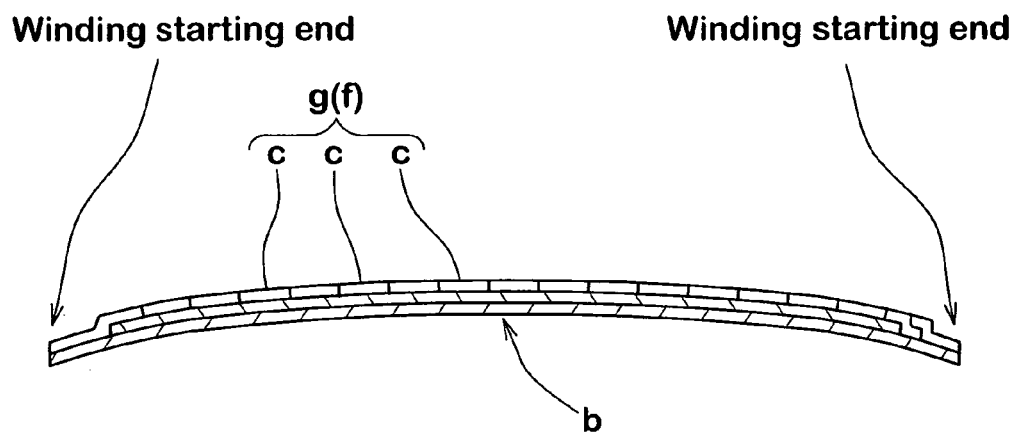
FIG. 41 is a schematic view illustrating a conventional band ply.
Figure 42:
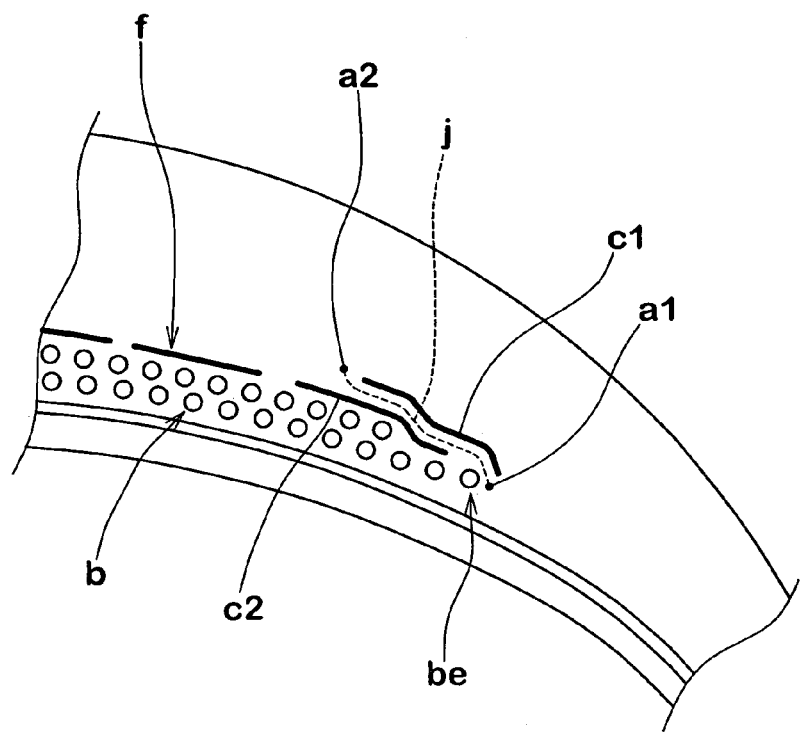
FIG. 42 is an enlarged sectional view of an end portion of the belt layer thereof.

This intends to prevent a rubber exfoliation j generated between the winding terminal portion c1, which constitutes a one-circumference portion ahead of the winding terminal of the belt-form ply c, and the belt-form ply c2 wound inside it, as illustrated in FIGS. 41 and 42. (Such an exfoliation damage may be referred to as a "belt edge looseness" hereinafter.) It has been made evident that this rubber exfoliation j is formed as follows: exfoliation starts from a microscopic rubber exfoliated portion a1 generated near outer end be of a belt layer b, which has a poor adhesion to the rubber, and then the exfoliation grows between the winding terminal portion c1 of the belt-form ply c, at which restraining power is readily lowered since the end is free, and a belt-form ply c2 so as to reach an outer face position a2 of the band ply f.

That is, in this "invention of the overlap of a band with a belt layer", the elongation resistance value K (unit: N' cord number/cm) of a band ply made of at least one layer is preferably set to 166 to 467. This invention can be adopted in the first to the third inventions within the scope that the elongation resistance values K overlap, as described above. When the elongation resistance value K of the band ply 10a is smaller than 166 (N' cord number/cm), the road noise decreasing effect cannot be sufficiently obtained. Conversely, if the elongation resistance value K is more than 467 (N' cord number/cm), the sectional area of the band cords, the number of the embedded band cords or the 2% modulus of the band cords gets markedly large so that the shaping of the tire is apt to become difficult. More preferably, the elongation resistance value K is set to 180 to 350 (N' cord number/cm), more preferably 220 to 300 (N' cord number/cm).

Figure 23:
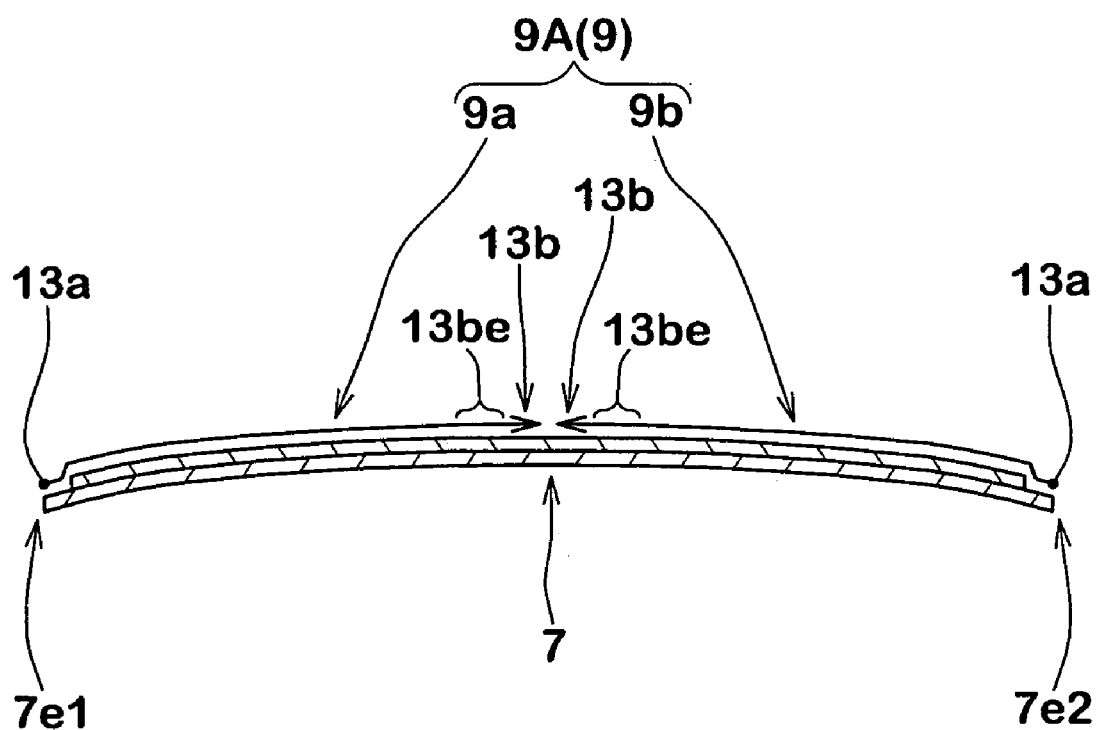
FIG. 23 is a schematic view illustrating an example of the band ply.

For example, as illustrated in FIG. 23, the band ply 9A can be composed of a first ply piece 9a and a second ply piece 9b which have winding starting ends 13a of a belt-form ply 13 at each of outer ends 7e1 and 7e2 of a belt layer 7, are spirally wound towards the tire equator, and further have winding terminal portions 13be of the belt-form ply 13 near the tire equator. The first and second ply pieces 9a and 9b can restrain almost all of the belt layer 7.

Figure 24:
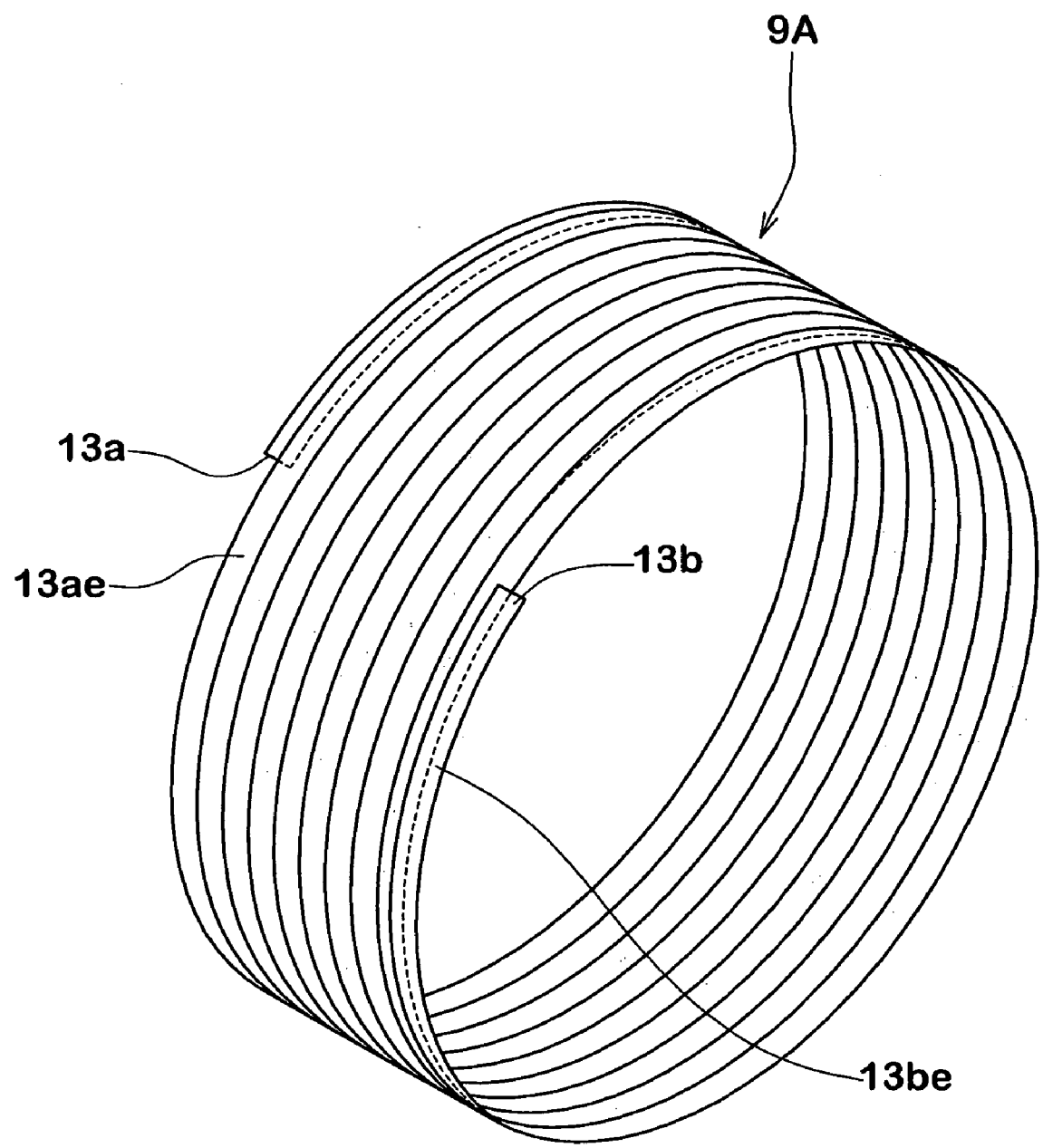
FIG. 24 is a schematic view illustrating an example of the band ply.

When the band ply 9A is schematically illustrated, the winding starting ends 13a of the belt-form ply 13 are represented by black spots (●) and the winding terminals 13b are represented by arrows (→). As exemplified in FIG. 24, the winding starting end 13a of the belt-form ply 13 of the band ply 9A is an end at which winging is started, and the winding terminal 13be thereof is an end at which the winding is finished. The winding terminal portion 13be is a one-circumference portion ahead of the winding terminal 13b, and the winding starting end portion 13a is a one-circumference portion after the winding starting end 13a.

Figure 25A:
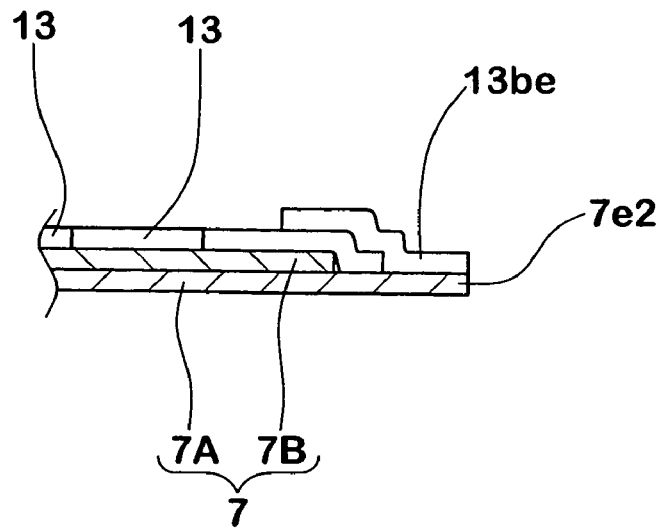
FIGS. 25(A) and (B) are partial sectional views illustrating an enlarged end portion of a belt layer.
Figure 25B:
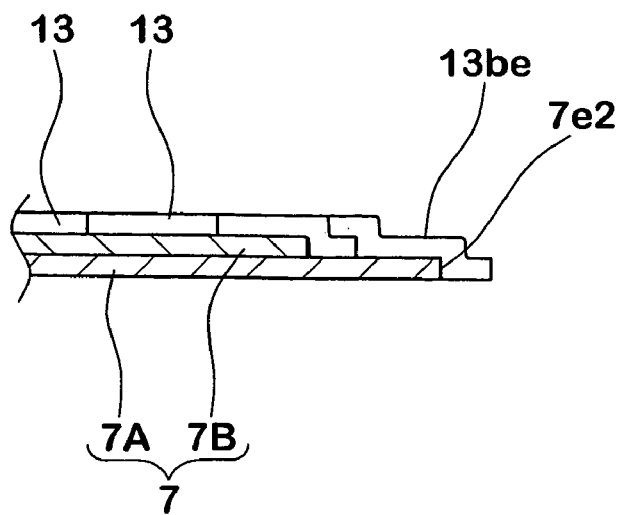

In the band ply 9A as illustrated in FIG. 23, the winding terminal portions 13be of the belt-form ply 13 do not directly contact the outer ends 7e1 and 7e2 of the belt layer 7. It is therefore possible to prevent microscopic cracks or the like, which are readily generated at the outer ends 7e1 and 7e2 of the belt layer 7, from entering the winding terminal portions 13be of the belt-form ply 13, wherein rubber exfoliation is readily generated, and growing in the portions 13be. In short, any belt edge looseness can be effectively prevented. The direct contact of the winding terminal portion 13be with the outer end of the belt layer 7 along the tire axial direction includes both of the case that the outer end 7e2 (or 7e1) of the belt layer 7 is consistent with the side edge of the winding terminal portion 13be as illustrated in FIG. 25(A), and the case that the winding terminal portion 13be goes across the outer end 7e2 (or 7e1) of the belt layer 7 as illustrated in FIG. 25(B).

Figure 26:
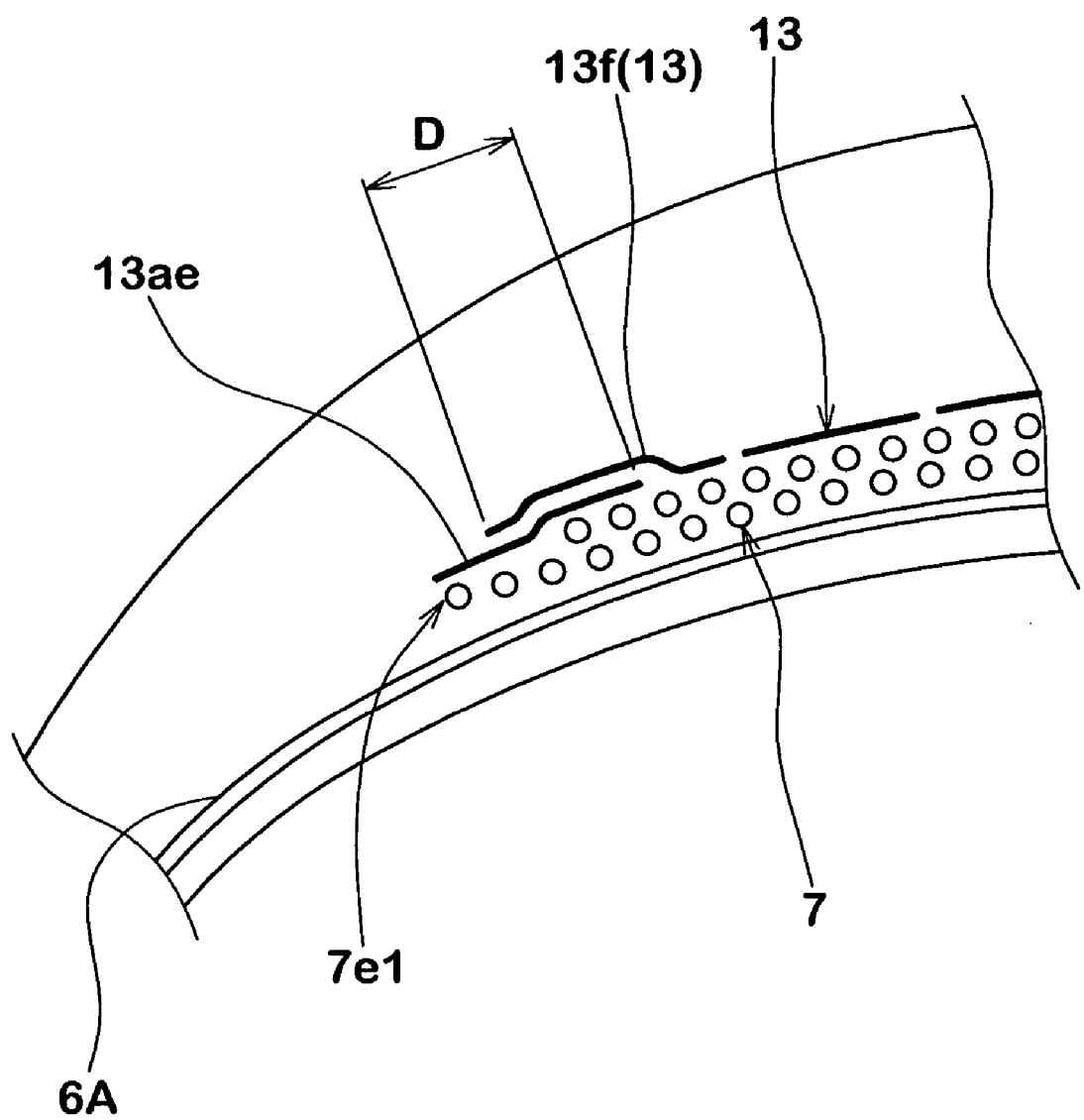
FIG. 26 is a partial sectional view illustrating an enlarged end portion of a belt layer.

The winding starting end portions 13a are positioned at the outer ends 7e1 and 7e2 of the belt layer 7, respectively. As enlarged and illustrated in FIG. 26, about a winding starting end portion 13ae including the winding starting end 13a in the present example, at least one part thereof is covered and tightened with the belt-form ply 13f, which will be wound later, so as to make the power of restraining the belt layer 7 high. As a result, it is possible to prevent microscopic cracks or the like generated at the outer end 7e1 of the belt layer 7 from advancing between the winding starting end portion 13ae and the next belt-form ply 13f.

Particularly preferably, the overlap length D of the winding starting end portion 13ae with the next belt-form ply 13f is from 0.1 to 1.0 time, more preferably from 0.3 to 0.9 time, and still more preferably from 0.6 to 0.8 time the width W1 of the belt-form ply. The present example is an example wherein the outer side edge, along the tire axial direction, of the winding starting end portion 13ae is arranged along the outer end 7e1 of the belt layer 7.

In the belt layer 7, a good adhesion between the rubber and the belt cords is attained at positions besides the outer ends 7e1 and 7e2. Accordingly, the position of the winding starting end portion 13ae of the belt-form ply 13 is not particularly limited if direct contact thereof with the outer ends 7e1 and 7e2 can be avoided.

The following will exemplify specific embodiments.

Figure 27:
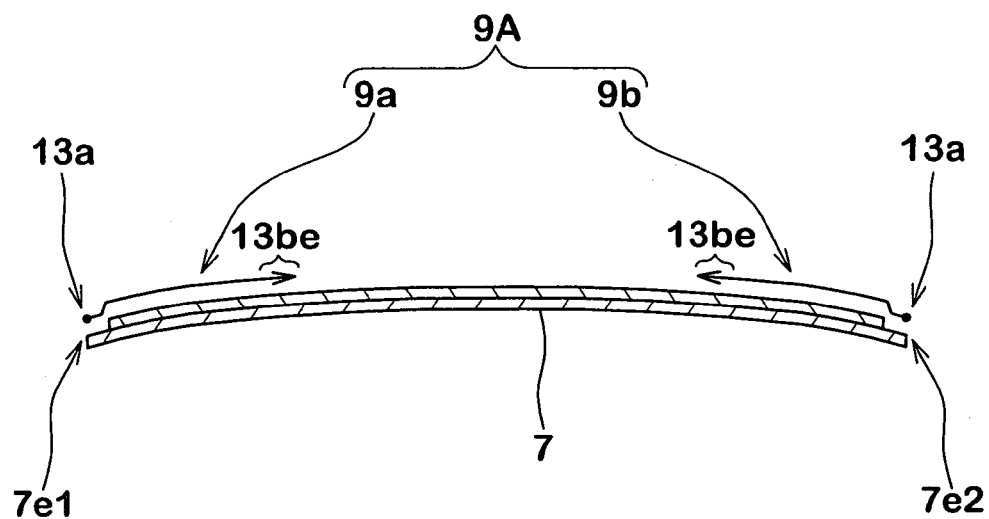
FIG. 27 is a schematic view illustrating an example of the band ply.

A band ply 9A illustrated in FIG. 27 can also be composed of a first ply piece 9a and a second ply piece 9b which have winding starting ends 13a of a belt-form ply 13 at respective outer ends 7e1 and 7e2 of a belt layer 7, and have winding terminal portions 13be of the belt-form ply 13 at shoulder portions. In this embodiment, the so-called edge band ply in a center-empty form, wherein the crown portion of the belt layer 7 is not covered is formed. It is effective for decrease in road noise to set the width of the ply piece 9a or 9b to at least 7% or more of the width WB of the belt layer 7.

Figure 28:
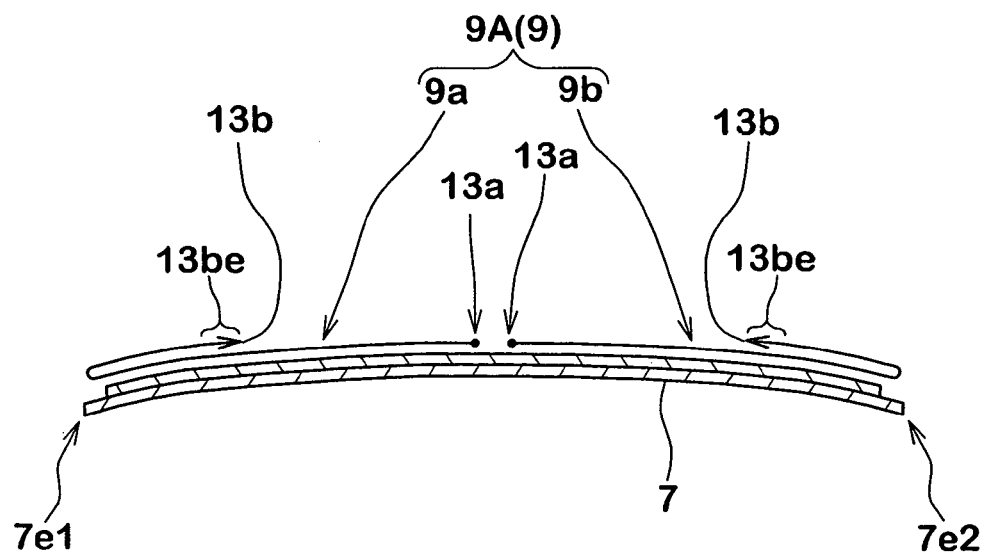
FIG. 28 is a schematic view illustrating an example of the band ply.

A band ply 9A illustrated in FIG. 28 is composed of a first ply piece 9a and a second ply piece 9b which respectively have winding starting ends 13a of a belt-form ply 13 near the tire equator, and are spirally wound therefrom towards outer ends 7e1 and 7e2 of a belt layer 7 and outwards along the tire axial direction, turned again toward the tire equator without being interrupted at the outer ends 7e1 and 7e2 of the belt layer, and spirally wound, whereby winding terminal portions 13be are positioned at shoulder portions. In this band ply 9A, the belt-form ply 13 overlaps with each other to be of two layers at the shoulder portions in substantially the same manner as in the combination of a full band and edge bands. Therefore, the shoulder portions, wherein lifting is particularly readily generated during high-speed operation, is firmly restrained to make the high-speed durability high. In the crown portion, the belt-form ply 13 has a monolayer structure, and thus deterioration in comfortableness when persons rise in the car having the present tire can be suppressed as a lowest level.

Figure 29:
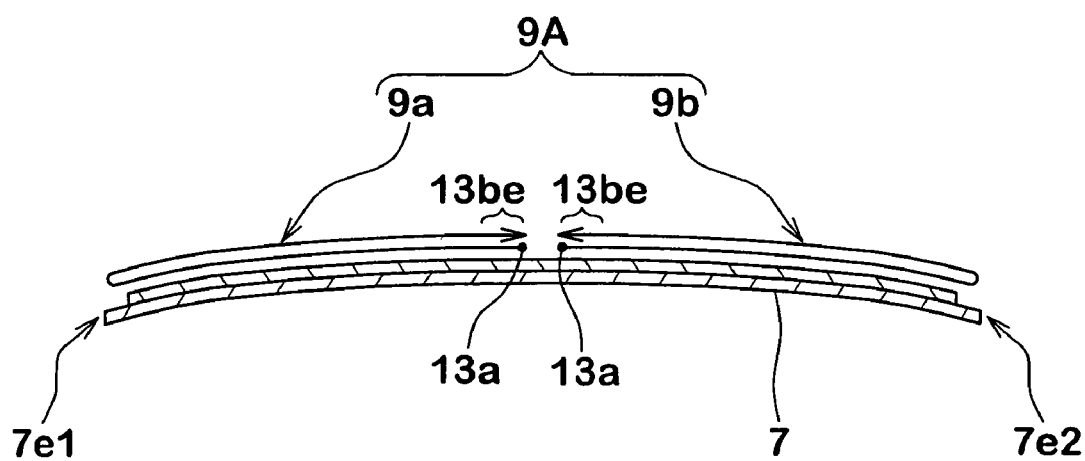
FIG. 29 is a schematic view illustrating an example of the band ply.

A band ply 9A illustrated in FIG. 29 is based on the embodiment of FIG. 28, but is composed of a first ply piece 9a and a second ply piece 9b wherein winding terminal portions 13be of a belt-form ply 13 are positioned near the tire equator. In this case, the belt-form ply overlaps with each other to be of two layers over almost all of the width of a belt layer 7; therefore, the rigidity of the tread surface is uniformly made high and the road noise performance is regarded as more important so as to be improved. In this point, the present band ply is favorable (the structure of two full bands).

Figure 30:
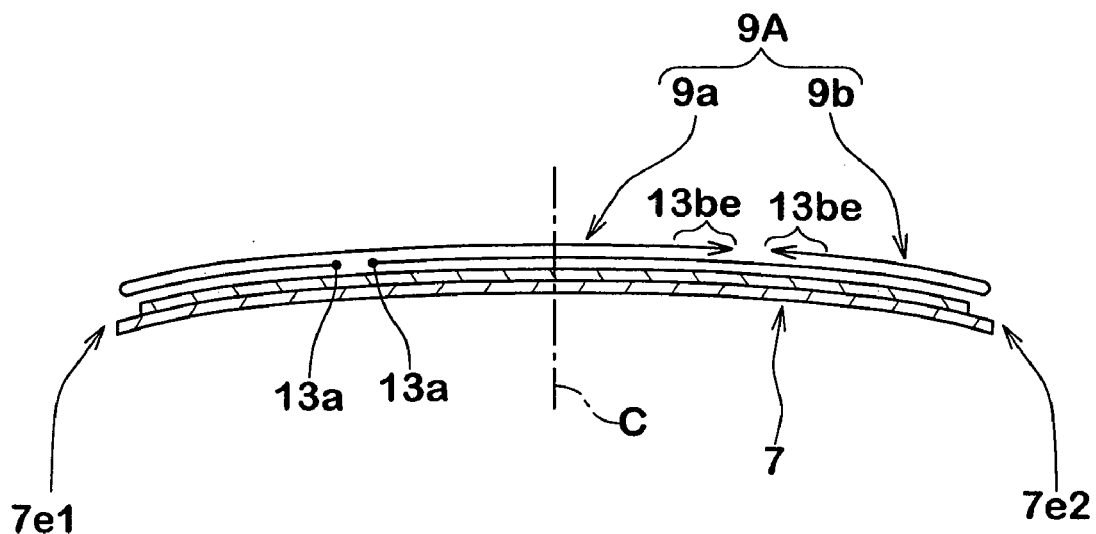
FIG. 30 is a schematic view illustrating an example of the band ply.

A band ply 9A illustrated in FIG. 30 is composed of a first ply piece 9a and a second ply piece 9b. The respective ply pieces 9a and 9b are positioned so that winding starting ends 13a and 13a of a belt-form ply 13 are close to each other and approach one outer end 7e1 of a belt layer from the tire equator C. The second ply piece 9b is spirally wound toward the other outer end 7e2 of the belt layer, further turned at the outer end 7e2, and spirally wound again toward the tire equator. Moreover, the second ply piece 9b has a winding terminal portion 13be positioned in front of the tire equator C. On the other hand, the first ply piece 9a is spirally wound toward the one outer end 7e1 of the belt layer, turned at the above-mentioned outer end 7e1, and spirally wound again toward the tire equator and outside the second ply piece 9b. Moreover, the first ply piece 9a is over the tire equator C so that the winding terminal portion 13be is positioned closely to the winding terminal portion of the second ply piece 9b (the structure of two full bands).

Figure 31:
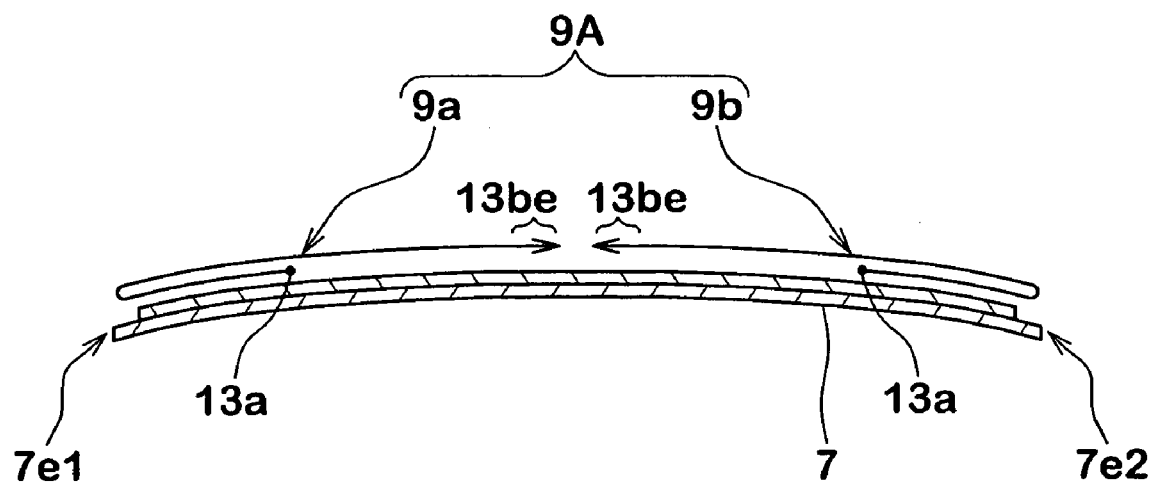
FIG. 31 is a schematic view illustrating an example of the band ply.

A band ply 9A illustrated in FIG. 31 is also composed of a first ply piece 9a and a second ply piece 9b. The respective ply pieces 9a and 9b have winding starting ends 13a and 13a of a belt-form ply 13 near outer ends 7e1 and 7e2 of a belt layer, and are spirally wound outwards along the tire axial direction, turned at the respective outer ends 7e1 and 7e2, and spirally wound again toward the tire equator. Moreover, the respective ply pieces 9a and 9b have winding terminal portions 13be positioned near the tire equator C. In this way, a structure having one full band and one edge band is substantially formed.

Figure 32:
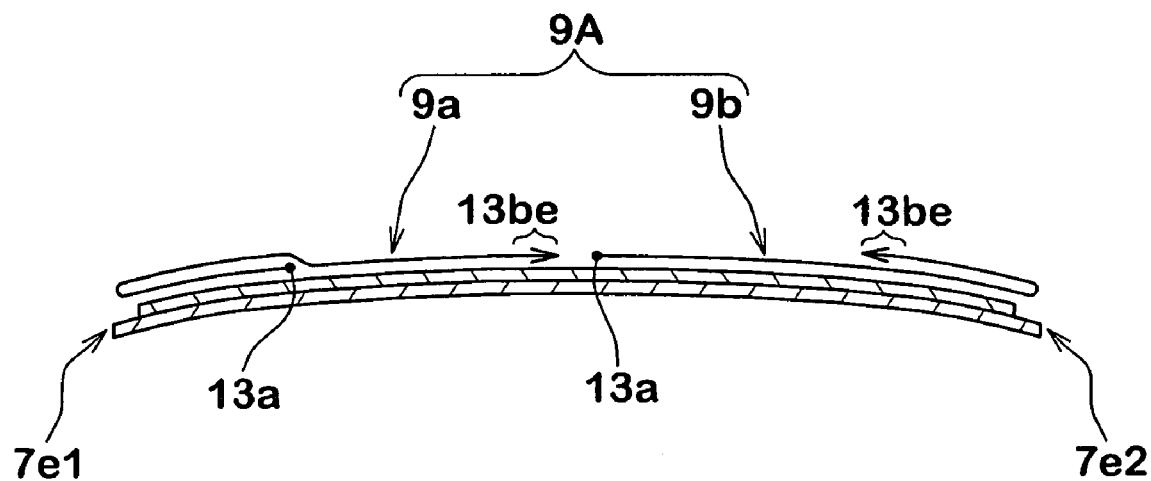
FIG. 32 is a schematic view illustrating an example of the band ply.

A band ply 9A illustrated in FIG. 32 is also composed of a first ply piece 9a and a second ply piece 9b. The first ply piece 9a has a winding starting end 13a of a belt-form ply 13 near one outer end 7e1 of a belt layer, and is spirally wound outwards along the tire axial direction, turned at the outer end 7e1, and spirally wound again toward the tire equator. Moreover, the first ply piece 9a has a winding terminal portion 13be positioned near the tire equator C. On the other hand, the second ply piece 9b has a winding starting end 13a of the belt-form ply 13 near the winding terminal portion 13be of the first ply piece 9a, and is spirally wound toward the other outer end 7e2 of the belt layer, turned at the outer end 7e2, and spirally wound again toward the tire equator. Moreover, the second ply piece 9b has a winding terminal portion 13be positioned in front of the tire equator C. In this way, a structure having one full band and one edge band is substantially formed.

Figure 33:
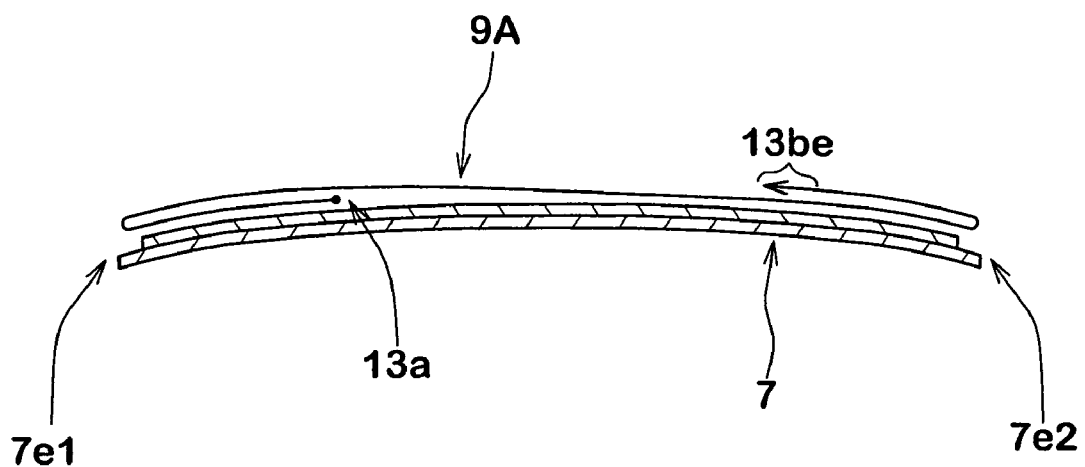
FIG. 33 is a schematic view illustrating an example of the band ply.

A band ply 9A illustrated in FIG. 33 has a winding starting end 13a of a belt-form ply 13 near one outer end 7e1 of a belt layer, and is spirally wound outwards along the tire axial direction, turned at the outer end 7e1, and spirally wound again toward the other outer end 7e2 of the belt layer. Further, the band play 9A is turned at the outer end 7e2 and spirally wound again toward the tire equator. The band ply piece 9A has a winding terminal portion 13be positioned in front of the tire equator C. In this way, a structure having one full band and one edge band is substantially formed.

Figure 34:
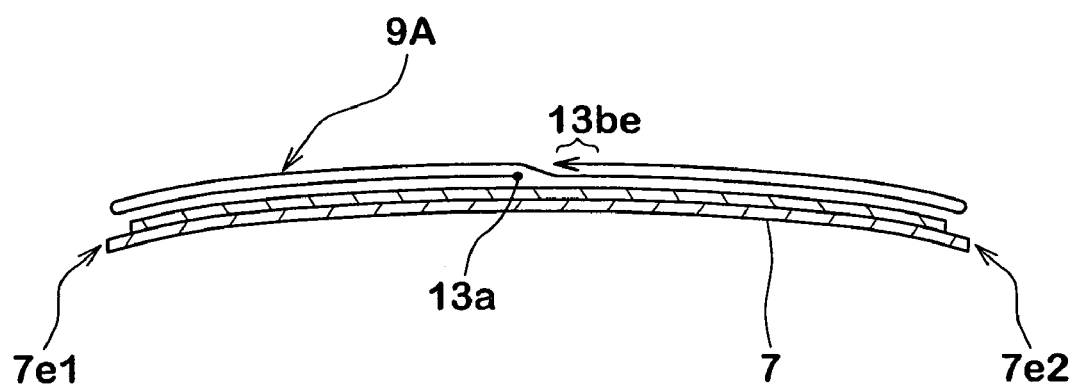
FIG. 34 is a schematic view illustrating an example of the band ply.

A band ply 9A illustrated in FIG. 34 has a winding starting end 13a of a belt-form ply 13 near the tire equator C, and is spirally wound toward one outer end 7e1 of a belt layer, turned at this outer end 7e1, and spirally wound again toward the other outer end 7e2 of the belt layer. The band ply piece 9A is again turned at this outer end 7e2, and spirally wound so that a winding terminal portion 13be is positioned near the tire equator C. In this way, a structure having two full bands is substantially formed.

Figure 35:
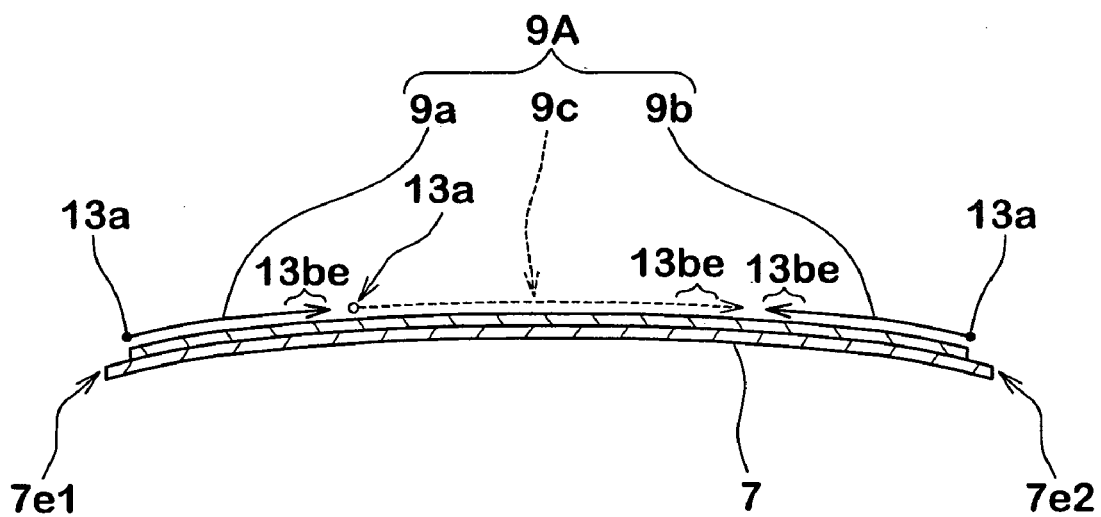
FIG. 35 is a schematic view illustrating an example of the band ply.
Figure 36:
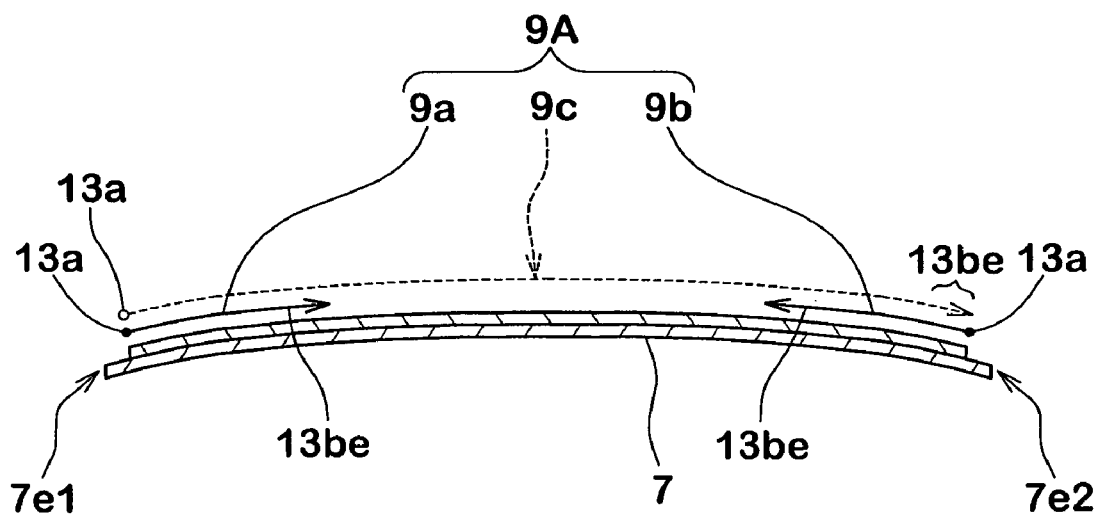
FIG. 36 is a schematic view illustrating an example of the band ply.
Figure 37:
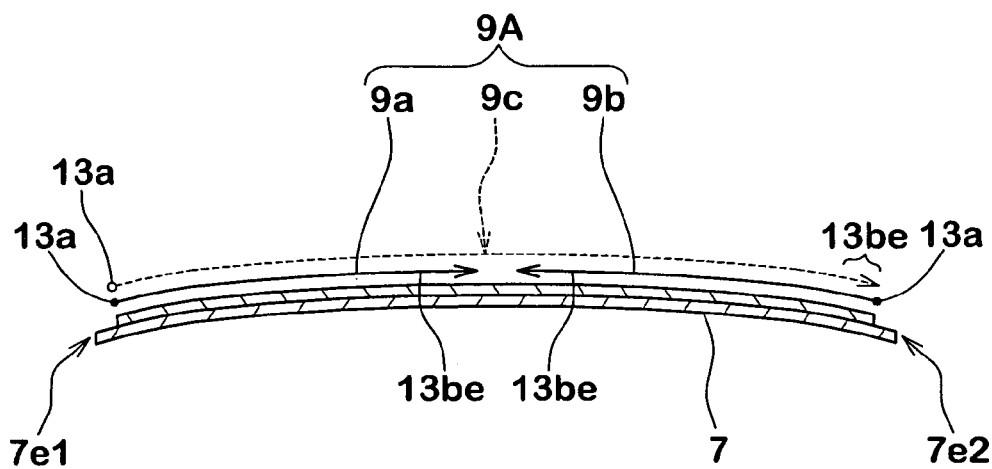
FIG. 37 is a schematic view illustrating an example of the band ply.

FIGS. 35 to 37 illustrate band plies wherein a band layer 9 is made of band cords of two kinds. A band ply 9A illustrated in FIG. 35 is composed of a first ply piece 9a covering one shoulder portion of a belt layer 7, a second ply piece 9b covering the other shoulder portion, and a third ply piece 9c arranged between the first ply piece 9a and the second ply piece 9b. Each of the first and second ply pieces 9a and 9b has a winding terminal portion 13be positioned at its inner end side along the tire axial direction. The third ply piece 9c is made of a belt-form ply using band cords 10 having a lower modulus than band cords of the first and second ply pieces 9a and 9b.

A band ply 9A illustrated in FIG. 36 is based on the embodiment of FIG. 35, but the third ply piece thereof is spirally wound from one outer end 7e1 of a belt layer 7 to the other outer end 7e2. In this embodiment, a winding terminal portion 13be of the third belt ply is close to an outer end 7e2 of the belt layer, but the second ply piece lies between these. Therefore, direct contact thereof can be prevented. A band ply 9A illustrated in FIG. 37 is based on the embodiment of FIG. 36, but each of the first ply pieces 9a and 9b extends to the tire equator. When a band ply is composed of plural kinds, it is sufficient that the band ply of at least one layer satisfies the elongation resistance value K.

Figure 38:
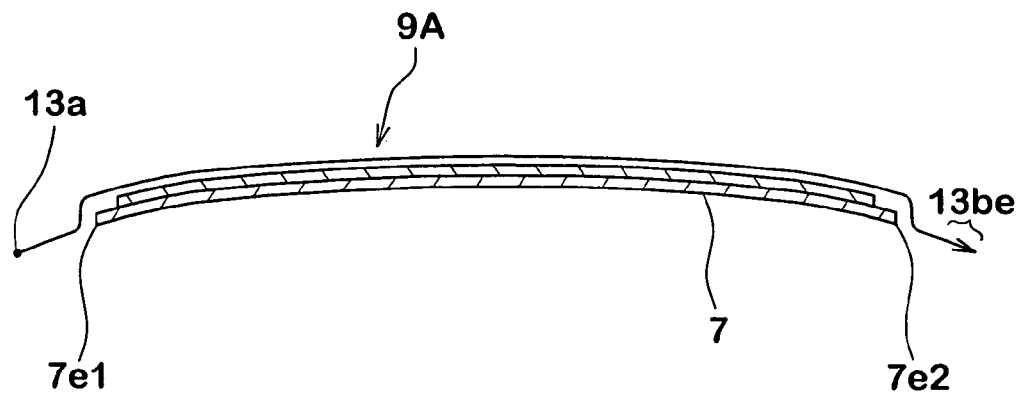
FIG. 38 is a schematic view illustrating an example of the band ply.

FIG. 38 illustrates a further embodiment of the present invention.

In a band ply 9A of the present embodiment, a winding starting end 13a of a belt-form ply is positioned outside one outer end 7e1 of a belt layer 7 along the tire axial direction, and further the band ply 9A is spirally wound therefrom so that a winding terminal portion 13be is positioned outside the other outer end 7e2 of the belt layer along the tire axial direction.

Figure 39:
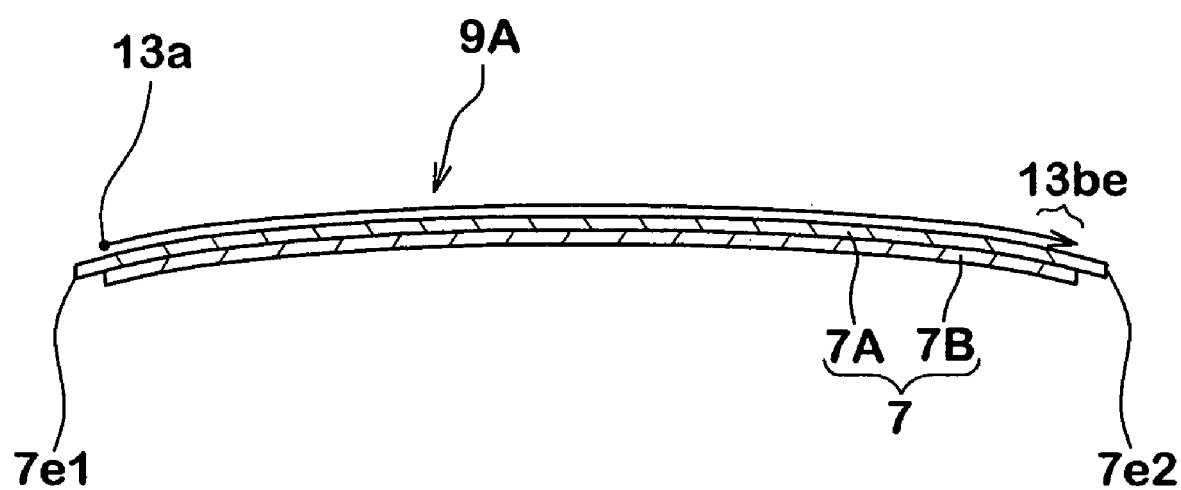
FIG. 39 is a schematic view illustrating an example of the band ply.

In FIG. 39, the belt layer 7 is composed of a first belt ply 7A having a large width along the tire axial direction, and a second belt ply 7B which is arranged inside the first belt ply 7A in such a manner that the centers thereof are consistent with each other, and which has a smaller width than that of the first belt ply 7A. This belt 7 can relieve steps generated by ends of the respective belt plies by covering the end of the second belt ply with the first belt ply. In this way, ends which are start points of the generation of belt edge looseness are reduced so that the endurance can be made still higher.

According to this embodiment, in a band ply 9A a winding starting end 13a of a belt-form ply is positioned inside one outer end 7e1 of a belt layer 7 along the tire axial direction, and further the band ply 9A is spirally wound therefrom so that a winding terminal portion 13be is positioned inside the other outer end 7e2 of the belt layer along the tire axial direction.

Embodiments will be described hereinafter.

(First Invention)

Tires having a tire size of 195/65R15 91H were made by way of trial on the basis of the specifications of Tables 1, 2 and 3. The road noise performance, the transit noise performance and the rolling resistance performance of the respective sample tires were tested and compared.

The manner of the test is as follows.

(1) Road Noise Performance

Each of the sample tires was fitted to all wheels of a domestic FF passenger car (displacement volume: 2000 cc) with rims (15×6 JJ) at an internal pressure of 200 kPa. The car was traveled at a speed of 60 km/hour on a smooth road surface. At a driver's sheet left-ear position, the noise level (dB) of a 250-Hz band of a ⅓ octave was measured. The level is represented as a change amount of the noise level, using Comparative Example 1 as a standard. Accordingly, minus representations mean road noise values decreased from Comparative Example 1.

(2) Transit Noise Performance

The transit noise was according to an actual car coasting test prescribed in JASO/C/606. A car was caused to coast on a straight test course (asphalt road surface) at a distance of 50 m at a transit speed of 53 km/hour, and further in the middle point of the course, the maximum level dB (A) of transit noises was measured with a fixed microphone set at a position 7.5 m sideway from the central line of the traveling and 1.2 m apart from the road surface. The transit noise is represented as a change amount of the noise level, using Comparative Example 1 as a standard. Accordingly, minus representations mean good values, which are values of the transit noise decreased from the Comparative Example 1.

(3) Rolling Resistance Performance

A rolling resistance tester was used to measure the rolling resistance value of each of the tires under the following conditions: rim: 15×6 JJ, internal pressure: 230 kPa, load: 4.0 kN, and speed: 80 km/h. The rolling resistance is represented as a change amount, using Comparative Example 1 as a standard. Accordingly, plus representations mean rolling resistance values increased (deteriorated) from Comparative Example 1.

TABLE 1

|  | Comparative Example 1 | Comparative Example 2 | Comparative Example 3 | Comparative Example 4 | Example 1 | Example 2 | Example 3 | Example 4 |
| --- | --- | --- | --- | --- | --- | --- | --- | --- |
| Belt layer width BW <mm> | 148 | 148 | 148 | 148 | 148 | 148 | 148 | 148 |
| Band structure *1 | 1FB | 1FB | 1FB | 1FB | 1FB | 1FB | 1FB | 1FB |
| Ply width W <mm> | 148 | 148 | 148 | 148 | 148 | 148 | 148 | 148 |
| Cord material *2 | NYLON | PEN | PEN | PEN | PEN | PEN | PEN | PEN |
| Cord sectional area S <mm$^2$> | 0.2478 | 0.246 | 0.2456 | 0.1618 | 0.2456 | 0.2456 | 0.2456 | 0.2456 |
| Cord modulus M <N/mm$^2$> | 3228 | 8657 | 11235 | 15230 | 11235 | 11235 | 11235 | 11235 |
| Cord arrangement density D <number/1 cm> | 10 | 4 | 14 | 16 | 12 | 10 | 8 | 6 |
| Elongation resistance value K |  |  |  |  |  |  |  |  |
| Central area Kc | 80 | 85 | 386 | 394 | 331 | 276 | 221 | 166 |
| Outside area Ks | 80 | 85 | 386 | 394 | 331 | 276 | 221 | 166 |
| Number J of cords in the belt-form ply | 10 | 10 | 10 | 10 | 10 | 10 | 10 | 10 |
| Number of the cords cut in the central area | 0 | 0 | 0 | 0 | 0 | 0 | 0 | 0 |
| Road noise performance <dB> | 0.0 | 0.1 | −5.2 | −5.3 | −4.6 | −3.4 | −2.3 | −1.3 |
| Transit noise performance <dB(A)> | 0.0 | −0.1 | 0.9 | 1.0 | 0.3 | 0.3 | 0.1 | 0.0 |
| Rolling resistance performance | 0 | 0 | 7 | 8 | 6 | 4 | 2 | 1 |

*1 1FB represents one full band ply, and 1FB' represents a full band ply wherein a part of cords are cut in the central area of the ply.
*2 PEN means polyethylene-2,6-naphthalate.

TABLE 2

|  | Example 5 | Example 6 | Example 7 | Example 8 | Example 9 | Example 10 | Example 11 |
| --- | --- | --- | --- | --- | --- | --- | --- |
| Belt layer width BW <mm> | 148 | 148 | 148 | 148 | 148 | 148 | 148 |
| Band structure *1 | 1FB | 1FB | 1FB | 1FB | 1FB | 1FB | 1FB |
| Ply width W <mm> | 148 | 148 | 148 | 148 | 148 | 148 | 148 |
| Cord material *2 | PEN | PEN | PEN | PEN | PEN | PEN | PEN |
| Cord sectional area S <mm$^2$> | 0.2456 | 0.246 | 0.246 | 0.246 | 0.246 | 0.246 | 0.162 |
| Cord modulus M <N/mm$^2$> | 11235 | 13568 | 13568 | 8657 | 8657 | 8657 | 12590 |
| Cord arrangement density D <number/1 cm> | 4 | 10 | 4 | 14 | 10 | 8 | 10 |
| Elongation resistance value K |  |  |  |  |  |  |  |
| Central area Kc | 110 | 334 | 134 | 298 | 213 | 170 | 204 |
| Outside area Ks | 110 | 334 | 134 | 298 | 213 | 170 | 204 |
| Number J of cords in the belt-form ply | 10 | 10 | 10 | 10 | 10 | 10 | 10 |
| Number of the cords cut in the central area | 0 | 0 | 0 | 0 | 0 | 0 | 0 |
| Road noise performance <dB> | −0.3 | −4.4 | −0.7 | −4.2 | −2.3 | −1.5 | −2.2 |
| Transit noise performance <dB(A)> | −0.1 | 0.5 | −0.1 | 0.5 | 0.2 | 0.1 | 0.2 |
| Rolling resistance performance | 0 | 5 | 0 | 5 | 3 | 1 | 2 |

*1 1FB represents one full band ply, and 1FB' means a full band ply wherein a part of cords are cut in the central area of the ply.
*2 PEN represents polyethylene-2,6-naphthalate.

TABLE 3

|  | Example 12 | Example 13 | Example 14 | Example 15 | Example 16 | Comparative Example 5 | Comparative Example 6 |
| --- | --- | --- | --- | --- | --- | --- | --- |
| Belt layer width BW <mm> | 148 | 148 | 148 | 148 | 148 | 148 | 148 |
| Band structure *1 | 1FB | 1FB | 1FB | 1FB' | 1FB' | 1FB' | 1FB' |
| Ply width W <mm> | 148 | 148 | 148 | 148 | 148 | 148 | 148 |
| Cord material *2 | PEN | PEN | PEN | PEN | PEN | PEN | PEN |
| Cord sectional area S <mm$^2$> | 0.1618 | 0.1618 | 0.1618 | 0.1618 | 0.1618 | 0.1618 | 0.1618 |
| Cord modulus M <N/mm$^2$> | 15230 | 15230 | 10001 | 15230 | 15230 | 15230 | 15230 |
| Cord arrangement density D <number/1 cm> | 10 | 4 | 8 | 10 | 10 | 10 | 10 |
| Elongation resistance value K |  |  |  |  |  |  |  |
| Central area Kc | 246 | 99 | 129 | 172 | 123 | 49 | 0 |
| Outside area Ks | 246 | 99 | 129 | 246 | 246 | 246 | 246 |
| Number J of cords in the belt-form ply | 10 | 10 | 10 | 10 | 10 | 10 | 10 |
| Number of the cords cut in the central area | 0 | 0 | 0 | 3 | 5 | 8 | 10 |
| Road noise performance <dB> | −2.9 | −0.2 | −0.8 | −2.8 | −2.7 | −2.5 | −2.4 |

TABLE 3-continued

|  | Example 12 | Example 13 | Example 14 | Example 15 | Example 16 | Comparative Example 5 | Comparative Example 6 |
|---|---|---|---|---|---|---|---|
| Transit noise performance <dB(A)> | 0.3 | −0.1 | 0.0 | 0.0 | −0.1 | −0.1 | −0.2 |
| Rolling resistance performance | 3 | 0 | 1 | 4 | 4 | 5 | 6 |

*1 1FB represents one full band ply, and 1FB' means a full band ply wherein a part of cords are cut in the central area of the ply.
*2 PEN represents polyethylene-2,6-naphthalate.

(Second Invention)

In the same way as in the first invention, tires having a tire size of 195/65R15 91H were made by way of trial on the basis of the specifications of Tables 4, 5, 6 and 7. Furthermore, the road noise performance, the transit noise performance and the rolling resistance performance of the respective sample tires were tested and compared in the same way as in the first invention.

TABLE 4

|  | Comparative Example 1 | Example 1 | Example 2 | Example 3 | Example 4 | Example 5 | Example 6 | Comparative Example 2 | Comparative Example 3 | Example 7 | Example 8 | Example 9 | Example 10 |
|---|---|---|---|---|---|---|---|---|---|---|---|---|---|
| Band structure *1 | IEB | IEB | IEB | IEB | IEB | IEB | IEB | IEB | IEB | IEB | IEB | IEB | IEB |
| Cord material *2 | NYL | PEN | PEN | PEN | PEN | PEN | PEN | PEN | PEN | PEN | PEN | PEN | PEN |
| Sectional area S <mm$^2$> | 0.248 | 0.246 | 0.246 | 0.246 | 0.246 | 0.246 | 0.246 | 0.246 | 0.246 | 0.246 | 0.246 | 0.246 | 0.246 |
| Modulus M <N/mm$^2$> | 3228 | 11235 | 11235 | 11235 | 11235 | 11235 | 11235 | 11235 | 11235 | 11235 | 11235 | 11235 | 11235 |
| Arrangement density D <number/1 cm> | 10 | 10 | 10 | 10 | 10 | 10 | 10 | 10 | 10 | 14 | 14 | 14 | 14 |
| Elongation resistance value K | 80 | 276 | 276 | 276 | 276 | 276 | 276 | 276 | 276 | 386 | 386 | 386 | 386 |
| Width ratio Wb/WB <%> | 50 | 7 | 14 | 20 | 27 | 34 | 41 | 47 | 50 | 7 | 14 | 20 | 27 |
| Road noise performance <dB> | 0.0 | −0.5 | −1.3 | −2.9 | −2.9 | −3.2 | −3.2 | −3.4 | −3.4 | −1.0 | −2.5 | −5.1 | −5.3 |
| Transit noise performance <dB(A)> | 0.0 | −0.3 | −0.4 | −0.4 | −0.4 | −0.4 | −0.3 | −0.1 | 0.0 | −0.5 | −0.4 | −0.4 | −0.3 |
| Rolling resistance performance | 0 | −2 | 0 | 0 | 0 | 5 | 2 | 2 | 1 | −1 | 0 | 8 | 12 |

*1 IEB represents a pair of edge band plies.
*2 PEN represents polyethylene-2,6-naphthalate.
(The belt layer width BW was 148 mm in all of the examples.)

TABLE 5

|  | Example 11 | Example 12 | Comparative Example 4 | Comparative Example 5 | Comparative Example 6 | Example 13 | Example 14 | Example 15 | Example 16 | Example 17 | Example 18 | Example 19 | Comparative Example 7 |
|---|---|---|---|---|---|---|---|---|---|---|---|---|---|
| Band structure *1 | IEB | IEB | IEB | IEB | IEB | IEB | IEB | IEB | IEB | IEB | IEB | IEB | IEB |
| Cord material *2 | PEN | PEN | PEN | PEN | PEN | PEN | PEN | PEN | PEN | PEN | PEN | PEN | PEN |
| Sectional area S <mm$^2$> | 0.246 | 0.246 | 0.246 | 0.246 | 0.246 | 0.246 | 0.246 | 0.246 | 0.246 | 0.162 | 0.162 | 0.162 | 0.162 |
| Modulus M <N/mm$^2$> | 11235 | 11235 | 11235 | 11235 | 11235 | 11235 | 11235 | 11235 | 11235 | 12590 | 12590 | 12590 | 12590 |
| Arrangement density D <number/1 cm> | 14 | 14 | 14 | 14 | 6 | 6 | 6 | 6 | 6 | 16 | 16 | 16 | 16 |
| Elongation resistance value K | 386 | 386 | 386 | 386 | 166 | 166 | 166 | 166 | 166 | 326 | 326 | 326 | 326 |
| Width ratio Wb/WB <%> | 34 | 41 | 47 | 50 | 7 | 20 | 34 | 47 | 50 | 7 | 20 | 34 | 47 |
| Road noise performance <dB> | −5.5 | −5.7 | −5.9 | −5.9 | 0.3 | −0.9 | −1.0 | −1.3 | −1.3 | −0.8 | −4.4 | −4.6 | −4.9 |
| Transit noise performance <dB(A)> | −0.2 | −0.1 | 0.3 | 0.5 | −0.4 | −0.4 | −0.4 | −0.4 | −0.2 | −0.4 | −0.4 | −0.3 | 0.4 |
| Rolling resistance performance | 9 | 8 | 7 | 6 | −3 | 1 | 0 | −1 | −1 | 0 | 7 | 7 | 6 |

*1 IEB represents a pair of edge band plies.
*2 PEN represents polyethylene-2,6-naphthalate.
(The belt layer width BW was 148 mm in all of the examples.)

TABLE 6

|  | Comparative Example 8 | Comparative Example 9 | Comparative Example 10 | Example 20 | Example 21 | Example 22 | Example 23 | Example 24 | Example 25 | Comparative Example 11 | Comparative Example 12 | Comparative Example 13 | Comparative Example 14 |
|---|---|---|---|---|---|---|---|---|---|---|---|---|---|
| Band structure *1 | IEB | IEB | IEB | IEB | IEB | IEB | IEB | IEB | IEB | IEB | IEB | IEB | IEB |
| Cord material *2 | PEN | PEN | PEN | PEN | PEN | PEN | PEN | PEN | PEN | PEN | PEN | PEN | PEN |
| Sectional area S <mm$^2$> | 0.162 | 0.162 | 0.162 | 0.162 | 0.162 | 0.162 | 0.162 | 0.162 | 0.162 | 0.162 | 0.162 | 0.162 | 0.162 |
| Modulus M <N/mm$^2$> | 12590 | 12590 | 12590 | 12590 | 12590 | 12590 | 12590 | 12590 | 12590 | 12590 | 12590 | 12590 | 12590 |
| Arrangement density D <number/1 cm> | 16 | 6 | 6 | 6 | 6 | 6 | 6 | 6 | 6 | 4 | 4 | 4 | 4 |
| Elongation resistance value K | 326 | 122 | 122 | 122 | 122 | 122 | 122 | 122 | 122 | 81 | 81 | 81 | 81 |
| Width ratio Wb/WB <%> | 50 | 7 | 14 | 20 | 27 | 34 | 41 | 47 | 50 | 7 | 20 | 34 | 47 |
| Road noise performance <dB> | −5.0 | 0.7 | 0.3 | −0.4 | −0.4 | −0.4 | −0.5 | −0.6 | −0.7 | 1.1 | 0.3 | 0.2 | 0.1 |
| Transit noise performance <dB(A)> | 0.5 | −0.4 | −0.4 | −0.5 | −0.4 | −0.5 | −0.4 | −0.4 | −0.3 | −0.5 | −0.4 | −0.5 | −0.5 |
| Rolling resistance performance | 4 | −3 | −1 | 0 | −1 | −1 | −2 | −2 | −2 | −3 | −2 | −2 | −2 |

*1 IEB represents a pair of edge band plies.
*2 PEN represents polyethylene-2,6-naphthalate.
(The belt layer width BW was 148 mm in all of the examples.)

TABLE 7

|  | Comparative Example 15 | Comparative Example 16 | Example 26 | Example 27 | Example 28 | Example 29 | Example 30 | Example 31 | Example 32 | Example 33 | Example 34 | Example 35 |
|---|---|---|---|---|---|---|---|---|---|---|---|---|
| Band structure *1 | IEB | IEB | IEB | IEB | IEB | IEB | IEB | IEB | IEB | IEB | IEB | IEB |
| Cord material *2 | PEN | PEN | PEN | PEN | PEN | PEN | PEN | PEN | PEN | PEN | PEN | PEN |
| Sectional area S <mm$^2$> | 0.162 | 0.246 | 0.246 | 0.246 | 0.246 | 0.246 | 0.162 | 0.162 | 0.162 | 0.162 | 0.162 | 0.162 |
| Modulus M <N/mm$^2$> | 12590 | 8657 | 8657 | 8657 | 8657 | 8657 | 15230 | 15230 | 15230 | 15230 | 15230 | 15230 |
| Arrangement density D <number/1 cm> | 4 | 10 | 10 | 10 | 10 | 10 | 10 | 10 | 10 | 10 | 10 | 10 |
| Elongation resistance value K | 81 | 213 | 213 | 213 | 213 | 213 | 246 | 246 | 246 | 246 | 246 | 246 |
| Width ratio Wb/WB <%> | 50 | 7 | 20 | 34 | 47 | 50 | 7 | 20 | 34 | 41 | 47 | 50 |
| Road noise performance <dB> | 0.1 | 0.0 | −1.9 | −2.1 | −2.2 | −2.4 | −0.4 | −2.4 | −2.5 | −2.5 | −2.7 | −2.7 |
| Transit noise performance <dB(A)> | −0.5 | −0.4 | −0.4 | −0.5 | −0.1 | −0.1 | −0.4 | −0.5 | −0.5 | −0.3 | −0.2 | −0.1 |
| Rolling resistance performance | −2 | −2 | 1 | 1 | 0 | 0 | −2 | 2 | 2 | 0 | 0 | 0 |

*1 IEB represents a pair of edge band plies.
*2 PEN represents polyethylene-2,6-naphthalate.
(The belt layer width BW was 148 mm in all of the example s.)

(Third Invention)

In the same way as in the first invention, tires having a tire size of 195/65R15 91H were made by way of trial on the basis of the specifications of Tables 4, 5, 6 and 7. Furthermore, the road noise performance, the transit noise performance and the rolling resistance performance of the respective sample tires were tested and compared in the same way as in the first invention.

TABLE 8

|  |  | Comparative Example 1 | Example 1 | Example 2 | Example 3 | Example 4 | Example 5 | Example 6 | Example 7 | Example 8 |
|---|---|---|---|---|---|---|---|---|---|---|
| Band cord material |  | NYLON | PEN | PEN | PEN | PEN | PEN | PEN | PEN | PEN |
| Edge band ply | Width ratio (Wb/WB) [%] | 0 | 7 | 14 | 20 | 27 | 34 | 41 | 47 | 50 |
|  | Band cord sectional area S [mm$^2$] | — | 0.246 | 0.246 | 0.246 | 0.246 | 0.246 | 0.246 | 0.246 | 0.246 |
|  | Band cord 2% modulus M [N/mm$^2$] | — | 11235 | 11235 | 11235 | 11235 | 11235 | 11235 | 11235 | 11235 |
|  | Band cord arrangement | — | 10 | 10 | 10 | 10 | 10 | 10 | 10 | 10 |

TABLE 8-continued

| | | Comparative Example 1 | Example 1 | Example 2 | Example 3 | Example 4 | Example 5 | Example 6 | Example 7 | Example 8 |
|---|---|---|---|---|---|---|---|---|---|---|
| | density D [number/cm] | | | | | | | | | |
| | Elongation resistance value K [N' cord number/cm] | — | 276 | 276 | 276 | 276 | 276 | 276 | 276 | 276 |
| Full band ply | Number thereof | 1 | 1 | 1 | 1 | 1 | 1 | 1 | 1 | 1 |
| | Band cord sectional area S [mm$^2$] | 0.248 | 0.246 | 0.246 | 0.246 | 0.246 | 0.246 | 0.246 | 0.246 | 0.246 |
| | Band cord 2% modulus M [N/mm$^2$] | 3.228 | 11235 | 11235 | 11235 | 11235 | 11235 | 11235 | 11235 | 11235 |
| | Band cord arrangement density D [number/cm] | 10 | 10 | 10 | 10 | 10 | 10 | 10 | 10 | 10 |
| | Elongation resistance value K [N' cord number/cm] | 80 | 276 | 276 | 276 | 276 | 276 | 276 | 276 | 276 |
| Test results | Road noise [dB] | Standard | −3.9 | −4.7 | −5.2 | −5.3 | −5.6 | −5.8 | −6.1 | −6.0 |
| | Transit noise (OA) [dB] | Standard | 0 | 0 | 0.1 | 0.3 | 0.7 | 1.1 | 1.7 | 1.8 |
| | Rolling resistance [× 10$^{-4}$] | Standard | 3 | 6 | 12 | 10 | 7 | 5 | 0 | −1 |

*PEN: polyethylene-2,6-naphthalate.
*The belt layer width WB was 148 mm in all of the examples.

TABLE 9

| | | Comparative Example 1 | Example 9 | Example 10 | Example 11 | Example 12 | Example 13 | Example 14 | Example 15 | Example 16 |
|---|---|---|---|---|---|---|---|---|---|---|
| Band cord material | | NYLON | PEN | PEN | PEN | PEN | PEN | PEN | PEN | PEN |
| Edge band ply | Width ratio (Wb/WB) [%] | 0 | 7 | 14 | 20 | 27 | 34 | 41 | 47 | 50 |
| | Band cord sectional area S [mm$^2$] | — | 0.246 | 0.246 | 0.246 | 0.246 | 0.246 | 0.246 | 0.246 | 0.246 |
| | Band cord 2% modulus M [N/mm$^2$] | — | 11235 | 11235 | 11235 | 11235 | 11235 | 11235 | 11235 | 11235 |
| | Band cord arrangement density D [number/cm] | — | 14 | 14 | 14 | 14 | 14 | 14 | 14 | 14 |
| | Elongation resistance value K [N' cord number/cm] | — | 386 | 386 | 386 | 386 | 386 | 386 | 386 | 386 |
| Full band ply | Number thereof | 1 | 1 | 1 | 1 | 1 | 1 | 1 | 1 | 1 |
| | Band cord sectional area S [mm$^2$] | 0.248 | 0.246 | 0.246 | 0.246 | 0.246 | 0.246 | 0.246 | 0.246 | 0.246 |
| | Band cord 2% modulus M [N/mm$^2$] | 3.228 | 11235 | 11235 | 11235 | 11235 | 11235 | 11235 | 11235 | 11235 |
| | Band cord arrangement density D [number/cm] | 10 | 14 | 14 | 14 | 14 | 14 | 14 | 14 | 14 |
| | Elongation resistance value K [N' cord number/cm] | 80 | 386 | 386 | 386 | 386 | 386 | 386 | 386 | 386 |
| Test results | Road noise [dB] | Standard | −5.6 | −5.7 | −5.8 | −5.4 | −5.6 | −5.8 | −5.9 | −6.1 |
| | Transit noise (OA) [dB] | Standard | 0.6 | 0.6 | 0.5 | 1.1 | 1.9 | 2.9 | 3.9 | 4.3 |
| | Rolling resistance [× 10$^{-4}$] | Standard | 9 | 13 | 19 | 17 | 14 | 9 | 1 | −2 |

TABLE 10

| | | Comparative Example 1 | Example 17 | Example 18 | Example 19 | Example 20 | Example 21 |
|---|---|---|---|---|---|---|---|
| Band cord material | | NYLON | PEN | PEN | PEN | PEN | PEN |
| Edge band ply | Width ratio (Wb/WB) [%] | 0 | 7 | 20 | 34 | 47 | 50 |
| | Band cord sectional area S [mm$^2$] | — | 0.246 | 0.246 | 0.246 | 0.246 | 0.246 |
| | Band cord 2% modulus M [N/mm$^2$] | — | 11235 | 11235 | 11235 | 11235 | 11235 |
| | Band cord arrangement density D [number/cm] | — | 8 | 8 | 8 | 8 | 8 |
| | Elongation resistance value K [N' cord number/cm] | — | 221 | 221 | 221 | 221 | 221 |
| Full band ply | Number thereof | 1 | 1 | 1 | 1 | 1 | 1 |
| | Band cord sectional area S [mm$^2$] | 0.248 | 0.246 | 0.246 | 0.246 | 0.246 | 0.246 |
| | Band cord 2% modulus M [N/mm$^2$] | 3.228 | 11235 | 11235 | 11235 | 11235 | 11235 |
| | Band cord arrangement density D [number/cm] | 10 | 8 | 8 | 8 | 8 | 8 |
| | Elongation resistance value K [N' cord number/cm] | 80 | 221 | 221 | 221 | 221 | 221 |
| Test results | Road noise [dB] | Standard | −2.7 | −4.3 | −4.6 | −4.7 | −4.9 |
| | Transit noise (OA) [dB] | Standard | −0.2 | −0.2 | 0.3 | 0.8 | 0.9 |
| | Rolling resistance [× 10$^{-4}$] | Standard | 2 | 6 | 4 | 0 | 0 |

TABLE 11

|  | Comparative Example 1 | Example 22 | Example 23 | Example 24 | Example 25 | Example 26 | Example 27 | Example 28 | Example 29 |
|---|---|---|---|---|---|---|---|---|---|
| Band cord material | NYLON | PEN | PEN | PEN | PEN | PEN | PEN | PEN | PEN |
| Edge band ply |  |  |  |  |  |  |  |  |  |
| Width ratio (Wb/WB) [%] | 0 | 7 | 14 | 20 | 27 | 34 | 41 | 47 | 50 |
| Band cord sectional area S [mm$^2$] | — | 0.246 | 0.246 | 0.246 | 0.246 | 0.246 | 0.246 | 0.246 | 0.246 |
| Band cord 2% modulus M [N/mm$^2$] | — | 11235 | 11235 | 11235 | 11235 | 11235 | 11235 | 11235 | 11235 |
| Band cord arrangement density D [number/cm] | — | 6 | 6 | 6 | 6 | 6 | 6 | 6 | 6 |
| Elongation resistance value K [N' cord number/cm] | — | 166 | 166 | 166 | 166 | 166 | 166 | 166 | 166 |
| Full band ply |  |  |  |  |  |  |  |  |  |
| Number thereof | 1 | 1 | 1 | 1 | 1 | 1 | 1 | 1 | 1 |
| Band cord sectional area S [mm$^2$] | 0.248 | 0.246 | 0.246 | 0.246 | 0.246 | 0.246 | 0.246 | 0.246 | 0.246 |
| Band cord 2% modulus M [N/mm$^2$] | 3.228 | 11235 | 11235 | 11235 | 11235 | 11235 | 11235 | 11235 | 11235 |
| Band cord arrangement density D [number/cm] | 10 | 6 | 6 | 6 | 6 | 6 | 6 | 6 | 6 |
| Elongation resistance value K [N' cord number/cm] | 80 | 166 | 166 | 166 | 166 | 166 | 166 | 166 | 166 |
| Test results |  |  |  |  |  |  |  |  |  |
| Road noise [dB] | Standard | −1.6 | −2.0 | −2.6 | −2.8 | −2.9 | −3.0 | −2.9 | −3.1 |
| Transit noise (OA) [dB] | Standard | −0.3 | −0.3 | −0.3 | −0.2 | −0.2 | 0 | 0.1 | 0.2 |
| Rolling resistance [×10$^{-4}$] | Standard | 1 | 2 | 3 | 2 | 1 | 0 | 0 | −1 |

TABLE 12

|  | Comparative Example 1 | Example 30 | Example 31 | Example 32 | Example 33 | Example 34 |
|---|---|---|---|---|---|---|
| Band cord material | NYLON | PEN | PEN | PEN | PEN | PEN |
| Edge band ply |  |  |  |  |  |  |
| Width ratio (Wb/WB) [%] | 0 | 7 | 20 | 34 | 47 | 50 |
| Band cord sectional area S [mm$^2$] | — | 0.246 | 0.246 | 0.246 | 0.246 | 0.246 |
| Band cord 2% modulus M [N/mm$^2$] | — | 11235 | 11235 | 11235 | 11235 | 11235 |
| Band cord arrangement density D [number/cm] | — | 4 | 4 | 4 | 4 | 4 |
| Elongation resistance value K [N' cord number/cm] | — | 110 | 110 | 110 | 110 | 110 |
| Full band ply |  |  |  |  |  |  |
| Number thereof | 1 | 1 | 1 | 1 | 1 | 1 |
| Band cord sectional area S [mm$^2$] | 0.248 | 0.246 | 0.246 | 0.246 | 0.246 | 0.246 |
| Band cord 2% modulus M [N/mm$^2$] | 3.228 | 11235 | 11235 | 11235 | 11235 | 11235 |
| Band cord arrangement density D [number/cm] | 10 | 4 | 4 | 4 | 4 | 4 |
| Elongation resistance value K [N' cord number/cm] | 80 | 110 | 110 | 110 | 110 | 110 |
| Test results |  |  |  |  |  |  |
| Road noise [dB] | Standard | −0.5 | −1.2 | −1.2 | −1.4 | −1.3 |
| Transit noise (OA) [dB] | Standard | −0.5 | −0.4 | −0.3 | −0.2 | −0.3 |
| Rolling resistance [×10$^{-4}$] | Standard | −2 | −1 | −1 | −2 | −2 |

TABLE 13

|  | Comparative Example 1 | Example 35 | Example 36 | Example 37 | Example 38 | Example 39 |
|---|---|---|---|---|---|---|
| Band cord material | NYLON | PEN | PEN | PEN | PEN | PEN |
| Edge band ply |  |  |  |  |  |  |
| Width ratio (Wb/WB) [%] | 0 | 7 | 20 | 34 | 47 | 50 |
| Band cord sectional area S [mm$^2$] | — | 0.162 | 0.162 | 0.162 | 0.162 | 0.162 |
| Band cord 2% modulus M [N/mm$^2$] | — | 11230 | 11230 | 11230 | 11230 | 11230 |
| Band cord arrangement density D [number/cm] | — | 14 | 14 | 14 | 14 | 14 |
| Elongation resistance value K [N' cord number/cm] | — | 345 | 345 | 345 | 345 | 345 |
| Full band ply |  |  |  |  |  |  |
| Number thereof | 1 | 1 | 1 | 1 | 1 | 1 |
| Band cord sectional area S [mm$^2$] | 0.248 | 0.162 | 0.162 | 0.162 | 0.162 | 0.162 |

TABLE 13-continued

|  | Comparative Example 1 | Example 35 | Example 36 | Example 37 | Example 38 | Example 39 |
|---|---|---|---|---|---|---|
| Band cord 2% modulus M [N/mm$^2$] | 3.228 | 11230 | 11230 | 11230 | 11230 | 11230 |
| Band cord arrangement density D [number/cm] | 10 | 14 | 14 | 14 | 14 | 14 |
| Elongation resistance value K [N' cord number/cm] | 80 | 345 | 345 | 345 | 345 | 345 |
| Test results |  |  |  |  |  |  |
| Road noise [dB] | Standard | −5.3 | −5.5 | −5.5 | −5.8 | −6.0 |
| Transit noise (OA) [dB] | Standard | 0.4 | 0.4 | 1.6 | 3.4 | 3.8 |
| Rolling resistance [×10$^{-4}$] | Standard | 8 | 18 | 13 | 1 | −2 |

(Invention about Density Change)

Tires having a tire size of 195/65R15 91H were made by way of trial on the basis of the specification of Table 1. The road noise performance, the transit noise performance and the rolling resistance performance of the respective sample tires were tested to compare the performances thereof with each other. The thicknesses T of the topping rubbers of the belt-form plies were unified into 0.9 mm. The widths of the belt-form plies were 4 mm in Example 18, 7 mm in Example 19, 3 mm in Example 20, 14 mm in Example 22, 6 mm in Example 23, 19 mm in Example 25, and 20 mm in Example 26. All the widths in the others were 10 mm.

The test manner was the same as in the first invention. However, the rolling resistance performance is converted into a point value obtained by dividing the rolling resistance value (N) by the load (N) and then multiplying the resultant value by 10$^4$, and is represented as a change amount using the point value of Comparative Example 1 as a standard. Accordingly, minus representations mean decreased amounts of the point values of the rolling resistance from Comparative Example 1.

The test results and so on are shown in Tables 14 to 17.

TABLE 14

Figure 19:
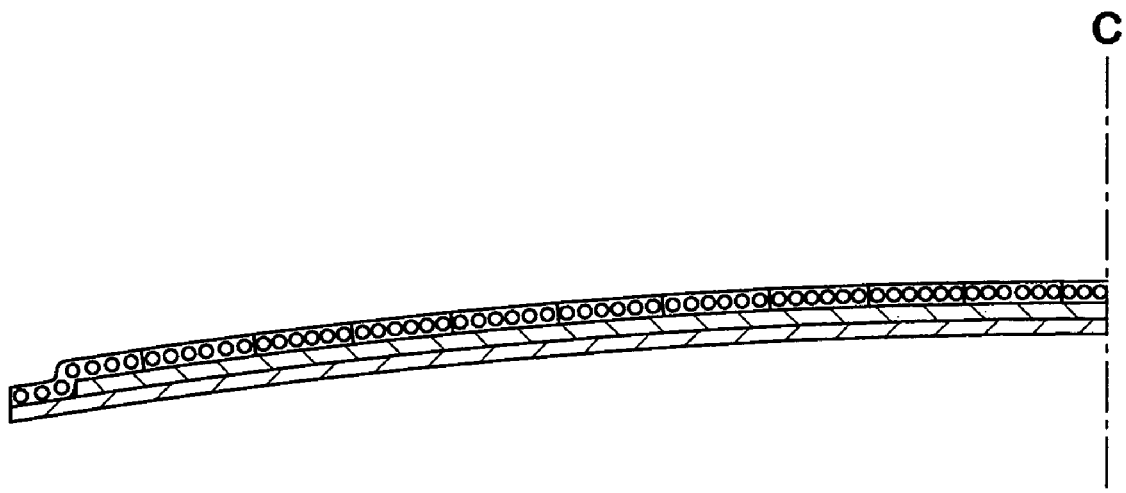
FIG. 19 is a sectional view illustrating a band ply of Comparative Example.

| | Comparative Example 1 | Comparative Example 2 | Example 1 | Example 2 | Example 3 | Example 4 | Example 5 | Example 6 | Comparative Example 3 | Comparative Example 4 | Example 7 | Comparative Example 5 | Example 8 |
|---|---|---|---|---|---|---|---|---|---|---|---|---|---|
| Specification of the band layer | | | | | | | | | | | | | |
| Band structure figure | FIG. 19 | | | | FIG. 15 | | | | FIG. 20 | | | FIG. 15 | |
| Band cord material | NYLON | | | | | | PEN | | | | | | |
| Band cord sectional area S [mm$^2$] | 0.248 | | | | | | 0.246 | | | | | | |
| Band cord 2% modulus M [N/mm$^2$] | 3228 | | | | 11235 | | | | | | 13568 | | |
| Band cord arrangement density D in the belt-form ply [number/cm] | | | | 10 | | | | | | | 14 | | 10 |
| Elongation resistance value K of the belt-form ply [N' cord number/cm] (S' M' D) | 80 | | | | 276 | | | | | | 467 | | 334 |
| Winding pitch of the high density portions *1 | | | | | | | 1.0 | | | | | | |
| Width BW1/W [%] of the high density portions | 100 | | | | 20 | | | | 100 | | 20 | 100 | 20 |
| Winding pitch of the low density portions *1 | — | 1.2 | 1.4 | 1.6 | 2.0 | 2.4 | 2.6 | | — | | 2.0 | — | 2.0 |
| Test results | | | | | | | | | | | | | |
| Road noise decrease value [dB] | Standard | −3.4 | −3.3 | −3.2 | −3.1 | −3.0 | −2.9 | | −5.5 | | −5.0 | −4.4 | −4.1 |
| Transit noise O. A. [dB] | Standard | 0.3 | 0.2 | 0.1 | 0 | −0.1 | −0.4 | | 1.0 | | 0.5 | | 0.1 |
| Rolling resistance [point value] | Standard | 4 | | | 5 | | 6 | | 8 | 9 | 12 | 5 | 8 |

*1 Ratio thereof to the width of the belt-form ply

TABLE 15

| | Comparative Example 6 | Example 9 | Comparative Example 8 | Example 11 | Comparative Example 7 | Example 10 | Comparative Example 9 | Example 12 | Comparative Example 10 | Example 13 | Example 4 | Example 14 | Example 15 |
|---|---|---|---|---|---|---|---|---|---|---|---|---|---|
| Specification of the band layer | | | | | | | | | | | | | |
| Band structure figure | | | | | | FIG. 15 | | | | | | | |
| Band cord material | | | | | | PEN | | | | | | | |
| Band cord sectional area S [mm²] | 0.162 | 0.162 | 0.246 | 0.246 | 0.162 | 0.162 | 0.162 | 0.162 | 0.162 | 0.162 | 0.246 | 0.246 | 0.246 |
| Band cord 2% modulus M [N/mm²] | 12590 | 12590 | 8657 | 8657 | 15230 | 15230 | 12590 | 12590 | 10001 | 10001 | 11235 | 11235 | 11235 |
| Band cord arrangement density D in the belt-form ply [number/cm] | 14 | 14 | 14 | 14 | 10 | 10 | 10 | 10 | 10 | 10 | 10 | 10 | 10 |
| Elongation resistance value K of the belt-form ply [N' cord number/cm] (S' M' D) | 286 | 286 | 213 | 213 | 247 | 247 | 204 | 204 | 162 | 162 | 276 | 276 | 276 |
| Winding pitch of the high density portions *1 | | | | | | | | 1.0 | | 1.0 | 1.0 | 1.0 | 1.0 |
| Width BW1/W [%] of the high density portions | | | | | | 20 | | 20 | | 20 | | 7 | 14 |
| Winding pitch of the low density portions *1 | — | 2.0 | — | 2.0 | — | 2.0 | — | 2.0 | — | 2.0 | — | 2.0 | — |
| Test results | | | | | | | | | | | | | |
| Road noise decrease value [dB] | -4.0 | -3.7 | -2.3 | -2.1 | -2.2 | -2.0 | -2.9 | -2.7 | -1.5 | -1.3 | -3.1 | 0 | -1.7 |
| Transit noise O. A. [dB] | 0.6 | 0.3 | 0.2 | 0.1 | 0.2 | 0.1 | 0.3 | 0.1 | | | | 0 | |
| Rolling resistance [point value] | 5 | 8 | 3 | 4 | 2 | 4 | 3 | 5 | 2 | 3 | 6 | -2 | -2 |

TABLE 16

| | Example 16 | Example 17 | Example 18 | Example 19 | Example 20 | Example 21 | Example 22 | Example 23 |
|---|---|---|---|---|---|---|---|---|
| Specification of the band layer | | | | | | | | |
| Band structure figure | | | | FIG. 15 | | | | |
| Band cord material | | | | PEN | | | | |
| Band cord sectional area S [mm²] | | | | 0.246 | | | | |
| Band cord 2% modulus M [N/mm²] | | | | 11235 | | | | |
| Band cord arrangement density D in the belt-form ply [number/cm] | | | | 10 | | | | |
| Elongation resistance value K of the belt-form ply [N' cord number/cm] (S' M' D) | | | | 276 | | | | |
| Winding pitch of the high density portions *1 | | | | 1.0 | | | | |
| Width BW1/W [%] of the high density portions | 27 | 34 | | | 20 | | | |
| Winding pitch of the low density portions *1 | | | 2.0 | | 1.4 | 2.4 | 2.0 | 1.4 |

TABLE 16-continued

|  | Example 16 | Example 17 | Example 18 | Example 19 | Example 20 | Example 21 | Example 22 | Example 23 |
|---|---|---|---|---|---|---|---|---|
| Test results |  |  |  |  |  |  |  |  |
| Road noise decrease value [dB] | −3.2 | −3.3 | −3.1 | −3.3 | −3.1 | −3.3 |  |  |
| Transit noise O. A. [dB] | 0.1 | 0.3 | 0.1 | 0.2 | 0.1 | 0.2 |  |  |
| Rolling resistance [point value] | 6 | 5 | 6 | 5 | 6 | 5 |  |  |

TABLE 17

|  | Example 24 | Example 25 | Example 26 | Comparative Example 12 | Example 27 | Comparative Example 12 | Example 28 |
|---|---|---|---|---|---|---|---|
| Specification of the band layer |  |  |  |  |  |  |  |
| Band structure figure | FIG. 18 |  |  | FIG. 15 |  |  |  |
| Band cord material | PEN |  |  | ARAMIDE |  | PEN |  |
| Band cord sectional area S [mm²] | 0.248 | 0.246 |  | 0.111 |  | 0.246 |  |
| Band cord 2% modulus M [N/mm²] |  | 11235 |  | 29703 |  | 11235 |  |
| Band cord arrangement density D in the belt-form ply [number/cm] |  |  |  | 10 |  |  |  |
| Elongation resistance value K of the belt-form ply [N′ cord number/cm] (S′ M′ D) |  | 276 |  | 330 |  | 276 |  |
| Winding pitch of the high density portions *1 |  |  |  | 1.0 |  |  |  |
| Width BW1/W [%] of the high density portions |  | 20 | 30 | 0 | 20 | 0 | 20 |
| Winding pitch of the low density portions *1 | 1.7 | 2.4 | 2.0 | 1.0 | 2.0 | 1.0 | 2.0 |
| Test results |  |  |  |  |  |  |  |
| Road noise decrease value [dB] | −3.2 |  | −3.1 | −5.3 | −5.0 | −4.1 | −3.9 |
| Transit noise O. A. [dB] |  | 0.1 |  | 0.5 | 0.2 |  | 0 |
| Rolling resistance [point value] |  | 6 |  | 5 | 7 | 8 | 9 |

(Invention of the Overlap of a Band with a Belt Layer)

Tires having a tire size of 195/65R15 91H were made by way of trial on the basis of the specifications of Tables 18 to 20. Furthermore, the road noise performance, and the endurance performances of the respective sample tires were tested. As band cords except Comparative Example 1, PEN cords having a sectional area S of 0.246 mm² were used. The 2% modulus M of the PEN cords was 11235 N/mm², and these were embedded at a density of 10 per cm to form band plies. In this way, the elongation resistance value K of the band plies made of PEN was set to 276. The width WB of the belt layer was set to 148 mm. On the other hand, in Comparative Example 1, nylon cords having a sectional area of 0.248 mm² and a 2% modulus of 3228 N/mm² were embedded at a density of 10 per cm to form a band ply.

In Examples 10 to 12 and Comparative Examples 5 to 6, composite belt layers using a band ply made of PEN and a band ply made of nylon cords were formed. The manner of the test was as follows. The manner for the road noise was the same as in the first invention. About the endurance performance, each of the sample tires was traveled on a drum for 200 hours under the following conditions: rim: 15×6 JJ, internal pressure: 200 kPa, load: 6.0 kN, and speed: 100 km/h. Thereafter, the tire was cut in the sectional direction at 4 positions in the circumferential direction, and then it was examined with the naked eye whether or not a belt edge looseness was generated at both ends of the belt layer in the respective sections.

TABLE 18

Figure 40A:
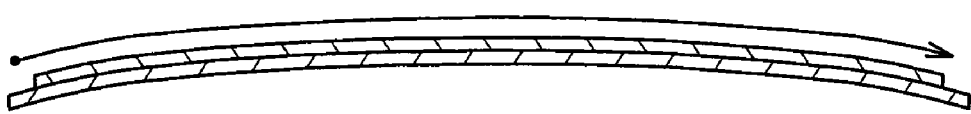
FIGS. 40(A) to (C) are schematic views illustrating an example of the band ply of a comparative example tire.
Figure 40B:
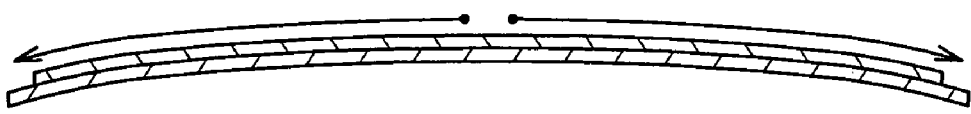

|  | Comparative Example 1 | Comparative Example 2 | Comparative Example 3 | Example 1 | Example 2 | Example 3 | Example 4 | Example 5 |
|---|---|---|---|---|---|---|---|---|
| Band ply structure figure | FIG. 40(A) | FIG. 40(A) | FIG. 40(B) | FIG. 23 | FIG. 27 | FIG. 33 | FIG. 34 | FIG. 31 |
| Band ply elongation resistance value K | 80 | 276 | 276 | 276 | 276 | 276 | 276 | 276 |
| Edge band portion width [mm] | — | — | — | — | 30 | 30 | — | 30 |
| Full band portion width [mm] | 148 | 148 | 148 | 148 | — | 148 | 148 × 2 | 148 |
| Test results |  |  |  |  |  |  |  |  |

TABLE 18-continued

|  | Comparative Example 1 | Comparative Example 2 | Comparative Example 3 | Example 1 | Example 2 | Example 3 | Example 4 | Example 5 |
|---|---|---|---|---|---|---|---|---|
| Belt edge looseness |  |  |  |  |  |  |  |  |
| Outer end 7e1 of the belt layer | Not generated | Not generated | Generated | Not generated | Not generated | Not generated | Not generated | Not generated |
| Outer end 7e2 of the belt layer | Not generated | Generated | Generated | Not generated | Not generated | Not generated | Not generated | Not generated |
| Road noise (change amount) [dB] | Standard | −3.4 | −3.4 | −3.4 | −2.9 | −5.2 | −5.9 | −5.2 |

TABLE 19

|  | Example 6 | Example 7 | Example 8 | Example 9 | Comparative Example 4 | Example 13 | Example 14 |
|---|---|---|---|---|---|---|---|
| Band ply structure figure | FIG. 32 | FIG. 28 | FIG. 29 | FIG. 30 | FIG. 23 | FIG. 38 | FIG. 39 |
| Band ply elongation resistance value K | 276 | 276 | 276 | 276 | 497 | 276 | 276 |
| Edge band portion width [mm] | 30 | 30 | — | — | — | — | — |
| Full band portion width [mm] | 148 | 148 | 148 × 2 | 148 × 2 | 148 | 165 | 140 |
| Test results |  |  |  |  |  |  |  |
| Belt edge looseness |  |  |  |  |  |  |  |
| Outer end 7e1 of the belt layer | Not generated | Not generated | Not generated | Not generated | Not generated | Not generated | Not generated |
| Outer end 7e2 of the belt layer | Not generated | Not generated | Not generated | Not generated | Not generated | Not generated | Not generated |
| Road noise (change amount) [dB] | −5.2 | −5.2 | −5.9 | −5.9 | −3.4 | −3.8 | −2.2 |

TABLE 20

Figure 40C:
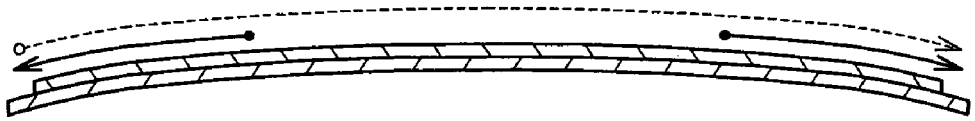
Figure 40D:
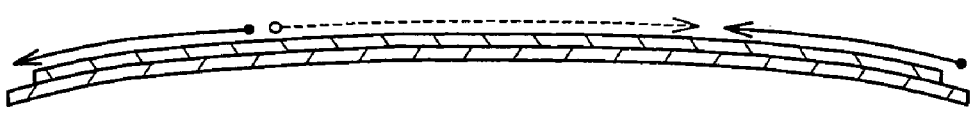

|  | Example 10 | Example 11 | Example 12 | Comparative Example 5 | Comparative Example 6 |
|---|---|---|---|---|---|
| Band ply structure figure | FIG. 35 | FIG. 36 | FIG. 37 | FIG. 40(C) | FIG. 40(D) |
| Band cord material | Edge band was made of PEN, and crown portion was made of nylon | Edge band was made of PEN, and crown portion was made of nylon | Inner band was made of PEN, and outer band was made of nylon | Inner band was made of PEN, and outer band was made of nylon | Edge band was made of PEN, and crown portion was made of nylon |
| Edge band portion width [mm] | 30 | 30 | — | 30 | 30 |
| Full band (or crown band) width [mm] | 118 | 148 | 148 | 148 | 118 |
| Elongation resistance value K of PEN band ply | 276 | 276 | 276 | 276 | 276 |
| Elongation resistance value K of nylon band ply | 80 | 80 | 80 | 80 | 80 |
| Test results |  |  |  |  |  |
| Belt edge looseness |  |  |  |  |  |
| Outer end 7e1 of the belt layer | Not generated | Not generated | Not generated | Generated | Generated |
| Outer end 7e2 of the belt layer | Not generated | Not generated | Not generated | Generated | Not generated |
| Road noise (change amount) [dB] | −3.5 | −3.7 | −3.9 | −3.7 | −3.5 |

INDUSTRIAL APPLICABILITY

The pneumatic radial tire can exhibit the effect of decreasing road noise while keeping deterioration in transit noise and rolling resistance below a minimum tolerance limit since the elongation resistance value K of its full band ply is set within a given range.

The invention claimed is:

1. A pneumatic radial tire, comprising
a carcass extending between bead portions,
a belt layer arranged inside a tread portion and radially outside the carcass, and
a band layer arranged outside the belt layer,
the band layer comprising a band ply formed by winding spirally a belt-form ply including one or plural band cords being arranged and embedded in a topping rubber,
the band cord being made of polyethylene naphthalate having a sectional area in a range of from 0.13 to 0.35 mm$^2$ and a 2% modulus of not less than 10000 N/mm$^2$, wherein when the sectional area of the band cord is represented by S (unit: mm$^2$), the 2% modulus thereof is represented by M (unit: N/mm$^2$), and the band cord arrangement density per cm of the band ply is represented by D (unit: cord number/cm), the elongation resistance value K (unit: N' cord number/cm) specified by the following equation is set within the range of 99 to 700 in the band ply:

$$K = S \times M \times D / 100 \qquad (1).$$

2. The pneumatic radial tire according to claim 1, wherein the band layer is made of one full band ply which covers almost all of the width of the belt layer, and the elongation resistance value K (unit: N' cord number/cm) of the full band ply is set within the range of 99 to 334.

3. The pneumatic radial tire according to claim 2, wherein the number of the band cords in the belt-form ply is at least two, and in the full band ply, at least one band cord in the belt-form ply is/are cut in a band central area centralizing the equator of the tire and having a width of 20 to 80% of the width BW of the belt layer.

4. The pneumatic radial tire according to claim 3, wherein the number of the cut band cord is not less than 0.1 time the number of the band cords in the belt-form ply.

5. The pneumatic radial tire according to claim 2, wherein the band ply comprises a pair of high density portions each having the winding pitch of the belt-form ply being 1.0 time or less the width of the belt-form ply, and constituting both outer portions in the tire axial direction, and a low density portion having the winding pitch of the belt-form ply being from 1.2 to 2.6 times the width of the belt-form ply, and being formed between the high density portions.

6. The pneumatic radial tire according to claim 5, wherein the band ply is formed by winding the belt-form ply continuously and spirally from one of the high density portions to the other thereof.

7. The pneumatic radial tire according to claim 5 or 6, wherein the width of the high density portion along the tire axial direction is from 7 to 34% of the width of the belt layer.

8. The pneumatic radial tire according to claim 5, wherein the thickness of the topping rubber in the belt-form ply is from 0.7 to 1.5 mm.

9. The pneumatic radial tire according to claim 5, wherein the low density portion has a gradually-increasing portion wherein the winding pitch of the belt-form ply increases gradually toward the tire equator.

10. The pneumatic radial tire according to claim 2, wherein a winding terminal portion constituting a one-circumference portion ahead of a winding terminal of the belt-form ply is disposed at a position which does not directly contact the outer end of the belt layer along the tire axial direction.

11. The pneumatic radial tire according to claim 10, wherein at least one part of a winding starting end portion constituting a one-circumference portion in the rear of a winding starting end of the belt-form ply is covered with an afterward-wound belt-form ply.

12. The pneumatic radial tire according to claim 10 or 11, wherein the winding terminal portion is disposed outside the outer end of the belt layer along the tire axial direction.

13. The pneumatic radial tire according to claim 1, wherein the band layer comprises a pair of edge band plies arranged at both end portions of the belt layer, about the elongation resistance value K (unit: N' cord number/cm) and the width ratio of the width Wb of the edge band ply to the width WB of the belt layer (Wb/WB), the edge band plies are formed as follows:

(a) the elongation resistance value K is set within the range of 120 or more and less than 246, and the width ratio Wb/WB is set within the range of 0.2 or more and 0.5 or less, (b) the elongation resistance value K is set within the range of 246 or more and less than 276, and the width ratio Wb/WB is set within the range of more than 0 and 0.5 or less, or (c) the elongation resistance value K is set within the range of 276 or more and 450 or less, and the width ratio Wb/WB is set within the range of more than 0 and 0.41 or less.

14. The pneumatic radial tire according to claim 13, wherein in the edge band plies, the elongation resistance value K is set within the range of 120 or more and less than 246 and the width ratio Wb/WB is set within the range of 0.41 or more and 0.5 or less, or the elongation resistance value K is set within the range of 246 or more and 450 or less and the width ratio Wb/WB is set within the range of more than 0 and 0.14 or less.

15. The pneumatic radial tire according to claim 13, wherein a winding terminal portion constituting a one-circumference portion ahead of a winding terminal of the belt-form ply is disposed at a position which does not directly contact the outer end of the belt layer along the tire axial direction.

16. The pneumatic radial tire according to claim 15, wherein at least one part of a winding starting end portion constituting a one-circumference portion in the rear of a winding starting end of the belt-form ply is covered with an afterward-wound belt-form ply.

17. The pneumatic radial tire according to claim 15 or 16, wherein the winding terminal portion is disposed outside the outer end of the belt layer along the tire axial direction.

18. The pneumatic radial tire according to claim 1, wherein the band layer comprises one full band ply which covers almost all of the width of this belt layer and a pair of edge band plies arranged at both end portions of the belt layer, and the elongation resistance value K (unit: N' cord number/cm) of the respective band plies is set within the range of 110 to 386.

19. The pneumatic radial tire according to claim 18, wherein about the elongation resistance value K (unit: N' cord number/cm) of the edge band plies and the width ratio of the width Wb of the edge band ply to the width WB of the belt layer (Wb/WB), in the case that the elongation resistance value K is 110 or more and 170 or less, the width ratio (Wb/WB) is set to more than 0 and 0.5 or less, in the case that the elongation resistance value K is more than 170 and 280 or less, the width ratio (Wb/WB) is set to more than 0 and 0.07 or less, or 0.47 or more and 0.5 or less, and in the case that the elongation resistance value K is more than 280 and 386 or less, the width ratio (Wb/WB) is set to 0.47 or more and 0.5 or less.

20. The pneumatic radial tire according to claim 18, wherein about the elongation resistance value K (unit: N' cord number/cm) of the edge band plies and the width ratio of the width Wb of the edge band ply to the width WB of the belt layer (Wb/WB), in the case that the elongation resistance value K is 110 or more and 280 or less, the width ratio (Wb/WB) is set to more than 0 and 0.5 or less, in the case that the elongation resistance value K is more than 280 and less than 340, the width ratio (Wb/WB) is set to more than 0 and 0.4 or less, and in the case that the elongation resistance value K is 340 or more and 386 or less, the width ratio (Wb/WB) is set to more than 0 and less than 0.28.

21. The pneumatic radial tire according to claim 18, wherein about the elongation resistance value K (unit: N' cord number/cm) of the edge band plies and the width ratio of the width Wb of the edge band ply to the width WB of the belt layer (Wb/WB), in the case that the elongation resistance value K is 110 or more and 170 or less, the width ratio (Wb/WB) is set to more than 0 and 0.5 or less, and in the case that the elongation resistance value K is more than 170 and 280 or less, the width ratio (Wb/WB) is set to more than 0 and 0.07 or less, or 0.47 or more and 0.5 or less.

22. The pneumatic radial tire according to claim 18, wherein a winding terminal portion constituting a one-circumference portion ahead of a winding terminal of the belt-form ply is disposed at a position which does not directly contact the outer end of the belt layer along the tire axial direction.

23. The pneumatic radial tire according to claim 22, wherein at least one part of a winding starting end portion constituting a one-circumference portion in the rear of a winding starting end of the belt-form ply is covered with an afterward-wound belt-form ply.

24. The pneumatic radial tire according to claim 22 or 23, wherein the winding terminal portion is disposed outside the outer end of the belt layer along the tire axial direction.

25. The pneumatic radial tire according to claim 2, wherein the full band ply comprises a pair of outside areas and a central area therebetween, the central area has a width of from 20 to 80% the width of the belt layer, and the elongation resistance of the central area is not more than 0.9 time the elongation resistance of the outside area.

26. The pneumatic radial tire according to claim 5, wherein the high density portion has a gradually-increasing portion wherein the winding pitch of the belt-form ply increases gradually toward the tire equator.

27. The pneumatic radial tire according to claim 9 or 26, wherein the gradually-increasing portion has an increasing rate of the winding pitch of from 5 to 55%.

28. The pneumatic radial tire according to claim 5, wherein the band layer further comprises a pair of edge band plies each disposed radially outside the full band ply to cover only each high density portion of the full band ply.

* * * * *